US006990402B2

(12) United States Patent
Yasui et al.

(10) Patent No.: US 6,990,402 B2
(45) Date of Patent: Jan. 24, 2006

(54) CONTROL SYSTEM AND METHOD, AND CONTROL UNIT

(75) Inventors: Yuji Yasui, Saitama-ken (JP); Osamu Takizawa, Saitama-ken (JP); Takahide Mizuno, Saitama-ken (JP)

(73) Assignee: Honda Motor Co., Ltd., Tokyo (JP)

( * ) Notice: Subject to any disclaimer, the term of this patent is extended or adjusted under 35 U.S.C. 154(b) by 116 days.

(21) Appl. No.: 10/727,056

(22) Filed: Dec. 4, 2003

(65) Prior Publication Data

US 2004/0158387 A1 Aug. 12, 2004

(30) Foreign Application Priority Data

Dec. 5, 2002 (JP) ............................ 2002-354360

(51) Int. Cl.
*B60T 7/12* (2006.01)

(52) U.S. Cl. ...................... 701/108; 701/101; 701/103; 701/104; 123/674; 73/113; 73/117.2; 73/117.3; 73/118.1

(58) Field of Classification Search ................ 701/108, 701/101, 103, 104; 73/113, 117.2, 117.3, 73/118.1; 123/674
See application file for complete search history.

(56) References Cited

U.S. PATENT DOCUMENTS 5,794,604 A * 8/1998 Suzuki et al. ............... 123/673
6,266,605 B1 * 7/2001 Yasui et al. ................. 701/109

* cited by examiner

*Primary Examiner*—Tony M. Argenbright
*Assistant Examiner*—Johnny H. Hoang
(74) *Attorney, Agent, or Firm*—Squire, Sanders & Dempsey L.L.P.

(57) ABSTRACT

There is provided a control system capable of realizing a highly robust control having a large margin of stability. The ECU of the control system controls the air-fuel ratio of exhaust gases emitted from the first to fourth cylinders. The ECU 2 estimates an estimation value of a detected air-fuel ratio, from a model defining a relation between the estimation value and a plurality of simulation values, and identifies an intake air amount variation coefficient such the estimation value becomes equal to a detected air-fuel ratio. The ECU calculates an air-fuel ratio variation correction coefficient according to the identified air-fuel ratio variation coefficient, on a cylinder-by-cylinder basis, and a learned correction value of the air-fuel ratio variation correction coefficient, on a cylinder-by-cylinder basis, and corrects a basic fuel injection amount by the air-fuel ratio variation correction coefficient and the learned correction value, on a cylinder-by-cylinder basis, to thereby calculate a final fuel injection amount.

33 Claims, 38 Drawing Sheets

FIG. 4

$$KACT(k)=\Phi_1(k)\cdot KACT\_OS_1(k-d)+\Phi_2(k)\cdot KACT\_OS_2(k-d)+\Phi_3(k)\cdot KACT\_OS_3(k-d)+\Phi_4(k)\cdot KACT\_OS_4(k-d) \quad \cdots\cdots (1)$$

$$KACT\_EST(k)=\Phi_1(k)\cdot KACT\_OS_1(k-d)+\Phi_2(k)\cdot KACT\_OS_2(k-d)+\Phi_3(k)\cdot KACT\_OS_3(k-d)+\Phi_4(k)\cdot KACT\_OS_4(k-d) \quad \cdots\cdots (2)$$

$$\phi(k)=\phi(k-1)+KP(k)\cdot ide(k) \quad \cdots\cdots (3)$$

$$\phi(k)^T=[\Phi_1(k),\ \Phi_2(k),\ \Phi_3(k),\ \Phi_4(k)] \quad \cdots\cdots (4)$$

$$ide(k)=KACT(k)-KACT\_EST(k) \quad \cdots\cdots (5)$$

$$KACT\_EST(k)=\phi(k-1)^T\cdot\zeta(k) \quad \cdots\cdots (6)$$

$$\zeta(k)^T=[KACT\_OS_1(k-d),\ KACT\_OS_2(k-d),\ KACT\_OS_3(k-d),\ KACT\_OS_4(k-d)] \quad \cdots\cdots (7)$$

$$KP(k)=\frac{P(k)\cdot\zeta(k)}{1+\zeta(k)^T\cdot P(k)\cdot\zeta(k)} \quad \cdots\cdots (8)$$

$$P(k+1)=\frac{1}{\lambda_1}\left(I-\frac{\lambda_2\cdot P(k)\cdot\zeta(k)\cdot\zeta(k)^T}{\lambda_1+\lambda_2\cdot\zeta(k)^T\cdot P(K)\cdot\zeta(k)}\right)P(k) \quad \cdots\cdots (9)$$

I : UNIT MATRIX $\lambda_1, \lambda_2$ : WEIGHTING PARAMETER

F I G. 7

$$\Phi ave(k)=\frac{1}{4}\cdot\left\{\Phi_1(k)+\Phi_2(k)+\Phi_3(k)+\Phi_4(k)\right\} \quad \cdots\cdots (10)$$

$$KOBSV_i(k)=-GI\cdot\sum_{j=0}^{k}e(j)-FI\cdot\Phi_i(k)-HI\cdot[\Phi_i(k)-\Phi_i(k-1)] \quad \cdots\cdots (11)$$

$$e(k)=\Phi_i(k)-\Phi ave(k) \quad \cdots\cdots (12)$$

FI, GI, HI : FEEDBACK GAINS

FIG. 9

$$ESV(k)=\frac{NE(k)}{1500}\cdot PBA(k)\cdot SVPRA \quad \cdots\cdots (13)$$

$$KOBSV\_LS_i(k)=AOBSV\_LS_i\cdot ESV(k)+BOBSV\_LS_i \quad \cdots\cdots (14)$$

$$\theta OBSV\_LS_i(k)=\theta OBSV\_LS_i(k-1)+KQ_i(k)\cdot Eov_i(k) \quad \cdots\cdots (15)$$

$$\theta OBSV\_LS_i(k)^T=[AOBSV\_LS_i(k),\ BOBSV\_LS_i(k)] \quad \cdots\cdots (16)$$

$$Eov_i(k)=KOBSV_i(k)\cdot KOBSV\_LS_i(k)-\theta OBSVLS_i(k-1)^T\cdot Z(k) \quad \cdots\cdots (17)$$

$$KOBSV\_LS_i(k)=\theta OBSV\_LS_i(k-1)^T\cdot Z(k) \quad \cdots\cdots (18)$$

$$Z(k)^T=[ESV(k),\ 1] \quad \cdots\cdots (19)$$

$$KQ_i(k)=\frac{Q_i(k)\cdot Z(k)}{1+Z(k)^T\cdot Q_i(k)\cdot Z(k)} \quad \cdots\cdots (20)$$

$$Q_i(k+1)=\frac{1}{\lambda_1'}\cdot\left(I-\frac{\lambda_2'\cdot Q_i(k)\cdot Z(k)^T\cdot Z(k)}{\lambda_1'+\lambda_2'\cdot Z(k)^T\cdot Q_i(k)\cdot Z(k)}\right)\cdot Q_i(k) \quad \cdots\cdots (21)$$

$I$ : UNIT MATRIX $\lambda_1', \lambda_2'$ : WEIGHTING PARAMETER $$KOBSV\_LS_i(k)=\theta OBSV\_LS_i(k-1)^T\cdot Z(k) = AOBSV\_LS_i(k-1)\cdot ESV(k)+BOBSV\_LS_i(k-1) \quad \cdots\cdots (22)$$

FIG. 10

$$KACT(n) = b0(n) \cdot KSTR(n-3) + r1(n) \cdot KSTR(n-4) + r2(n) \cdot KSTR(n-5) + r3(n) \cdot KSTR(n-6) + s0(n) \cdot KACT(n-3) \quad \cdots\cdots (23)$$

$$KSTR(n) = \frac{1}{b0(n)} \cdot \{KCMD(n) - r1(n) \cdot KSTR(n-1) - r2(n) \cdot KSTR(n-2) - r3(n) \cdot KSTR(n-3) - s0(n) \cdot KACT(n)\} \quad \cdots\cdots (24)$$

$$\theta(n) = \theta(n-1) + K\Gamma(n) \cdot ide\_st(n) \quad \cdots\cdots (25)$$

$$\theta(n)^T = [b0(n), r1(n), r2(n), r3(n), s0(n)] \quad \cdots\cdots (26)$$

$$ide\_st(n) = KACT(n) - KACT\_HAT(n) \quad \cdots\cdots (27)$$

$$KACT\_HAT(n) = \theta(n-1)^T \cdot \xi(n) \quad \cdots\cdots (28)$$

$$\xi(n)^T = [KSTR(n-3), KSTR(n-4), KSTR(n-5), KSTR(n-6), KACT(n-3)] \quad \cdots\cdots (29)$$

$$K\Gamma(n) = \frac{\Gamma(n) \cdot \xi(n)}{1 + \xi(n)^T \cdot \Gamma(n) \cdot \xi(n)} \quad \cdots\cdots (30)$$

$$\Gamma(n+1) = \frac{1}{\lambda_{1S}} \left( I - \frac{\lambda_{2S} \cdot \Gamma(n) \cdot \xi(n) \cdot \xi(n)^T}{\lambda_{1S} + \lambda_{2S} \cdot \xi(n)^T \cdot \Gamma(n) \cdot \xi(n)} \right) \Gamma(n) \quad \cdots\cdots (31)$$

$I$ : UNIT MATRIX $\lambda_{1S}, \lambda_{2S}$ : WEIGHTING PARAMETER

FIG. 11

$$\theta\_ave(k) = \frac{1}{m+1}\{\theta buf(k) + \cdots + \theta buf(k-m)\} \qquad \cdots\cdots (32)$$

$$\theta\_ave(k)^T = [b0\_ave(k),\ r1\_ave(k),\ r2\_ave(k),\ r3\_ave(k),\ s0\_ave(k)] \qquad \cdots\cdots (33)$$

$$KSTR(k) = \frac{1}{b0\_ave(k)} \cdot \{KCMD(k) - r1\_ave(k) \cdot KSTR(k-4) - r2\_ave(k) KSTR(k-8) - r3\_ave(k) \cdot KSTR(k-12) - s0\_ave(k) \cdot KACT(k)\} \qquad \cdots\cdots (34)$$

$$\theta(n) = \theta(n-1) + K\Gamma(n) \cdot ide\_st(n) \qquad \cdots\cdots (35)$$

$$\theta(n)^T = [b0(n),\ r1(n),\ r2(n),\ r3(n),\ s0(n)] \qquad \cdots\cdots (36)$$

$$ide\_st(n) = KACT(n) - KACT\_HAT(n) \qquad \cdots\cdots (37)$$

$$KACT\_HAT(n) = \theta(n-1)^T \cdot \xi(n) \qquad \cdots\cdots (38)$$

$$\begin{aligned}\xi(n)^T &= [KSTR(n-3),\ KSTR(n-4),\ KSTR(n-5),\ KSTR(n-6),\ KACT(n-3)] \\ &= [KSTR(k-12), KSTR(k-16), KSTR(k-20), KSTR(k-24), KACT(k-12)]\end{aligned} \qquad \cdots\cdots (39)$$

$$K\Gamma(n) = \frac{\Gamma(n) \cdot \xi(n)}{1 + \xi(n)^T \cdot \Gamma(n) \cdot \xi(n)} \qquad \cdots\cdots (40)$$

$$\Gamma(n+1) = \frac{1}{\lambda_{1S}}\left(I - \frac{\lambda_{2S} \cdot \Gamma(n) \cdot \xi(n) \cdot \xi(n)^T}{\lambda_{1S} + \lambda_{2S} \cdot \xi(n)^T \cdot \Gamma(n) \cdot \xi(n)}\right)\Gamma(n) \qquad \cdots\cdots (41)$$

$I$ : UNIT MATRIX $\lambda_{1S}, \lambda_{2S}$ : WEIGHTING PARAMETER

FIG. 20

PID CONTROL ALGORITHM $$KOBSV_i(k) = -GP \cdot \sum_{j=0}^{k} \cdot e_i(j) - FP \cdot e_i(k) - HP \cdot [e_i(k) - e_i(k-1)] \quad \cdots\cdots (43)$$

$$e_i(k) = \Phi_i(k) - \Phi ave(k) \quad \cdots\cdots (44)$$

FP, GP, HP : FEEDBACK GAINS

IP-D CONTROL ALGORITHM $$KOBSV_i(k) = -GD \cdot \sum_{j=0}^{k} e(j) - FD \cdot e(k) - HD \cdot [\Phi_i(k) - \Phi_i(k-1)] \quad \cdots\cdots (45)$$

$$e(k) = \Phi_i(k) - \Phi ave(k) \quad \cdots\cdots (46)$$

FD, GD, HD : FEEDBACK GAINS

RESPONSE-SPECIFIED CONTROL ALGORITHM $$KOBSV_i(k) = -FS \cdot \sigma(k) - GS \cdot \sum_{j=0}^{k} \cdot \sigma(j) - HS \cdot e(k) \quad \cdots\cdots (47)$$

$$e(k) = \Phi_i(k) - \Phi ave(k) \quad \cdots\cdots (48)$$

$$\sigma(k) = e(k) + S \cdot e(k-1) \quad \cdots\cdots (49)$$

$\sigma(k)$ : SWITCHING FUNCTION
FS, GS, HS : FEEDBACK GAINS
S : SWITCHING FUNCTION SETTING PARAMETER $(-1 < S < 1)$

FIG. 21

$$\phi(k)=\phi base+d\phi(k) \quad \cdots\cdots (50)$$

$$\phi base^T=[\Phi base_1, \Phi base_2, \Phi base_3, \Phi base_4] \quad \cdots\cdots (51)$$

$$d\phi(k)=\delta \cdot d\phi(k-1)+KP(k)\cdot ide(k) \quad \cdots\cdots (52)$$

$$ide(k)=KACT(k)-KACT\_EST(k) \quad \cdots\cdots (53)$$

$$KACT\_EST(k)=\phi(k-1)^T \cdot \zeta(k) \quad \cdots\cdots (54)$$

$$\zeta(k)^T=[KACT\_OS_1(k-d), KACT\_OS_2(k-d), KACT\_OS_3(k-d), KACT\_OS_4(k-d)] \quad \cdots\cdots (55)$$

$$KP(k)=\frac{Pc\cdot\zeta(k)}{1+\zeta(k)^T\cdot Pc\cdot\zeta(k)} \quad \cdots\cdots (56)$$

Pc : IDENTIFICATION GAIN $$\delta=\begin{bmatrix}\delta 1 & 0 & 0 & 0\\ 0 & \delta 1 & 0 & 0\\ 0 & 0 & \delta 1 & 0\\ 0 & 0 & 0 & \delta 1\end{bmatrix} \quad (0<\delta 1\leqq 1) \quad \cdots\cdots (57)$$

$\delta$ : FORGETTING VECTOR

FIG. 27

$$GAIR(k-d') = \Psi_1(k) \cdot GAIR\_OS_1(k) + \Psi_2(k) \cdot GAIR\_OS_2(k) + \Psi_3(k) \cdot GAIR\_OS_3(k) + \Psi_4(k) \cdot GAIR\_OS_4(k) \quad \cdots\cdots (58)$$

$$GAIR\_EST(k) = \Psi_1(k) \cdot GAIR\_OS_1(k) + \Psi_2(k) \cdot GAIR\_OS_2(k) + \Psi_3(k) \cdot GAIR\_OS_3(k) + \Psi_4(k) \cdot GAIR\_OS_4(k) \quad \cdots\cdots (59)$$

$$\psi(k) = \psi(k-1) + KR(k) \cdot ide'(k) \quad \cdots\cdots (60)$$

$$\psi(k)^T = [\Psi_1(k), \Psi_2(k), \Psi_3(k), \Psi_4(k)] \quad \cdots\cdots (61)$$

$$ide'(k) = GAIR(k-d') - GAIR\_EST(k) \quad \cdots\cdots (62)$$

$$GAIR\_EST(k) = \psi(k-1)^T \cdot \zeta'(k) \quad \cdots\cdots (63)$$

$$\zeta'(k)^T = [GAIR\_OS_1(k), GAIR\_OS_2(k), GAIR\_OS_3(k), GAIR\_OS_4(k)] \quad \cdots\cdots (64)$$

$$KR(k) = \frac{R(k) \cdot \zeta'(k)}{1 + \zeta'(k)^T \cdot R(k) \cdot \zeta'(k)} \quad \cdots\cdots (65)$$

$$R(k+1) = \frac{1}{\lambda_1''} \cdot \left( I - \frac{\lambda_2'' \cdot R(k) \cdot \zeta'(k) \cdot \zeta'(k)^T}{\lambda_1'' + \lambda_2'' \cdot \zeta'(k)^T \cdot R(k) \cdot \zeta'(k)} \right) \cdot R(k) \quad \cdots\cdots (66)$$

$I$ : UNIT MATRIX $\lambda_1''$, $\lambda_2''$ : WEIGHTING PARAMETER $$\Psi ave(k)=\frac{1}{4}\cdot\left\{\Psi_1(k)+\Psi_2(k)+\Psi_3(k)+\Psi_4(k)\right\} \quad \cdots\cdots (67)$$

$$KICYL_i(k)=-GI'\cdot\sum_{j=0}^{k}e'(j)-FI'\cdot\Psi_i(k)-HI'\cdot[\Psi_i(k)-\Psi_i(k-1)] \quad \cdots\cdots (68)$$

$$e'(k)=\Psi_i(k)-\Psi ave(k) \quad \cdots\cdots (69)$$

FI', GI', HI' : FEEDBACK GAINS

FIG. 32

$$KICYL\_LS_i = AICYL\_LS_i \cdot ESV(k) + BICYL\_LS_i \quad \cdots\cdots (70)$$

$$\theta ICYL\_LS_i(k) = \theta ICYL\_LS_i(k-1) + KU_i(k) \cdot Eic_i(k) \quad \cdots\cdots (71)$$

$$\theta ICYL\_LS_i(k)^T = [AICYL\_LS_i(k),\ BICYL\_LS_i(k)] \quad \cdots\cdots (72)$$

$$Eic_i(k) = KICYL_i(k) \cdot KICYL\_LS_i(k) - \theta ICYL\_LS_i(k-1)^T \cdot Z'(k) \quad \cdots\cdots (73)$$

$$KICYL\_LS_i(k) = \theta ICYL\_LS_i(k-1)^T \cdot Z'(k) \quad \cdots\cdots (74)$$

$$Z'(k)^T = [ESV(k),\ 1] \quad \cdots\cdots (75)$$

$$KU_i(k) = \frac{U_i(k) \cdot Z'(k)}{1 + Z'(k)^T \cdot U_i(k) \cdot Z'(k)} \quad \cdots\cdots (76)$$

$$U_i(k+1) = \frac{1}{\lambda_1^*} \cdot \left( I - \frac{\lambda_2^* \cdot U_i(k) \cdot Z'(k)^T \cdot Z'(k)}{\lambda_1^* + \lambda_2^* \cdot Z'(k)^T \cdot U_i(k) \cdot Z'(k)} \right) \cdot U_i(k) \quad \cdots\cdots (77)$$

$I$ : UNIT MATRIX
$\lambda_1^*, \lambda_2^*$ : WEIGHTING PARAMETER $$KICYL\_LS_i(k) = \theta ICYL\_LS_i(k-1)^T \cdot Z'(k) = AICYL\_LS_i(k-1) \cdot ESV(K) + BICYL\_LS_i(k-1) \quad \cdots\cdots (78)$$

F I G. 4 0

$$GAIR\_F(k)=b0 \cdot GAIR(k)+b1 \cdot GAIR(k-1)+....+bm^* \cdot GAIR(k-m^*) + a1 \cdot GAIR\_F(k-1)+a2 \cdot GAIR\_F(k-2)+\cdots+an^* \cdot GAIR\_F(k-n^*) \quad \cdots\cdots (79)$$

$$\psi(k)=\psi(k-1)+KR(k) \cdot ide'(k) \quad \cdots\cdots (80)$$

$$\psi(k)^T=[\Psi_1(k),\ \Psi_2(k),\ \Psi_3(k),\ \Psi_4(k)] \quad \cdots\cdots (81)$$

$$ide'(k)=GAIR\_F(k-d')-GAIR\_EST(k) \quad \cdots\cdots (82)$$

$$GAIR\_EST(k)=\psi(k-1)^T \cdot \zeta'(k) \quad \cdots\cdots (83)$$

$$\zeta'(k)^T=[GAIR\_OS_1(k),\ GAIR\_OS_2(k),\ GAIR\_OS_3(k),\ GAIR\_OS_4(k)] \quad \cdots\cdots (84)$$

$$KR(k)=\frac{R(k) \cdot \zeta'(k)}{1+\zeta'(k)^T \cdot R(k) \cdot \zeta'(k)} \quad \cdots\cdots (85)$$

$$R(k+1)=\frac{1}{\lambda_1''} \cdot \left(I-\frac{\lambda_2'' \cdot R(k) \cdot \zeta'(k) \cdot \zeta'(k)^T}{\lambda_1''+\lambda_2'' \cdot \zeta'(k)^T \cdot R(k) \cdot \zeta'(k)}\right) \cdot R(K) \quad \cdots\cdots (86)$$

I : UNIT MATRIX $\lambda_1''$, $\lambda_2''$ : WEIGHTING PARAMETER

FIG. 41

IP-D CONTROL ALGORITHM $$KICYL_i(k) = -GD' \cdot \sum_{j=0}^{k} e'(j) - FD' \cdot e'(k) - HD' \cdot [\Psi_i(k) - \Psi_i(k-1)] \quad \cdots\cdots (87)$$

$$e'(k) = \Psi_i(k) - \Psi ave(k) \quad \cdots\cdots (88)$$

FD', GD', HD' : FEEDBACK GAINS

RESPONSE-SPECIFIED CONTROL ALGORITHM $$KICYL_i(k) = -FS' \cdot \sigma(k) - GS' \cdot \sum_{j=0}^{k} \cdot \sigma'(j) - HS' \cdot e(k) \quad \cdots\cdots (89)$$

$$e'(k) = \Psi_i(k) - \Psi ave(k) \quad \cdots\cdots (90)$$

$$\sigma'(k) = e'(k) + S' \cdot e'(k-1) \quad \cdots\cdots (91)$$

$\sigma'(k)$ : SWITCHING FUNCTION
FS', GS', HS' : FEEDBACK GAINS
S' : SWITCHING FUNCTION SETTING PARAMETER $(-1 < S' < 1)$

FIG. 42

$$\psi(k)=\psi base+d\psi(k) \quad \cdots\cdots (92)$$

$$\psi base^T=[\Psi base_1, \Psi base_2, \Psi base_3, \Psi base_4] \quad \cdots\cdots (93)$$

$$d\psi(k)=\delta' \cdot d\psi(k-1)+KR(k)\cdot ide'(k) \quad \cdots\cdots (94)$$

$$ide'(k)=GAIR(k)-GAIR\_EST(k) \quad \cdots\cdots (95)$$

$$GAIR\_EST(k)=\psi(k-1)^T \cdot \zeta'(k) \quad \cdots\cdots (96)$$

$$\zeta'(k)^T=[GAIR\_OS_1(k-d'), GAIR\_OS_2(k-d'), GAIR\_OS_3(k-d'), GAIR\_OS_4(k-d')] \quad \cdots\cdots (97)$$

$$KR(k)=\frac{Pc' \cdot \zeta'(k)}{1+\zeta'(k)^T \cdot Pc' \cdot \zeta'(k)} \quad \cdots\cdots (98)$$

Pc' : IDENTIFICATION GAIN $$\delta'=\begin{bmatrix} \delta 1' & 0 & 0 & 0 \\ 0 & \delta 1' & 0 & 0 \\ 0 & 0 & \delta 1' & 0 \\ 0 & 0 & 0 & \delta 1' \end{bmatrix} \quad (0<\delta 1' \leqq 1) \quad \cdots\cdots (99)$$

δ' : FORGETTING VECTOR

CONTROL SYSTEM AND METHOD, AND CONTROL UNIT

BACKGROUND OF THE INVENTION

1. Field of the Invention

The present invention relates to a control system and method and an engine control unit that control a plant, using a model defining the relationship between a simulation value simulating the behavior of an internal variable of the plant and a detection value reflecting the behavior of the internal variable.

2. Description of the Related Art

Recently, due to social requirements, it is demanded of internal combustion engines that the engines have excellent exhaust emission characteristics, that is, an excellent emission reduction rate of the catalyst. On the other hand, internal combustion engines having a plurality of cylinders can suffer variation in air-fuel ratio between the cylinders to which the air-fuel mixture is supplied, due to the malfunction of an EGR system, an evaporative fuel processing system, or injectors. In such a case, there is a fear that the emission reduction rate of the catalyst is lowered. As a control system for a plant, which overcomes such a problem, there has been conventionally proposed an air-fuel ratio control system for an internal combustion engine, which corrects variation in air-fuel ratio between cylinders, using an observer based on the optimal control theory applied thereto (see e.g. Publication of Japanese Patent No. 3296472, pages 19–23, FIGS. 35 and 36). This air-fuel ratio control system is comprised of a LAF sensor disposed in the collecting section of an exhaust pipe, for detecting the air-fuel ratio of exhaust gases, a control unit to which a detection signal (indicative of the detected air-fuel ratio) from the LAF sensor is input, and injectors disposed in the intake manifold of the exhaust pipe for the respective cylinders and connected to the control unit.

In this control unit, variation in air-fuel ratio of exhaust gases emitted from a plurality of cylinders, i.e. variation in air-fuel ratio of the mixture between the cylinders is corrected by calculating a cylinder-by-cylinder fuel injection amount as the amount of fuel to be injected from each injector into the associated cylinder, based on the detected air-fuel ratio output from the LAF sensor, using the observer and by PID control, as described below.

That is, the control unit calculates the basic fuel injection amount depending on the operating conditions of the engine, and multiplies the basic fuel injection amount by various correction coefficients to calculate the output fuel injection amount. Then, as described in detail hereinbelow, the observer calculates a cylinder-by-cylinder estimated air-fuel ratio, and a cylinder-by-cylinder estimated feedback correction coefficient is determined by PID control based on the estimated cylinder-by-cylinder air-fuel ratio. The cylinder-by-cylinder fuel injection amount is calculated by multiplying an output fuel injection amount by the cylinder-by-cylinder feedback correction coefficient.

The cylinder-by-cylinder estimated air-fuel ratio is calculated by the observer based on the optimal control theory. More specifically, by using a model of a discrete-time system representative of the relationship between a cylinder-by-cylinder fuel-air ratio and a fuel-air ratio detected at the collecting section (where the LAF sensor is disposed), the cylinder-by-cylinder estimated air-fuel ratio is calculated. Further, in the PID control, a value obtained by dividing the fuel-air ratio detected at the collecting section, i.e. the detected air-fuel ratio, by the average value of the respective preceding values of the feedback correction coefficients is set to a target value, and the cylinder-by-cylinder feedback correction coefficient is calculated such that the difference between the target value and the cylinder-by-cylinder estimated air-fuel ratio calculated by the observer converges to a value of 0.

Further, another air-fuel ratio control system is known which calculates the fuel injection amount on a cylinder-by-cylinder basis, based on an estimated intake air amount calculated by estimating the amount of intake air to be supplied to each of a plurality of cylinders, on a cylinder-by-cylinder basis, and an estimated air-fuel ratio calculated on a cylinder-by-cylinder basis by an observer similar to that described above (see e.g. Japanese Laid-Open Patent Publication (Kokai) No. 6-74076, pages, 3–12, FIGS. 1 and 31).

More specifically, this air-fuel ratio control system calculates a target intake fuel amount by searching a map according to the engine speed and the intake pipe pressure. Further, by applying a fluid dynamics model to the intake system of the engine, the estimated intake air amount is calculated on a cylinder-by-cylinder basis, and the estimated air-fuel ratio is calculated on a cylinder-by-cylinder basis, by the observer described above. Further, by dividing the estimated intake air amount by the estimated air-fuel ratio, an estimated intake fuel amount is calculated on a cylinder-by-cylinder basis, and a final fuel injection amount is calculated by an adaptive controller such that the estimated intake fuel amount becomes equal to the target intake fuel mount.

Recently, aside from the above-mentioned demand of ensuring an excellent emission reduction rate of the catalyst, internal combustion engines are demanded of higher power output and higher torque. To meet the demand, there is conventionally employed the technique of reducing the exhaust resistance and exhaust interference by configuring the layout of the exhaust system into a complicated shape (in which exhaust passages from the cylinders are progressively combined in the exhaust manifold such that four passages, for example, are combined into two passages, and the two passages are then combined into one passage). However, when the conventional air-fuel ratio control system is applied to internal combustion engines having such a complicated exhaust system layout, the observer can no longer establish itself based on the conventional optimal control theory, and therefore, the variation in air-fuel ratio between the cylinders cannot be properly corrected, which can lead to a lowered emission reduction rate of the catalyst. This is because according to the conventional optimal control theory, modeling errors and changes in the dynamic characteristics of a model are not considered in the simulation model and the optimal control theory itself, which makes the observer small in margin of stability and low in robustness. Therefore, the air-fuel ratio control system does not have a sufficient stability against changes in the contributions of exhaust gases from the individual cylinders to the detected air-fuel ratio of the LAF sensor caused by attachment of fuel, etc., changes in the response of the LAF sensor, and the aging of the same.

Further, in the second-described air-fuel ratio control system, which uses the observer similar to that used in the first-described air-fuel ratio control system, there can be a case in which the observer cannot establish itself for the reason described above. In such a case, the fuel injection amount cannot be properly calculated on a cylinder-by-cylinder basis, which can degrade the emission reduction rate of the catalyst. Further, in a multi-cylinder internal combustion engine, in general, variation also occurs in intake air amount between the cylinders. However, the second-described air-fuel ratio control system does not consider the correction of the variation in intake air amount, and only estimates the intake air amount on a cylinder-by-cylinder basis, by applying the fluid dynamics model thereto. Therefore, the variation in intake air amount between the cylinders cannot be properly corrected, which brings about variation in the air-fuel ratio between the cylinders, causing further degradation of emission reduction rate of the catalyst.

SUMMARY OF THE INVENTION

It is a first object of the present invention to provide a control system and method and a control unit that are capable of realizing highly robust control having a large margin of stability.

It is a second object of the present invention to provide a control system and method and a control unit that are applicable to control of an air-fuel ratio of a mixture supplied to an internal combustion engine having a plurality of cylinders, and capable of appropriately and promptly correcting variation in air-fuel ratio or intake air amount between the cylinders and thereby realizing an accurate air-fuel ratio control even when the engine has a complicated exhaust system layout.

To attain the first object, in a first aspect of the present invention, there is provided a control system for controlling a plant, comprising:

detection means for detecting a detection value reflecting a behavior of a first internal variable of the plant;

simulation value-generating means for generating a simulation value simulating the behavior of the first internal variable;

estimation means for estimating an estimation value of the detection value based on a model defining a relationship between the estimation value and the simulation value;

identification means for identifying a model parameter of the model according to the detected detection value and the generated simulation value, such that the estimated estimation value becomes equal to the detected detection value; and first control means for determining a first input to be inputted to the plant, according to the identified model parameter.

With the arrangement of the control system according to the first aspect of the invention, the detection value reflecting the behavior of the first internal variable of the plant is detected, and the estimation value of the detection value is estimated based on a model defining the relationship between the estimation value and the simulation value simulating the behavior of the first internal variable. The model parameter of the model is identified according to the detection value and the simulation value, such that the estimated estimation value becomes equal to the detected detection value, and the first input to be inputted to the plant is determined according to the identified model parameter. Thus, the model parameter is identified such that the estimated estimation value becomes equal to the detected detection value, which enables the model parameter to be identified as a value in which the actual behavior of the first internal variable is properly reflected, particularly, enables the model parameter to be identified as a value in which the actual behavior of the first internal variable is reflected in real time, when an onboard identifier is used as the identification means. Further, the first input is determined according to the thus identified model parameter, so that even when the first internal variable is drastically changed, the first input can be determined as a value in which the behavior of the first internal variable is promptly and properly reflected, and by using the first input thus determined, it is possible to promptly and properly control the first internal variable to a predetermined state or a predetermined value. As a result, e.g. when the plant is to be controlled such that the first input causes the detection value detected by the detection means to converge to a predetermined target value, even if the S/N ratio or sensitivity of the detection means is low, it is possible to set the detection value susceptible to the behavior of the first internal variable to the predetermined target value promptly with stability by causing the behavior of the first internal variable to be reflected in the first input. That is, it is possible to realize a control having a higher robustness and a larger margin of stability than the prior art.

Preferably, the control system further comprises second control means for determining a second input to be inputted to the plant such that the detection value is caused to converge to a predetermined target value, the first internal variable comprising a plurality of first internal variables, the simulation value comprising a plurality of simulation values simulating respective behaviors of the plurality of first internal variables, the model parameter comprising a plurality of model parameters, and the identification means identifies the plurality of model parameters according to the detection value and the plurality of simulation values such that the estimated estimation value becomes equal to the detected detection value, the first control means determining the first input such that the identified model parameters converge to an average value thereof.

With the arrangement of the preferred embodiment, the second control means determines the second input to be inputted to the plant such that the detection value is caused to converge to the predetermined target value, and the identification means identifies the plurality of model parameters according to the detection value and the plurality of simulation values such that the estimated estimation value becomes equal to the detected detection value. The first control means determines the first input such that the identified model parameters converge to the average value thereof. Thus, the first input is determined such that the identified values of the plurality of model parameters converge to the average value thereof, which makes it possible to prevent a control process for causing the detection value detected by the detection means to converge to the predetermined target value and a control process for controlling the first internal variable from interfering with each other, and at the same time correct variation in behavior between the plurality of first internal variables.

More preferably, the first control means comprises learned correction value-calculating means for calculating a learned correction value of the first input, using a sequential statistical algorithm, correction means for correcting the first input using the calculated learned correction value, and input means for inputting the corrected first input to the plant.

The least-squares method is generally employed as the identifying computational algorithm. However, in the identifying computation by the least-squares method, after collecting a plurality of numbers of various data for computation, the computation is executed collectively based on the collected data. Therefore, at the start of the control, the identification of the model parameter is not executed until completion of collection of the data, which makes it impossible to calculate the first input based on the identified value of the model parameter, which can degrade the controllability. In contrast, with the arrangement of the present preferred embodiment of the control system, the learned correction value of the first input is calculated with the sequential statistical algorithm, which enables the first input to be corrected even at the start of the control by the learned correction value calculated every control cycle. Therefore, e.g. by setting an initial value of the first input in advance, even before the model parameter is newly identified at the start of the control, the first input can be always corrected by the learned correction value calculated every control cycle, whereby the controllability at the start of the control can be enhanced.

More preferably, the learned correction value-calculating means calculates the learned correction value of the first input using a regression equation in which the learned correction value is used as a dependent variable and a second internal variable having influence on the first internal variable is used as an independent variable, and calculates a regression coefficient and a constant term of the regression equation with the sequential statistical algorithm.

With the arrangement of the preferred embodiment, the learned correction value of the first input is calculated using the regression equation in which the learned correction value is used as the dependent variable and a second internal variable having influence on the first internal variable is used as the independent variable, and the regression coefficient and the constant term of the regression equation are calculated with the sequential statistical algorithm. Therefore, even when the rate of change in the second internal variable is very high, making the rate of change in the first internal variable also so high that it is difficult to estimate the first internal variable, it is possible to calculate the learned correction value as a value in which the actual state of the first internal variable is properly reflected, thereby further enhancing the controllability of the first internal variable by the first input.

Preferably, the first control means determines an input component contained in the first input based on a difference between the model parameter and a predetermined target value.

With the arrangement of this preferred embodiment, it is possible to determine the input component contained in the first input based on the difference between the model parameter and the predetermined target value. Therefore, the plant can be controlled such that model parameter converges to a predetermined target value, thereby causing the first internal variable of the plant to converge to a predetermined value without causing a steady-state deviation.

More preferably, the first control means determines other input components than the input component contained in the first input, based on the model parameter.

With the arrangement of this preferred embodiment, the first input contains not only the input component determined based on the difference between the model parameter and the predetermined target value, but also the other input components determined based on the model parameter. Therefore, e.g. when the plant is controlled such that the model parameter converges to the predetermined target value, the first internal variable of the plant can be controlled that it converges to the predetermined value without causing overshooting or an oscillatory behavior. As a result, the detection value can be controlled to the stable state while preventing the same from becoming oscillatory or being overshot.

Preferably, the first control means determines the first input according to the model parameter with a response-specified control algorithm.

With the arrangement of this preferred embodiment, the first input is determined according to the model parameter with the response-specified control algorithm, and therefore, it is possible to control the plant, for example, such that model parameter converges to the predetermined target value, whereby the first internal variable of the plant can be controlled such that it converges to the predetermined value without causing overshooting or an oscillatory behavior. As a result, when the plant is controlled by the first input, the detection value can be controlled to a stable state while preventing the same from becoming oscillatory or overshot.

Preferably, the identification means identifies the model parameter by a fixed gain method.

With the arrangement of the preferred embodiment, the model parameter is identified by the fixed gain method, and therefore, it is possible to reduce computational load on the identification means. This makes it possible to shorten the computing time of the first input, whereby it is possible to calculate the first input promptly and properly as a value in which the behavior of the first internal variable is properly reflected, even when the rate of change in the first internal variable is high. Further, when a method of identifying the model parameter by adding a predetermined correction component to the reference value thereof is employed as the fixed gain method, the identified value of the model parameter can be constrained to values close to the reference value, which makes it possible to prevent an increase in the rate of change in the first internal variable from causing the state of the first internal variable to be unsuitably reflected in the identified value of the model parameter, thereby making it possible to enhance the stability of the control.

Further preferably, the identification means identifies the model parameter by calculating a model parameter reference value according to the second internal variable, and adding a predetermined correction component to the calculated model parameter reference value.

With the arrangement of this preferred embodiment, the model parameter is identified by adding the predetermined correction component to the model parameter reference value calculated according to the second internal variable. This makes it possible to constrain the identified value of the model parameter to values close to the model parameter reference value, whereby even when the rate of change in the first internal variable is high due to the influence of change in the second internal variable, it is possible to promptly and properly calculate the first input as a value in which the behavior of the first internal variable is properly reflected, thereby enhancing the stability of the control.

Preferably, the control system further comprises delay means for delaying one of the detection value and the simulation value by a predetermined delay time period, and the identification means identifies the model parameter according to the delayed one of the detection value and the simulation value, and the other of the detection value and the simulation value.

With the arrangement of this preferred embodiment, the model parameter is identified according to the delayed one of the detection value and the simulation value, and the other of the detection value and the simulation value. Therefore, e.g. when the detection value or the simulation value surfers from the dead time, it is possible to identify the model parameter with accuracy while taking the dead time into account, thereby further enhancing the stability of the control.

Preferably the control system further comprises filter means for generating a filtered value of the detection value by subjecting the detection value to predetermined filtering processing, and the identification means identifies the model parameter according to the filtered value of the detection value and the simulation value.

In general, in this kind of control system, when the absolute value of the detection value changes over a wide range, the identifying process by the identification means can be incapable of following up the change in the detection value, which can cause delay in identification of the model parameter, causing degraded accuracy of the identification. In contrast, with the arrangement of this preferred embodiment, the identification means identifies the model parameter according to the filtered value of the detection value obtained by subjecting the detection value to the predetermined filtering processing and the simulation value, and therefore, by properly setting the filtering characteristics of the filtering processing, it is possible, even when the absolute value of the detection value changes over a wide range, the filtered value of the detection value can be generated as a value which positively contains information necessary for identification of the model parameter, i.e. information indicative of the behavior of the internal variables, and suppressed in the range of change thereof. Therefore, by identifying model parameter using the filtered value and the simulation value, it is possible to suppress delay in the identification of the model parameter and enhance the accuracy of the identification, thereby further enhancing the stability and response of the control.

To attain the second object, in a second aspect of the present invention, there is provided a control system for an internal combustion engine including a plurality of cylinders, a plurality of exhaust passages extending from the plurality of cylinders, respectively, and one exhaust passage into which the plurality of exhaust passages are combined, the control system controlling an amount of fuel to be supplied to the plurality of cylinders, on a cylinder-by-cylinder basis, thereby controlling an air-fuel ratio of exhaust gases emitted from the plurality of cylinders, the control system comprising:

fuel amount-determining means for determining an amount of fuel to be supplied to each of the plurality of cylinders;

air-fuel ratio parameter-detecting means for detecting an air-fuel ratio parameter indicative of an air-fuel ratio of exhaust gases in the one exhaust passage;

simulation value-generating means for generating a plurality of simulation values simulating respective behaviors of air-fuel ratios of exhaust gases emitted from the plurality of cylinders;

estimation means for estimating an estimation value of the air-fuel ratio parameter based on a model defining a relationship between the estimation value and the plurality of simulation values;

identification means for identifying a plurality of model parameters of the model according to the detected air-fuel ratio parameter and the generated plurality of simulation values, such that the estimation value of the air-fuel ratio parameter becomes equal to the detected air-fuel ratio parameter;

first correction value-calculating means for calculating a first correction value for correcting the amount of fuel to be supplied to the plurality of cylinders, according to the identified plurality of model parameters, on a cylinder-by-cylinder basis; and first fuel amount-correcting means for correcting the determined amount of fuel according to the calculated first correction value, on a cylinder-by-cylinder basis.

With the arrangement of the control system according to the second aspect of the invention, the amount of fuel to be supplied to each of the plurality of cylinders is determined by the fuel amount-determining means, and the air-fuel ratio parameter indicative of the air-fuel ratio of exhaust gases in the one exhaust passage is detected by the air-fuel ratio parameter-detecting means. The estimation value of the air-fuel ratio parameter is estimated based on the model defining the relationship between the estimation value and the plurality of simulation values simulating respective behaviors of air-fuel ratios of exhaust gases emitted from the plurality of cylinders, and the plurality of model parameters of the model are identified by the identification means such that the estimation value of the air-fuel ratio parameter becomes equal to the detected air-fuel ratio parameter. The first correction value for correcting the amount of fuel to be supplied to the plurality of cylinders is calculated according to the identified plurality of model parameters, on a cylinder-by-cylinder basis, by the first correction value-calculating means. The determined fuel amount is corrected according to the calculated first correction value, on a cylinder-by-cylinder basis, by the first fuel amount-correcting means. Thus, the plurality of model parameters are identified such that the estimation value of the air-fuel ratio parameter becomes equal to the detected air-fuel ratio parameter, which makes it possible to identify the plurality of model parameters as values in which the actual behaviors of exhaust gases emitted from the plurality of cylinders, i.e. variation in air-fuel ratio between the cylinders is reflected therein. Therefore, by correcting the amount of fuel to be supplied to each cylinder according to the first correction value calculated according to the identified values of the plurality of model parameters, on a cylinder-by-cylinder basis, it is possible to properly correct variation in air fuel ratio between the cylinders. Further, by using an onboard identifier as the identification means, it is possible to calculate the first correction value based on the model parameters identified in real time. This makes it possible, differently from the conventional control system, even when the dynamic characteristics of the controlled object are changed due to changes in respective contributions of the cylinders to the detected air-fuel ratio parameter, which are caused by attachment of fuel in the cylinders, variation in the response of the air-fuel ratio parameter-detecting means, and aging of the same, to correct the amount of fuel such that variation in air-fuel ratio between the cylinders is corrected (absorbed) while causing changes in the dynamic characteristics of the controlled object to be reflected in the model. As a result, even when the control system is applied to an internal combustion engine having a complicated exhaust system layout, it is possible to properly and promptly correct variation in air-fuel ratio between the cylinders, and thereby control the air-fuel ratio with accuracy. That is, it is possible to realize a highly robust air-fuel ratio control having a large margin of stability, and thereby, when a catalyst is provided in the exhaust passage, maintain an excellent emission reduction rate of the catalyst.

Preferably, the control system further comprises second correction value-calculating means for calculating a second correction value for correcting the amount of fuel to be supplied to each cylinder, such that the air-fuel ratio parameter is caused to converge to a predetermined target value, and second fuel amount-correcting means for correcting the amount of fuel to be supplied to each cylinder according to the calculated second correction value, and the first correction value-calculating means calculates the first correction value, on a cylinder-by-cylinder basis, such that the identified plurality of model parameters converge to an average value thereof.

With the arrangement of this preferred embodiment, the second correction value-calculating means calculates the second correction value for correcting the amount of fuel to be supplied to each cylinder, such that the air-fuel ratio parameter is caused to converge to the predetermined target value, and the second fuel amount-correcting means corrects the amount of fuel to be supplied to each cylinder according to the calculated second correction value. Further, the first correction value-calculating means calculates the first correction value, on a cylinder-by-cylinder basis, such that the identified plurality of model parameters converge to an average value thereof. Thus, the first correction value is calculated such that the identified plurality of model parameters converge to an average value thereof, and therefore it is possible to correct variation in air-fuel ratio between the cylinders, whereby it is possible to prevent the control process for causing the air-fuel ratio parameter to converge to a predetermined target value and the control process for correcting variation in air-fuel ratio between the cylinders from interfering with each other, thereby ensuring stability of the air-fuel ratio control.

Preferably, the control system further comprises learned correction value-calculating means for calculating a learned correction value of the first correction value with a sequential statistical algorithm, on a cylinder-by-cylinder basis, and the first fuel amount-correcting means corrects the amount of fuel further according to the calculated learned correction value, on a cylinder-by-cylinder basis.

As described hereinbefore, although the least-squares method is generally employed as the identifying computational algorithm, in the identifying computation by this method, after collecting a plurality of numbers of various data for computation, the computation is executed collectively based on the collected data. Therefore, at the start of the air-fuel ratio control, the identification of the model parameter is not executed until completion of collection of the data. This makes it impossible to calculate the first correction value based on the identified value of the model parameter, which can degrade the controllability of the air-fuel ratio control. In contrast, with the arrangement of the present preferred embodiment of the control system, the learned correction value of the first correction value is calculated with the sequential statistical algorithm, which enables the first correction value to be corrected by the learned correction value calculated every control cycle even at the start of the air-fuel ratio control. Therefore, by setting the initial value of the first correction value in advance, or by using the learned correction value calculated in the preceding operation of the engine as the initial value of the learned correction value of the current operation, it is possible, even before the identification of the model parameter is started at the start of the air-fuel ratio control, to always correct the first correction value by the learned correction value calculated every control cycle, whereby the controllability at the start of the air-fuel ratio control can be enhanced. This makes it possible, when a catalyst is provided in the exhaust passage, to enhance the emission reduction rate of the catalyst at the start of the air-fuel ratio control.

More preferably, the control system further comprises operating condition parameter-detecting means for detecting an operating condition parameter indicative of an operating condition of the engine, and the learned correction value-calculating means calculates the learned correction value using a regression equation in which the learned correction value is used as a dependent variable and the detected operating condition parameter is used as an independent variable, and calculates a regression coefficient and a constant term of the regression equation with the sequential statistical algorithm.

With the arrangement of the preferred embodiment, the learned correction value of the first correction value is calculated using a regression equation in which the learned correction value of the first correction value is used as a dependent variable and the detected operating condition parameter is used as an independent variable, and the regression coefficient and the constant term of the regression equation are calculated with the sequential statistical algorithm. Therefore, even when the engine is in a drastically changing operating condition, such as a transient operating condition, causing a sudden change of the air-fuel ratio, which makes it difficult to estimate the air-fuel ratio, it is possible to calculate the learned correction value as a value in which the actual state of the air-fuel ratio of each cylinder is properly reflected, thereby further enhancing the controllability of the air-fuel ratio control.

Preferably, the first correction value-calculating means calculates a correction value component contained in the first correction value based on a difference between the identified model parameters and a predetermined target value.

With the arrangement of this preferred embodiment, the first correction value-calculating means calculates the correction value component contained in the first correction value based on the difference between the identified model parameters and the predetermined target value. Therefore, the amount of fuel can be corrected such that model parameters converge to the predetermined target value, thereby providing control on the air-fuel ratio, on a cylinder-by-cylinder basis, such that the air-fuel ratio converges to a predetermined value without causing a steady-state deviation.

More preferably, the first correction value-calculating means calculates other correction value components than the correction value component contained in the first correction value, based on the identified model parameters.

With the arrangement of this preferred embodiment, the first correction value contains not only the correction value component determined based on the difference between the model parameters and the predetermined target value, but also the other correction value components determined based on the model parameters. Therefore, e.g. when the amount of fuel is controlled, on a cylinder-by-cylinder basis, such that the model parameters converge to the predetermined target value, the air-fuel ratio can be controlled, on a cylinder-by-cylinder basis, such that it converges to the predetermined value without causing overshooting or an oscillatory behavior, with stability.

Preferably, the first correction value-calculating means calculates the first correction value according to the model parameters with a response-specified control algorithm.

With the arrangement of this preferred embodiment, the first correction value is determined according to the model parameters with the response-specified control algorithm, and therefore, it is possible to correct the amount of fuel, for example, such that model parameters converge to the predetermined target value, whereby the air-fuel ratio can be corrected, on a cylinder-by-cylinder basis, such that it converges to the predetermined value without causing overshooting or an oscillatory behavior, with stability.

Preferably, the identification means identifies the model parameters by a fixed gain method.

With the arrangement of the preferred embodiment, the model parameters are identified by the fixed gain method, and therefore, it is possible to reduce computational load on the identification means. This makes it possible to shorten the computing time of the first correction value, whereby it is possible to calculate the first correction value promptly and properly, on a cylinder-by-cylinder basis, as a value in which the behavior of the air-fuel ratio is properly reflected, even when the rate of change in the air-fuel ratio of each cylinder is high due to a transient operating condition of the engine. Further, when a method of identifying the model parameters by adding respective predetermined correction components to reference values thereof is employed as the fixed gain method, the identified values of the model parameters can be constrained to values close to the reference values, which makes it possible to prevent an increase in the rate of change in the air-fuel ratio from causing the actual state of the air-fuel ratio to be unsuitably reflected in the identified values of the model parameters, thereby making it possible to further enhance the stability of the air-fuel ratio control.

Preferably, the identification means identifies the model parameters by calculating respective model parameter reference values according to the operating condition parameter, and adding predetermined correction components to the calculated model parameter reference values, respectively.

With the arrangement of this preferred embodiment, the model parameters are identified by adding the respective predetermined correction components to the model parameter reference values calculated according to the operating condition parameter. This makes it possible to constrain the identified values of the model parameters to respective values close to the model parameter reference values, whereby even when the rate of change in the air-fuel ratio is high due to the influence of change in the operating condition of the engine, it is possible to promptly and properly calculate the first correction value, on a cylinder-by-cylinder basis, as a value in which the behavior of the air-fuel ratio is properly reflected, thereby further enhancing the stability of the control.

Preferably, the control system further comprises delay means for delaying the air-fuel ratio parameter by a predetermined delay time period, and the identification means identifies the model parameters according to the delayed air-fuel ratio parameter and the plurality of simulation values.

In general, in the internal combustion engine, there is a predetermined dead time from a time that the mixture supplied to each cylinder has burned to a time that the resulting exhaust gases reach the collecting section of the exhaust passage or a location downstream of the collecting section. However, with the arrangement of this preferred embodiment, the model parameter is identified according to the delayed air-fuel ratio parameter, which is delayed by the predetermined dead time, and the plurality of model parameters. Therefore, it is possible to identify the model parameter with accuracy while taking the dead time into account, thereby further enhancing the stability of the control.

To attain the second object, in a third aspect of the present invention, there is provided a control system for an internal combustion engine including one intake passage, a plurality of intake passages branching from the one intake passage, and a plurality of cylinders connected to the plurality of intake passages extend, respectively, the control system controlling an amount of fuel to be supplied to the plurality of cylinders, on a cylinder-by-cylinder basis, thereby controlling an air-fuel ratio of exhaust gases emitted from the plurality of cylinders, the control system comprising:

fuel amount-determining means for determining an amount of fuel to be supplied to each of the plurality of cylinders;

intake air amount parameter-detecting means disposed in the one intake passage, for detecting an intake air amount parameter indicative of an amount of intake air;

simulation value-generating means for generating a plurality of simulation values simulating respective behaviors of amounts of intake air to be drawn into the plurality of cylinders;

estimation means for estimating an estimation value of the intake air amount parameter based on a model defining a relationship between the estimation value and the plurality of simulation values;

identification means for identifying a plurality of model parameters of the model according to the detected intake air amount parameter and the generated plurality of simulation values, such that the estimation value of the intake air amount parameter becomes equal to the detected intake air amount parameter;

third correction value-calculating means for calculating a third correction value for correcting the amount of fuel to be supplied to the plurality of cylinders, according to the identified plurality of model parameters, on a cylinder-by-cylinder basis; and third fuel amount-correcting means for correcting the determined amount of fuel according to the calculated third correction value, on a cylinder-by-cylinder basis.

With the arrangement of the control system according to the third aspect of the invention, the fuel amount-determining means determines the amount of fuel to be supplied to each cylinder, and the intake air amount parameter-detecting means disposed in the one intake passage detects the intake air amount parameter indicative of the amount of intake air. The estimation means estimates the estimation value of the intake air amount parameter based on the model defining the relationship between the estimation value and the plurality of simulation values simulating respective behaviors of amounts of intake air to be drawn into the plurality of cylinders, and the identification means identifies the plurality of model parameters of the model such that the estimation value of the intake air amount parameter becomes equal to the detected intake air amount parameter. The third correction value-calculating means calculates the third correction value for correcting the amount of fuel to be supplied to the plurality of cylinders, according to the identified plurality of model parameters, on a cylinder-by-cylinder basis, and the third fuel amount-correcting means corrects the determined fuel amount according to the calculated third correction value, on a cylinder-by-cylinder basis. Thus, the plurality of model parameters are identified such that the estimation value of the intake air amount parameter becomes equal to the detected intake air amount parameter, which makes it possible to identify the plurality of model parameters as values in which the actual behaviors of amounts of intake air drawn into the cylinders are reflected therein, i.e. variation in intake air amount between the cylinders is reflected therein. Therefore, by correcting the amount of fuel to be supplied to each cylinder according to the third correction value calculated according to the identified values of the plurality of model parameters, on a cylinder-by-cylinder basis, it is possible to properly correct variation in intake air amount between the cylinders. Further, by using an onboard identifier as the identification means, it is possible to calculate the third correction value based on the model parameters identified in real time. This makes it possible, differently from the conventional control system, even when the dynamic characteristics of the controlled object are changed due to variation in the response of the intake air amount parameter-detecting means, and aging of the same, to correct the fuel amount such that variation in intake air amount between the cylinders is corrected while causing changes in the dynamic characteristics of the controlled object to be reflected in the model. As a result, even when the control system is applied to an internal combustion engine having a complicated exhaust system layout, it is possible to properly and promptly correct variation in intake air amount between the cylinders, and thereby control the air-fuel ratio with accuracy. That is, it is possible to realize a highly robust air-fuel ratio control having a large margin of stability, and thereby, when a catalyst is provided in the exhaust passage, maintain an excellent emission reduction rate of the catalyst.

Preferably, the engine includes a plurality of exhaust passages extending from the plurality of cylinders, respectively, and one exhaust passage into which the plurality of exhaust passages are combined, and the control system further comprises intake air amount parameter-detecting means for detecting an intake air amount parameter indicative of an air-fuel ratio of exhaust gases in the one exhaust passage, fourth correction value-calculating means for calculating a fourth correction value for correcting the amount of fuel to be supplied to each cylinder, such that the detected air-fuel ratio parameter is caused to converge to a predetermined target value, and fourth fuel amount-correcting means for correcting the amount of fuel to be supplied to each cylinder according to the calculated fourth correction value, the third correction value-calculating means calculating the third correction value, on a cylinder-by-cylinder basis, such that the identified plurality of model parameters converge to an average value thereof.

With the arrangement of this preferred embodiment, the fourth correction value-calculating means calculates the fourth correction value for correcting the amount of fuel to be supplied to each cylinder, such that the air-fuel ratio parameter is caused to converge to the predetermined target value, and the fourth fuel amount-correcting means corrects the amount of fuel to be supplied to each cylinder according to the calculated fourth correction value. Further, the third correction value-calculating means calculates the third correction value, on a cylinder-by-cylinder basis, such that the identified plurality of model parameters converge to an average value thereof. Thus, the third correction value is calculated such that the identified plurality of model parameters converge to an average value thereof, which makes it possible to correct variation in intake air amount between the cylinders, whereby it is possible to prevent the control process for causing the air-fuel ratio parameter to converge to the predetermined target value and the control process for correcting variation in intake air amount between the cylinders from interfering with each other, thereby ensuring stability of the air-fuel ratio control.

Preferably, the control system further comprises learned correction value-calculating means for calculating a learned correction value of the third correction value with a sequential statistical algorithm, on a cylinder-by-cylinder basis, and the third fuel amount-correcting means corrects the amount of fuel further according to the calculated learned correction value, on a cylinder-by-cylinder basis.

As described hereinbefore, when the least-squares method is employed as the identifying computational algorithm, the identification of the model parameter is not executed until completion of collection of the data at the start of the control, which makes it impossible to calculate the third correction value based on the identified value of the model parameter, which can degrade the controllability of the air-fuel ratio control. In contrast, with the arrangement of the present preferred embodiment of the control system, the learned correction value of the third correction value is calculated with the sequential statistical algorithm, which enables the third correction value to be corrected by the learned correction value calculated every control cycle even at the start of the control. Therefore, by setting the initial value of the third correction value in advance, or by using the learned correction value calculated in the preceding operation of the engine as the initial value of the learned correction value of the current operation, it is possible, even before the identification of the model parameter is started at the start of the air-fuel ratio control, to always correct the third correction value by the learned correction value calculated every control cycle, whereby the controllability at the start of the air-fuel ratio control can be enhanced. This makes it possible, when a catalyst is provided in the exhaust passage, to enhance the emission reduction rate of the catalyst at the start of the air-fuel ratio control.

More preferably, the control system further comprises operating condition parameter-detecting means for detecting an operating condition parameter indicative of an operating condition of the engine, and the learned correction value-calculating means calculates the learned correction value using a regression equation in which the learned correction value is used as a dependent variable and the detected operating condition parameter is used as an independent variable, and calculates a regression coefficient and a constant term of the regression equation with the sequential statistical algorithm.

With the arrangement of the preferred embodiment, the learned correction value of the third correction value is calculated using the regression equation in which the learned correction value is used as the dependent variable and the detected operating condition parameter is used as the independent variable, and the regression coefficient and the constant term of the regression equation are calculated with the sequential statistical algorithm. Therefore, even when the engine is in a drastically changing operating condition, such as a transient operating condition, causing a sudden change of the air-fuel ratio, which makes it difficult to estimate the first internal variable, it is possible to calculate the learned correction value as a value in which the actual state of the amount of intake air supplied to each cylinder is properly reflected, thereby further enhancing the controllability of the air-fuel ratio control.

Preferably, the third correction value-calculating means calculates a correction value component contained in the third correction value based on a difference between the identified model parameters and a predetermined target value.

With the arrangement of this preferred embodiment, the third correction value-calculating means calculates the correction value component contained in the third correction value based on the difference between the identified model parameters and the predetermined target value. Therefore, the amount of fuel can be corrected such that the model parameters converge to a predetermined target value, thereby providing control on the intake air amount on a cylinder-by-cylinder basis such that the intake air amount converges to a predetermined value without causing a steady-state deviation.

More preferably, the third correction value-calculating means calculates other correction value components than the correction value component contained in the third correction value, based on the identified model parameters.

With the arrangement of this preferred embodiment, the third correction value contains not only the correction value component determined based on the difference between the model parameters and the predetermined target value, but also other correction value components determined based on the model parameters. Therefore, e.g. when the amount of fuel is controlled on a cylinder-by-cylinder basis such that the model parameters converge to the predetermined target value, the amount of intake air can be controlled, on a cylinder-by-cylinder basis, such that it converges to the predetermined value without causing overshooting or an oscillatory behavior, with stability.

Preferably, the third correction value-calculating means calculates the third correction value according to the model parameters with a response-specified control algorithm.

With the arrangement of this preferred embodiment, the third correction value is determined according to the model parameters with the response-specified control algorithm, and therefore, it is possible to correct the amount of fuel, for example, such that model parameters converge to the predetermined target value, whereby the amount of intake air can be corrected, on a cylinder-by-cylinder basis, such that it converges to the predetermined value without causing overshooting or an oscillatory behavior, with stability.

Preferably, the identification means identifies the model parameters by a fixed gain method.

With the arrangement of the preferred embodiment, the model parameters are identified by the fixed gain method, and therefore, it is possible to reduce computational load on the identification means. This makes it possible to shorten the computing time of the third correction value, whereby it is possible to calculate the third correction value promptly and properly, on a cylinder-by-cylinder basis, as a value in which the behavior of the amount of intake air is properly reflected, even when the rate of change in the amount of intake air of each cylinder is high due to a transient operating condition of the engine. Further, when a method of identifying the model parameters by adding respective predetermined correction components to reference values thereof is employed as the fixed gain method, the identified values of the model parameters can be constrained to values close to the reference values, which makes it possible to prevent an increase in the rate of change in the intake air amount from causing the actual state of the intake air amount to be unsuitably reflected in the identified values of the model parameters, thereby making it possible to further enhance the stability of the air-fuel ratio control.

Further preferably, the identification means identifies the model parameters by calculating respective model parameter reference values according to the operating condition parameter, and adding predetermined correction components to the calculated model parameter reference values, respectively.

With the arrangement of this preferred embodiment, the model parameters are identified by adding the respective predetermined correction components to the model parameter reference values calculated according to the operating condition parameter. This makes it possible to constrain the identified values of the model parameters to values close to the model parameter reference values, whereby even when the rate of change in the amount of intake air is high due to the influence of change in the operating condition of the engine, it is possible to promptly and properly calculate the third correction value, on a cylinder-by-cylinder basis, as a value in which the behavior of the amount of intake air is properly reflected, thereby further enhancing the stability of the control.

Preferably, the control system further comprises delay means for delaying the plurality of simulation values by a predetermined delay time period, and the identification means identifies the model parameters according to the intake air amount parameter and the delayed plurality of simulation values.

In general, in the internal combustion engine, there is a predetermined dead time before air drawn into the intake passage reaches each cylinder via the branches of the intake passage. However, with the arrangement of this preferred embodiment, the model parameters are identified according to the intake air amount parameter and the plurality of delayed simulation values, which is delayed by the predetermined dead time. Therefore, it is possible to identify the model parameters with accuracy while taking the dead time into account, thereby further enhancing the stability of the control.

Preferably, the control system further comprises filter means for generating a filtered value of the intake air amount parameter by subjecting the intake air amount parameter to predetermined filtering processing, and the identification means identifies the model parameters according to the generated filtered value of the intake air amount parameter and the plurality of simulation values.

In general, in this kind of control system, when the engine is in an operating condition in which the absolute value of the intake air amount parameter changes over a wide range, such as a transient operating condition, the identifying process by the identification means can be incapable of following up the change, which can cause delay in identification of the model parameters, causing degraded accuracy of the identification. In contrast, with the arrangement of this preferred embodiment, the identification means identifies the model parameters according to the filtered value of the intake air amount parameter obtained by subjecting the intake air amount parameter to predetermined filtering processing and the simulation values, and therefore, by properly setting the filtering characteristics of the filtering processing, it is possible, even when the absolute value of the intake air amount parameter changes over a wide range, the filtered value of the intake air amount parameter value can be generated as a value which positively contains information necessary for identification of the model parameter, i.e. information indicative of the behavior (variation and the like) of the intake air of each cylinder, and is suppressed in the range of change thereof. Therefore, by identifying using the filtered value and the simulation values, it is possible to suppress delay in the identification of the model parameters and enhance the accuracy of the identification, thereby further enhancing the stability and response of the air-fuel ratio control.

To attain the first object, in a fourth aspect of the present invention, there is provided a control method for controlling a plant, comprising:

a detection step of detecting a detection value reflecting a behavior of a first internal variable of the plant;

a simulation value-generating step of generating a simulation value simulating the behavior of the first internal variable;

an estimation step of estimating an estimation value of the detection value based on a model defining a relationship between the estimation value and the simulation value;

an identification step of identifying a model parameter of the model according to the detected detection value and the generated simulation value, such that the estimated estimation value becomes equal to the detected detection value; and a first control step of determining a first input to be inputted to the plant, according to the identified model parameter.

With the arrangement of the control method according to the fourth aspect of the present invention, it is possible to obtain the same advantageous effects as provided by the first aspect of the present invention.

Preferably, the control method further comprises a second control step of determining a second input to be inputted to the plant such that the detection value is caused to converge to a predetermined target value, the first internal variable comprising a plurality of first internal variables, the simulation value comprising a plurality of simulation values simulating respective behaviors of the plurality of first internal variables, the model parameter comprising a plurality of model parameters, and the identification step includes identifying the plurality of model parameters according to the detection value and the plurality of simulation values such that the estimated estimation value becomes equal to the detected detection value, the first control step including determining the first input such that the identified model parameters converge to an average value thereof.

Preferably, the first control step comprises a learned correction value-calculating step of calculating a learned correction value of the first input, using a sequential statistical algorithm, a correction step of correcting the first input using the calculated learned correction value, and an input step of inputting the corrected first input to the plant.

More preferably, the learned correction value-calculating step includes calculating the learned correction value of the first input using a regression equation in which the learned correction value is used as a dependent variable and a second internal variable having influence on the first internal variable is used as an independent variable, and calculating a regression coefficient and a constant term of the regression equation with the sequential statistical algorithm.

Preferably, the first control step includes determining an input component contained in the first input based on a difference between the model parameter and a predetermined target value.

More preferably, the first control step includes determining other input components than the input component contained in the first input, based on the model parameter.

Preferably, the first control step includes determining the first input according to the model parameter with a response-specified control algorithm.

Preferably, the identification step includes identifying the model parameter by a fixed gain method.

Further preferably, the identification step includes identifying the model parameter by calculating a model parameter reference value according to the second internal variable, and adding a predetermined correction component to the calculated model parameter reference value.

Preferably, the control method further comprises a delay step of delaying one of the detection value and the simulation value by a predetermined delay time period, and the identification step includes identifying the model parameter according to the delayed one of the detection value and the simulation value, and the other of the detection value and the simulation value.

Preferably, the control method further comprises a filter step of generating a filtered value of the detection value by subjecting the detection value to predetermined filtering processing, and the identification step includes identifying the model parameter according to the filtered value of the detection value and the simulation value.

With the arrangements of these preferred embodiments, it is possible to obtain the same advantageous effects as provided by the corresponding preferred embodiments of the first aspect of the present invention.

To attain the second object, in a fifth aspect of the present invention, there is provided a control method for an internal combustion engine including a plurality of cylinders, a plurality of exhaust passages extending from the plurality of cylinders, respectively, and one exhaust passage into which the plurality of exhaust passages are combined, the control method controlling an amount of fuel to be supplied to the plurality of cylinders, on a cylinder-by-cylinder basis, thereby controlling an air-fuel ratio of exhaust gases emitted from the plurality of cylinders, the control method comprising:

a fuel amount-determining step of determining an amount of fuel to be supplied to each of the plurality of cylinders;

an air-fuel ratio parameter-detecting step of detecting an air-fuel ratio parameter indicative of an air-fuel ratio of exhaust gases in the one exhaust passage;

a simulation value-generating step of generating a plurality of simulation values simulating respective behaviors of air-fuel ratios of exhaust gases emitted from the plurality of cylinders;

an estimation step of estimating an estimation value of the air-fuel ratio parameter based on a model defining a relationship between the estimation value and the plurality of simulation values;

an identification step of identifying a plurality of model parameters of the model according to the detected air-fuel ratio parameter and the generated plurality of simulation values, such that the estimation value of the air-fuel ratio parameter becomes equal to the detected air-fuel ratio parameter;

a first correction value-calculating step of calculating a first correction value for correcting the amount of fuel to be supplied to the plurality of cylinders, according to the identified plurality of model parameters, on a cylinder-by-cylinder basis; and a first fuel amount-correcting step of correcting the determined amount of fuel according to the calculated first correction value, on a cylinder-by-cylinder basis.

With the arrangement of the control method according to the fifth aspect of the present invention, it is possible to obtain the same advantageous effects as provided by the second aspect of the present invention.

Preferably, the control method further comprises a second correction value-calculating step of calculating a second correction value for correcting the amount of fuel to be supplied to each cylinder, such that the air-fuel ratio parameter is caused to converge to a predetermined target value, and a second fuel amount-correcting step of correcting the amount of fuel to be supplied to each cylinder according to the calculated second correction value, and the first correction value-calculating step includes calculating the first correction value, on a cylinder-by-cylinder basis, such that the identified plurality of model parameters converge to an average value thereof.

Preferably, the control method further comprises a learned correction value-calculating step of calculating a learned correction value of the first correction value with a sequential statistical algorithm, on a cylinder-by-cylinder basis, and the first fuel amount-correcting step includes correcting the amount of fuel further according to the calculated learned correction value, on a cylinder-by-cylinder basis.

More preferably, the control method further comprises an operating condition parameter-detecting step of detecting an operating condition parameter indicative of an operating condition of the engine, and the learned correction value-calculating step includes calculating the learned correction value using a regression equation in which the learned correction value is used as a dependent variable and the detected operating condition parameter is used as an independent variable, and calculating a regression coefficient and a constant term of the regression equation with the sequential statistical algorithm.

Preferably, the first correction value-calculating step includes calculating a correction value component contained in the first correction value based on a difference between the identified model parameters and a predetermined target value.

More preferably, the first correction value-calculating step includes calculating other correction value components than the correction value component contained in the first correction value, based on the identified model parameters.

Preferably, the first correction value-calculating step includes calculating the first correction value according to the model parameters with a response-specified control algorithm.

Preferably, the identification step includes identifying the model parameters by a fixed gain method.

Further preferably, the identification step includes identifying the model parameters by calculating respective model parameter reference values according to the operating condition parameter, and adding predetermined correction components to the calculated model parameter reference values, respectively.

Preferably, the control method further comprises a delay step of delaying the air-fuel ratio parameter by a predetermined delay time period, and the identification step includes identifying the model parameters according to the delayed air-fuel ratio parameter and the plurality of simulation values.

With the arrangements of these preferred embodiments, it is possible to obtain the same advantageous effects as provided by the corresponding preferred embodiments of the second aspect of the present invention.

To attain the second object, in a sixth aspect of the present invention, there is provided a control method for an internal combustion engine including one intake passage, a plurality of intake passages branching from the one intake passage, and a plurality of cylinders connected to the plurality of intake passages extend, respectively, the control method controlling an amount of fuel to be supplied to the plurality of cylinders, on a cylinder-by-cylinder basis, thereby controlling an air-fuel ratio of exhaust gases emitted from the plurality of cylinders, the control method comprising:

a fuel amount-determining step of determining an amount of fuel to be supplied to each of the plurality of cylinders;

an intake air amount parameter-detecting step of detecting an intake air amount parameter indicative of an amount of intake air in the one intake passage;

a simulation value-generating step of generating a plurality of simulation values simulating respective behaviors of amounts of intake air to be drawn into the plurality of cylinders;

an estimation step of estimating an estimation value of the intake air amount parameter based on a model defining a relationship between the estimation value and the plurality of simulation values;

an identification step of identifying a plurality of model parameters of the model according to the detected intake air amount parameter and the generated plurality of simulation values, such that the estimation value of the intake air amount parameter becomes equal to the detected intake air amount parameter;

a third correction value-calculating step of calculating a third correction value for correcting the amount of fuel to be supplied to the plurality of cylinders, according to the identified plurality of model parameters, on a cylinder-by-cylinder basis; and a third fuel amount-correcting step of correcting the determined amount of fuel according to the calculated third correction value, on a cylinder-by-cylinder basis.

With the arrangement of the control method according to the sixth aspect of the present invention, it is possible to obtain the same advantageous effects as provided by the first aspect of the present invention.

Preferably, the engine includes a plurality of exhaust passages extending from the plurality of cylinders, respectively, and one exhaust passage into which the plurality of exhaust passages are combined, and the control method further comprises an air-fuel ratio parameter-detecting step of detecting an air-fuel ratio parameter indicative of an air-fuel ratio of exhaust gases in the one exhaust passage, a fourth correction value-calculating step of calculating a fourth correction value for correcting the amount of fuel to be supplied to each cylinder, such that the detected air-fuel ratio parameter is caused to converge to a predetermined target value, and a fourth fuel amount-correcting step of correcting the amount of fuel to be supplied to each cylinder according to the calculated fourth correction value, the third correction value-calculating step including calculating the third correction value, on a cylinder-by-cylinder basis, such that the identified plurality of model parameters converge to an average value thereof.

Preferably, the control method further comprises a learned correction value-calculating step of calculating a learned correction value of the third correction value with a sequential statistical algorithm, on a cylinder-by-cylinder basis, and the third fuel amount-correcting step includes correcting the amount of fuel further according to the calculated learned correction value, on a cylinder-by-cylinder basis.

More preferably, the control method further comprises an operating condition parameter-detecting step of detecting an operating condition parameter indicative of an operating condition of the engine, and the learned correction value-calculating step includes calculating the learned correction value using a regression equation in which the learned correction value is used as a dependent variable and the detected operating condition parameter is used as an independent variable, and calculating a regression coefficient and a constant term of the regression equation with the sequential statistical algorithm.

Preferably, the third correction value-calculating step includes calculating a correction value component contained in the third correction value based on a difference between the identified model parameters and a predetermined target value.

More preferably, the third correction value-calculating step includes calculating other correction value components than the correction value component contained in the third correction value, based on the identified model parameters.

Preferably, the third correction value-calculating step includes calculating the third correction value according to the model parameters with a response-specified control algorithm.

Preferably, the identification step includes identifying the model parameters by a fixed gain method.

Further preferably, the identification step includes identifying the model parameters by calculating respective model parameter reference values according to the operating condition parameter, and adding predetermined correction components to the calculated model parameter reference values, respectively.

Preferably, the control method further comprises a delay step of delaying the plurality of simulation values by a predetermined delay time period, and the identification step includes identifying the model parameters according to the intake air amount parameter and the delayed plurality of simulation values.

Preferably, the control method further comprises a filter step of generating a filtered value of the intake air amount parameter by subjecting the intake air amount parameter to predetermined filtering processing, and the identification step includes identifying the model parameters according to the generated filtered value of the intake air amount parameter and the plurality of simulation values.

With the arrangements of these preferred embodiments, it is possible to obtain the same advantageous effects as provided by the corresponding preferred embodiments of the third aspect of the present invention.

To attain the first object, in a seventh aspect of the present invention, there is provided a control unit including a control program for causing a computer to control a plant, wherein the control program causes the computer to detect a detection value reflecting a behavior of a first internal variable of the plant, generate a simulation value simulating the behavior of the first internal variable, estimate an estimation value of the detection value based on a model defining a relationship between the estimation value and the simulation value, identify a model parameter of the model according to the detected detection value and the generated simulation value, such that the estimated estimation value becomes equal to the detected detection value, and determine a first input to be inputted to the plant, according to the identified model parameter.

With the arrangement of the control unit according to the seventh aspect of the present invention, it is possible to obtain the same advantageous effects as provided by the first aspect of the present invention.

Preferably, the control program causes the computer to determine a second input to be inputted to the plant such that the detection value is caused to converge to a predetermined target value, the first internal variable comprising a plurality of first internal variables, the simulation value comprising a plurality of simulation values simulating respective behaviors of the plurality of first internal variables, the model parameter comprising a plurality of model parameters; when the control program causes the computer to identify the model parameter, the control program causes the computer to identify the plurality of model parameters according to the detection value and the plurality of simulation values such that the estimated estimation value becomes equal to the detected detection value; and when the control program causes the computer to determine the first input, the control program causes the computer to determine the first input such that the identified model parameters converge to an average value thereof.

Preferably, when the control program causes the computer to determine the first input, the control program causes the computer to calculate a learned correction value of the first input, using a sequential statistical algorithm, correct the first input using the calculated learned correction value, and input the corrected first input to the plant.

More preferably, when the control program causes the computer to calculate the learned correction value, the control program causes the computer to calculate the learned correction value of the first input using a regression equation in which the learned correction value is used as a dependent variable and a second internal variable having influence on the first internal variable is used as an independent variable, and calculate a regression coefficient and a constant term of the regression equation with the sequential statistical algorithm.

Preferably, when the control program causes the computer to determine the first input, the control program causes the computer to determine an input component contained in the first input based on a difference between the model parameter and a predetermined target value.

More preferably, when the control program causes the computer to determine the first input, the control program causes the computer to determine other input components than the input component contained in the first input, based on the model parameter.

Preferably, when the control program causes the computer to determine the first input, the control program causes the computer to determine the first input according to the model parameter with a response-specified control algorithm.

Preferably, when the control program causes the computer to identify the model parameter, the control program causes the computer to identify the model parameter by a fixed gain method.

Further preferably, when the control program causes the computer to identify the model parameter, the control program causes the computer to identify the model parameter by calculating a model parameter reference value according to the second internal variable, and add a predetermined correction component to the calculated model parameter reference value.

Preferably, the control program causes the computer to delay one of the detection value and the simulation value by a predetermined delay time period, and when the control program causes the computer to identify the model parameter, the control program causes the computer to identify the model parameter according to the delayed one of the detection value and the simulation value, and the other of the detection value and the simulation value.

Preferably, the control program causes the computer to generate a filtered value of the detection value by subjecting the detection value to predetermined filtering processing, and when the control program causes the computer to identify the model parameter, the control program causes the computer to identify the model parameter according to the filtered value of the detection value and the simulation value.

With the arrangements of these preferred embodiments, it is possible to obtain the same advantageous effects as provided by the corresponding preferred embodiments of the first aspect of the present invention.

To attain the second object, in an eighth aspect of the present invention, there is provided a control unit for an internal combustion engine including a plurality of cylinders, a plurality of exhaust passages extending from the plurality of cylinders, respectively, and one exhaust passage into which the plurality of exhaust passages are combined, the control unit including a control program for causing a computer to perform a control process for controlling an amount of fuel to be supplied to the plurality of cylinders, on a cylinder-by-cylinder basis, thereby controlling an air-fuel ratio of exhaust gases emitted from the plurality of cylinders, wherein the control program causes the computer to determine an amount of fuel to be supplied to each of the plurality of cylinders, detect an air-fuel ratio parameter indicative of an air-fuel ratio of exhaust gases in the one exhaust passage, generate a plurality of simulation values simulating respective behaviors of air-fuel ratios of exhaust gases emitted from the plurality of cylinders, estimate an estimation value of the air-fuel ratio parameter based on a model defining a relationship between the estimation value and the plurality of simulation values, identify a plurality of model parameters of the model according to the detected air-fuel ratio parameter and the generated plurality of simulation values, such that the estimation value of the air-fuel ratio parameter becomes equal to the detected air-fuel ratio parameter, calculate a first correction value for correcting the amount of fuel to be supplied to the plurality of cylinders, according to the identified plurality of model parameters, on a cylinder-by-cylinder basis, and correct the determined amount of fuel according to the calculated first correction value, on a cylinder-by-cylinder basis.

With the arrangement of the control unit according to the eighth aspect of the present invention, it is possible to obtain the same advantageous effects as provided by the second aspect of the present invention.

Preferably, the control program causes the computer to calculate a second correction value for correcting the amount of fuel to be supplied to each cylinder, such that the air-fuel ratio parameter is caused to converge to a predetermined target value, and correct the amount of fuel to be supplied to each cylinder according to the calculated second correction value, and when the control program causes the computer to calculate the first correction value, the control program causes the computer to calculate the first correction value, on a cylinder-by-cylinder basis, such that the identified plurality of model parameters converge to an average value thereof.

Preferably, the control program causes the computer to calculate a learned correction value of the first correction value with a sequential statistical algorithm, on a cylinder-by-cylinder basis, and when the control program causes the computer to correct the amount fuel, the control program causes the computer to correct the amount of fuel further according to the calculated learned correction value, on a cylinder-by-cylinder basis.

More preferably, the control program causes the computer to detect an operating condition parameter indicative of an operating condition of the engine, and when the control program causes the computer to calculate the learned correction value, the control program causes the computer to calculate the learned correction value using a regression equation in which the learned correction value is used as a dependent variable and the detected operating condition parameter is used as an independent variable, and calculate a regression coefficient and a constant term of the regression equation with the sequential statistical algorithm.

Preferably, when the control program causes the computer to calculate the first correction value, the control program causes the computer to calculate a correction value component contained in the first correction value based on a difference between the identified model parameters and a predetermined target value.

More preferably, when the control program causes the computer to calculate the first correction value, the control program causes the computer to calculate other correction value components than the correction value component contained in the first correction value, based on the identified model parameters.

Preferably, when the control program causes the computer to calculate the first correction value, the control program causes the computer to calculate the first correction value according to the model parameters with a response-specified control algorithm.

Preferably, when the control program causes the computer to identify the model parameters of the model, the control program causes the computer to identify the model parameters by a fixed gain method.

Further preferably, when the control program causes the computer to identify the model parameters of the model, the control program causes the computer to identify the model parameters by calculating respective model parameter reference values according to the operating condition parameter, and adding predetermined correction components to the calculated model parameter reference values, respectively.

Preferably, the control program causes the computer to delay the air-fuel ratio parameter by a predetermined delay time period, and when the control program causes the computer to identify the model parameters of the model, the control program causes the computer to identify the model parameters according to the delayed air-fuel ratio parameter and the plurality of simulation values.

With the arrangements of these preferred embodiments, it is possible to obtain the same advantageous effects as provided by the corresponding preferred embodiments of the second aspect of the present invention.

To attain the second object, in a ninth aspect of the present invention, there is provided a control unit for an internal combustion engine including one intake passage, a plurality of intake passages branching from the one intake passage, and a plurality of cylinders connected to the plurality of intake passages extend, respectively, the control unit including a control program for causing a computer to perform a control process for controlling an amount of fuel to be supplied to the plurality of cylinders, on a cylinder-by-cylinder basis, thereby controlling an air-fuel ratio of exhaust gases emitted from the plurality of cylinders, wherein the control program causes the computer to determine an amount of fuel to be supplied to each of the plurality of cylinders, detect an intake air amount parameter indicative of an amount of intake air in the one intake passage, generate a plurality of simulation values simulating respective behaviors of amounts of intake air to be drawn into the plurality of cylinders, estimate an estimation value of the intake air amount parameter based on a model defining a relationship between the estimation value and the plurality of simulation values, identifying a plurality of model parameters of the model according to the detected intake air amount parameter and the generated plurality of simulation values, such that the estimation value of the intake air amount parameter becomes equal to the detected intake air amount parameter, calculate a third correction value for correcting the amount of fuel to be supplied to the plurality of cylinders, according to the identified plurality of model parameters, on a cylinder-by-cylinder basis, and correct the determined amount of fuel according to the calculated third correction value, on a cylinder-by-cylinder basis.

With the arrangement of the control unit according to the ninth aspect of the present invention, it is possible to obtain the same advantageous effects as provided by the third aspect of the present invention.

Preferably, the engine includes a plurality of exhaust passages extending from the plurality of cylinders, respectively, and one exhaust passage into which the plurality of exhaust passages are combined; the control program causes the computer to detect an air-fuel ratio parameter indicative of an air-fuel ratio of exhaust gases in the one exhaust passage, calculate a fourth correction value for correcting the amount of fuel to be supplied to each cylinder, such that the detected air-fuel ratio parameter is caused to converge to a predetermined target value, and correct the amount of fuel to be supplied to each cylinder according to the calculated fourth correction value; and when the control program causes the computer to calculate the third correction value, the control program causes the computer to calculate the third correction value, on a cylinder-by-cylinder basis, such that the identified plurality of model parameters converge to an average value thereof.

Preferably, the control program causes the computer to calculate a learned correction value of the third correction value with a sequential statistical algorithm, on a cylinder-by-cylinder basis, and when the control program causes the computer to correct the amount of fuel, the control program causes the computer to correct the amount of fuel further according to the calculated learned correction value, on a cylinder-by-cylinder basis.

More preferably, the control program causes the computer to detect an operating condition parameter indicative of an operating condition of the engine, and when the control program causes the computer to calculate the learned correction value, the control program causes the computer to calculate the learned correction value using a regression equation in which the learned correction value is used as a dependent variable and the detected operating condition parameter is used as an independent variable, and calculate a regression coefficient and a constant term of the regression equation with the sequential statistical algorithm.

Preferably, when the control program causes the computer to calculate the third correction value, the control program causes the computer to calculate a correction value component contained in the third correction value based on a difference between the identified model parameters and a predetermined target value.

More preferably, when the control program causes the computer to calculate the third correction value, the control program causes the computer to calculate other correction value components than the correction value component contained in the third correction value, based on the identified model parameters.

Preferably, when the control program causes the computer to calculate the third correction value, the control program causes the computer to calculate the third correction value according to the model parameters with a response-specified control algorithm.

Preferably, when the control program causes the computer to identify the model parameters of the model, the control program causes the computer to identify the model parameters by a fixed gain method.

Further preferably, when the control program causes the computer to identify the model parameters of the model, the control program causes the computer to identify the model parameters by calculating respective model parameter reference values according to the operating condition parameter, and adding predetermined correction components to the calculated model parameter reference values, respectively.

Preferably, the control program causes the computer to delay the plurality of simulation values by a predetermined delay time period, and when the control program causes the computer to identify the model parameters of the model, the control program causes the computer to identify the model parameters according to the intake air amount parameter and the delayed plurality of simulation values.

Preferably, the control program causes the computer to generate a filtered value of the intake air amount parameter by subjecting the intake air amount parameter to predetermined filtering processing, and when the control program causes the computer to identify the model parameters of the model, the control program causes the computer to identify the model parameters according to the generated filtered value of the intake air amount parameter and the plurality of simulation values.

With the arrangements of these preferred embodiments, it is possible to obtain the same advantageous effects as provided by the corresponding preferred embodiments of the third aspect of the present invention.

The above and other objects, features, and advantages of the invention will become more apparent from the following detailed description taken in conjunction with the accompanying drawings.

BRIEF DESCRIPTION OF THE DRAWINGS

FIG. 4 is a diagram showing mathematical expressions of the calculation algorithm with which the air-fuel ration variation coefficient Φ is calculated by the adaptive observer;

FIG. 7 is a diagram showing mathematical expressions of an I-PD control algorithm with which an air-fuel ratio variation correction coefficient KOBSV is calculated;

FIG. 9 is a diagram showing mathematical expressions of a calculation algorithm with which the learned correction value $KOBSV\_LS_i$ of the air-fuel ratio variation correction coefficient is calculated;

FIG. 10 is a diagram showing mathematical expressions useful for explaining a calculation algorithm with which a feedback correction coefficient KSTR is calculated by a second air-fuel ratio controller;

FIG. 11 is a diagram showing mathematical expressions of a calculation algorithm with which the feedback correction coefficient KSTR is calculated by the second air-fuel ratio controller;

FIG. 20 is a diagram showing respective groups of mathematical expressions of a PID control algorithm, an IP-D control algorithm, and a response-specified control algorithm with each of which the air-fuel ratio variation correction coefficient $KOBSV_i$ is calculated;

FIG. 21 is a diagram showing an identification algorithm with which the vector ϕ of the air-fuel ratio variation coefficient is identified by a fixed gain method to which a δ correcting method is applied;

FIG. 27 is a diagram showing mathematical expressions of the calculation algorithm with which the intake air amount variation coefficient Ψ is calculated by the adaptive observer;

FIG. 32 is a diagram showing mathematical expressions of a calculation algorithm with which the learned correction value KICYL_LS of the intake air amount variation correction coefficient is calculated;

FIG. 40 is a diagram showing mathematical expressions of the filter of the variation of the adaptive observer, and mathematical expressions of a calculation algorithm of the intake air amount variation coefficient Ψ;

FIG. 41 is a diagram showing respective groups of mathematical expressions of an IP-D control algorithm and a response-specified control algorithm with each of which the intake air amount variation correction coefficient $KICYL_i$ is calculated;

FIG. 42 is a diagram showing mathematical expressions of an identification algorithm with which the vector ψ of the intake air amount variation coefficient is identified by a fixed gain method to which the δ correction method is applied.

DETAILED DESCRIPTION OF PREFERRED EMBODIMENTS

Figure 1:
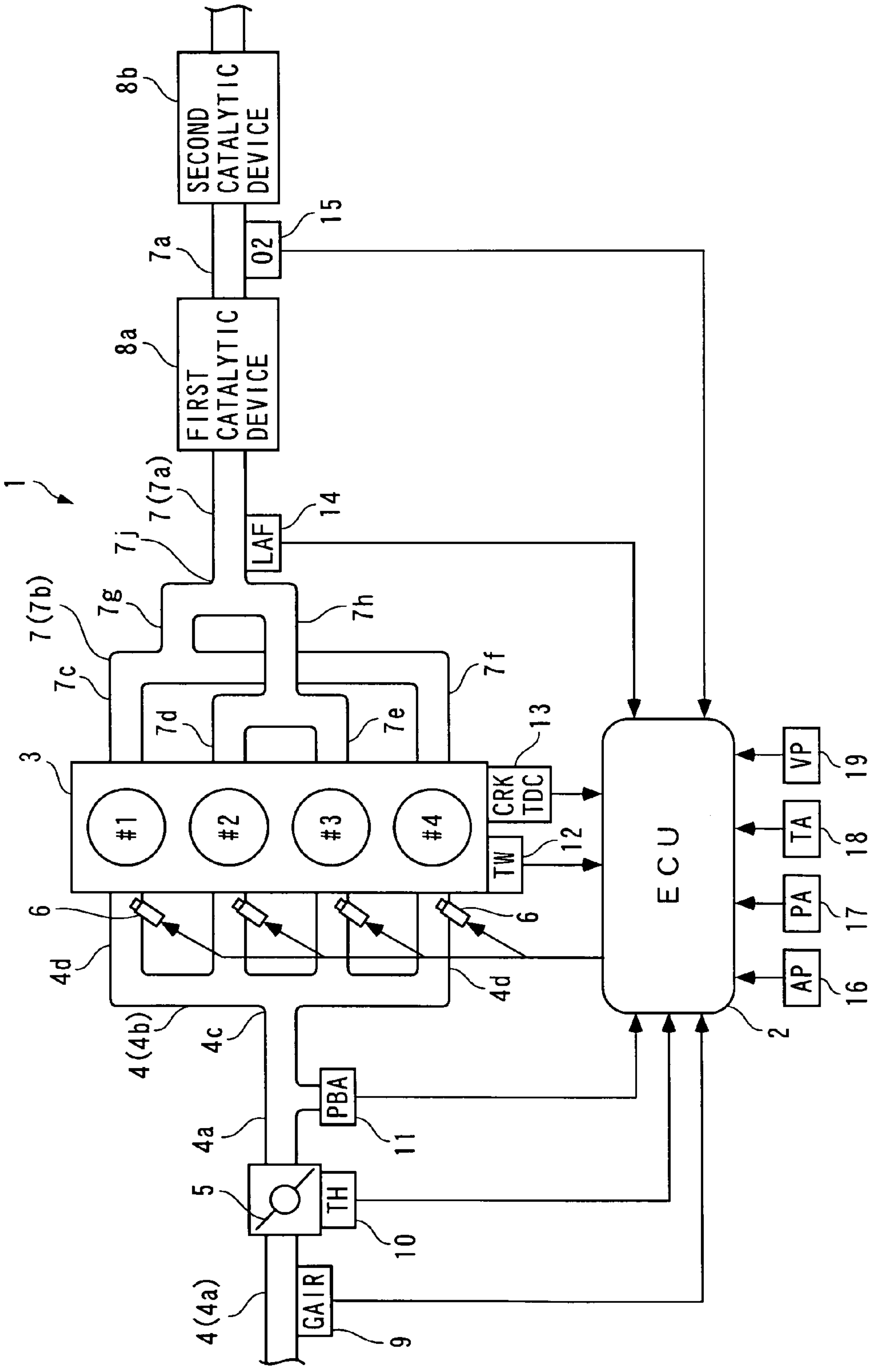
FIG. 1 is a block diagram schematically showing the arrangement of a control system according to a first embodiment of the present invention and an internal combustion engine to which the control system is applied.

The invention will now be described in detail with reference to drawings showing preferred embodiments thereof. Referring first to FIG. 1, there is schematically shown the arrangement of an control system 1 according to a first embodiment of the present invention and an internal combustion engine 3, as a plant, to which the control system 1 is applied. As shown in FIG. 1, the control system 1 includes an ECU 2 which controls the amount of fuel injected into the internal combustion engine (hereinafter simply referred to as "the engine") 3 according to operating conditions of the engine 3, to thereby control the air-fuel ratio of the mixture, as described in detail hereinafter.

The engine 3 is an inline four-cylinder gasoline engine installed on an automotive vehicle, not shown, and has first to fourth cylinders #1 to #4 (a plurality of cylinders). The engine 3 has an intake pipe 4 which includes a main pipe 4*a* (one intake air passage), and an intake manifold 4*b* connected thereto. A throttle valve 5 is arranged across an intermediate portion of the main pipe 4*a*.

At respective locations upstream and downstream of the throttle valve 5, there are arranged an air flow sensor 9 and an intake pipe absolute pressure sensor 11. The air flow sensor 9 detects the amount of intake air GAIR (detection value, intake air amount parameter) drawn into the engine via the intake pipe 4, and delivers a signal indicative of the detected amount of intake air to the ECU 2.

Further, an engine coolant temperature sensor 12 implemented e.g. by a thermistor is mounted in the cylinder block of the engine 3. The engine coolant temperature sensor 12 senses an engine coolant temperature TW which is the temperature of an engine coolant circulating through the cylinder block of the engine 3 and delivering a signal indicative of the sensed engine coolant temperature TW to the ECU 2.

A crank angle position sensor 13 (operating condition parameter-detecting means) is provided for a crankshaft, not shown, of the engine 3, for delivering a CRK signal and a TDC signal, which are both pulse signals, to the ECU 2 in accordance with rotation of the crankshaft.

Each pulse of the CRK signal is generated whenever the crankshaft rotates through a predetermined angle (e.g. 30 degrees). The ECU 2 determines a rotational speed (hereinafter referred to as "the engine speed") NE of the engine 3, based on the CRK signal. The TDC signal indicates that each piston, not shown, in an associated cylinder is in a predetermined crank angle position immediately before the TDC position at the start of the intake stroke, and each pulse of the TDC signal is generated whenever the crankshaft rotates through a predetermined angle.

On the other hand, the exhaust pipe 7 includes an exhaust manifold 7*b* connected to the four cylinders #1 to #4, and an main pipe 7*a* connected to a collecting section 7*j* of the exhaust manifold 7*b*. The exhaust manifold 7*b* is configured such that four exhaust pipe sections 7*c* to 7*f* (a plurality of exhaust passages) extending from the four cylinders #1 to #4 are combined into two collecting sections, and the two collecting Further, the intake pipe absolute pressure sensor 11 is implemented e.g. by a semiconductor pressure sensor, which detects the intake pipe absolute pressure PBA (detection value, intake air amount parameter) of the intake pipe 4, and delivers a signal indicative of the detected intake pipe absolute pressure PBA to the ECU 2. In the present embodiment, the air flow sensor 9 forms the detection means, the operating condition parameter-detecting means, and the intake air amount parameter-detecting means, while the intake pipe absolute pressure sensor 11 forms the detection means and the intake air amount parameter-detecting means.

In the vicinity of the throttle valve 5 disposed in the main pipe 4*a*, there is provided a throttle valve opening sensor 10 implemented e.g. by a potentiometer, for detecting the degree of opening (hereinafter referred to as "throttle valve opening") TH of the throttle valve 5 and delivering an electric signal indicative of the sensed throttle valve opening TH to the ECU 2.

The intake manifold 4*b* of the intake pipe 4 is comprised of a collecting section 4*c* (one intake passage) connected to the main pipe 4*a*, and four branch portions 4*d* (plurality of intake passages) branching from the collecting section 4*c* and connected to the four cylinders #1 to #4, respectively. In the branch portions 4*d*, injectors 6 are inserted at respective locations upstream of intake ports, not shown, for the cylinders. During operation of the engine 3, each injector 6 is controlled in respect of a fuel injection amount, i.e. a time period over which the injector 6 is open, and fuel injection timing, by a drive signal delivered from the ECU 2. sections are combined into one collecting section. That is, the exhaust manifold 7*b* is comprised of two exhaust pipe sections 7*c* and 7*f* extending from the respective first and fourth cylinders #1 and #4, a collecting section 7*g* into which these exhaust pipe sections 7*c* and 7*f* are combined, two exhaust pipe sections 7*d* and 7*e* extending from the respective second and third cylinders #2 and #3, and a collecting section 7*h* into which these exhaust pipe sections 7*d* and 7*e* are combined, and a collecting section 7*j* (one exhaust passage) into which the two collecting sections 7*g* and 7*h* are combined, all of these components being integrally formed in one piece. Due to such a configuration, the exhaust manifold 7*b* has a lower resistance to the flow of exhaust gases than a conventional exhaust manifold in which four exhaust pipe sections are directly combined into one collecting section. This enables the engine 3 to deliver higher power output and higher torque, compared with those having the conventional exhaust manifold.

A first catalytic device 8*a* and a second catalytic devices 8*b* are arranged in the exhaust pipe 7 from upstream to downstream in the mentioned order in a spaced relationship at respective locations of the main pipe 7*a* of the intake pipe 7. Each catalytic device 8 is a combination of a NOx catalyst and a three-way catalyst, and the NOx catalyst is comprised of a honeycomb structure base, an iridium catalyst (sintered body of silicon carbide whiskers carrying iridium and silica) coated on the surface of the honeycomb structure base, and Perovskite double oxide (sintered body of $LaCoO_3$ powder and silica) further coated on the iridium catalyst. The catalytic device 8 eliminates NOx from exhaust gases emitted during a lean burn operation of the engine 3 by oxidation-reduction reaction-catalyzing action of the NOx catalyst, and eliminates CO, HC, and NOx from exhaust gases emitted during other operations of the engine 3 than the lean burn operation by oxidation-reduction reaction-catalyzing action of the three-way catalyst.

An oxygen concentration sensor (hereinafter referred to as "the O2 sensor") 15 is inserted into the main pipe 7*a* between the first and second catalytic devices 8*a* and 8*b*. The O2 sensor 15 is comprised of a zirconia layer and platinum electrodes, and delivers to the ECU 2 an output Vout dependent on the concentration of oxygen contained in exhaust gases downstream of the first catalytic device 8*a*. The output Vout assumes a high-level voltage value (e.g. 0.8 V) when an air-fuel mixture having a richer air-fuel ratio than the stoichiometric air-fuel ratio has been burned, whereas it assumes a low-level voltage value (e.g. 0.2 V) when an air-fuel mixture having a leaner air-fuel ratio than the stoichiometric air-fuel ratio has been burned. Further, when the air-fuel ratio of the mixture is close to the stoichiometric air-fuel ratio, the output Vout assumes a predetermined target value Vop (e.g. 0.6 V) between the high-level and low-level voltage values.

Further, a LAF sensor 14 is mounted in the vicinity of the collecting section 7*d* of the exhaust manifold 7*a*. The LAF sensor 14 (detection means, air-fuel ratio parameter-detecting means) is formed by combining a sensor similar to the O2 sensor 15 and a detection circuit, such as a linearizer, and detects the concentration of oxygen contained in exhaust gases linearly over a wide range of the air-fuel ratio ranging from a rich region to a lean region, thereby delivering an output proportional to the sensed oxygen concentration to the ECU 2. The ECU 2 calculates a detected air-fuel ratio KACT (detection value, air-fuel ratio parameter) indicative of the air-fuel ratio of exhaust gases at the collecting section 7*j* based on the output from the LAF sensor 14. The detected air-fuel ratio KACT is expressed as an equivalent ratio proportional to the reciprocal of the air-fuel ratio.

Further, the ECU 2 has an accelerator pedal opening sensor 16; an atmospheric pressure sensor 17, an intake air temperature sensor 18, and a vehicle speed sensor 19, connected thereto. The accelerator pedal opening sensor 16 detects a depression amount (hereinafter referred to as "the accelerator pedal opening") AP of an accelerator pedal, not shown, of the vehicle and delivers a signal indicative of the sensed accelerator pedal opening AP to the ECU 12. Further, the atmospheric pressure sensor 17, the intake air temperature sensor 18, and the vehicle speed sensor 19 detect atmospheric pressure AP, intake air temperature TA, and vehicle speed VP, respectively, and delivers respective signals indicative of the detected atmospheric pressure AP, intake air temperature TA, and vehicle speed VP to the ECU 2.

Next, the ECU 2 will be described. The ECU 2 is implemented by a microcomputer including an input/output interface, a CPU, a RAM, and a ROM, none of which is shown. The ECU 2 determines operating conditions of the engine 3, based on the outputs from the aforementioned sensors 9 to 19. Further, the ECU 2 executes an air-fuel ratio control process, which will be described in detail hereinafter, according to control programs read from the ROM, using data stored in the RAM, and the like, to thereby calculate a target air-fuel ratio KCMD, a feedback correction coefficient KSTR, an air-fuel ratio variation correction coefficient $KOBSV_i$, and a learned correction value $KOBSV\_LS_i$ thereof. Furthermore, as described hereinafter, based on these calculated values of KCMD, KSTR, $KOBSV_i$, $KOBSV\_LS_i$, and so forth, the ECU 2 calculates a final fuel injection amount $TOUT_i$ for each injector 6, on a cylinder-by-cylinder basis, and drives the injector 6 by a drive signal generated based on the calculated final fuel injection amount $TOUT_i$, to thereby control the air-fuel ratio of the mixture, i.e. air-fuel ratio of exhaust gases, on a cylinder-by-cylinder basis. It should be noted that the subscript "i" in $TOUT_i$ represents a cylinder number indicative of a number assigned to each cylinder (i=1 to 4), and this also applies to the aforementioned air-fuel ratio variation correction coefficient $KOBSV_i$, and the learned correction value $KOBSV\_LS_i$, and parameters referred to hereinafter.

It should be noted that in the present embodiment, the ECU 2 forms simulation value-generating means, estimation means, identification means, first control means, second control means, learned correction value-calculating means, correction means, input means, delay means, fuel amount-determining means, first correction value-calculating means, first fuel amount-correcting means, second correction value-calculating means, second fuel amount-correcting means, operating condition parameter-detecting means, third correction value-calculating means, third fuel amount-correcting means, fourth correction value-calculating means, and fourth fuel amount-correcting means.

Figure 2:
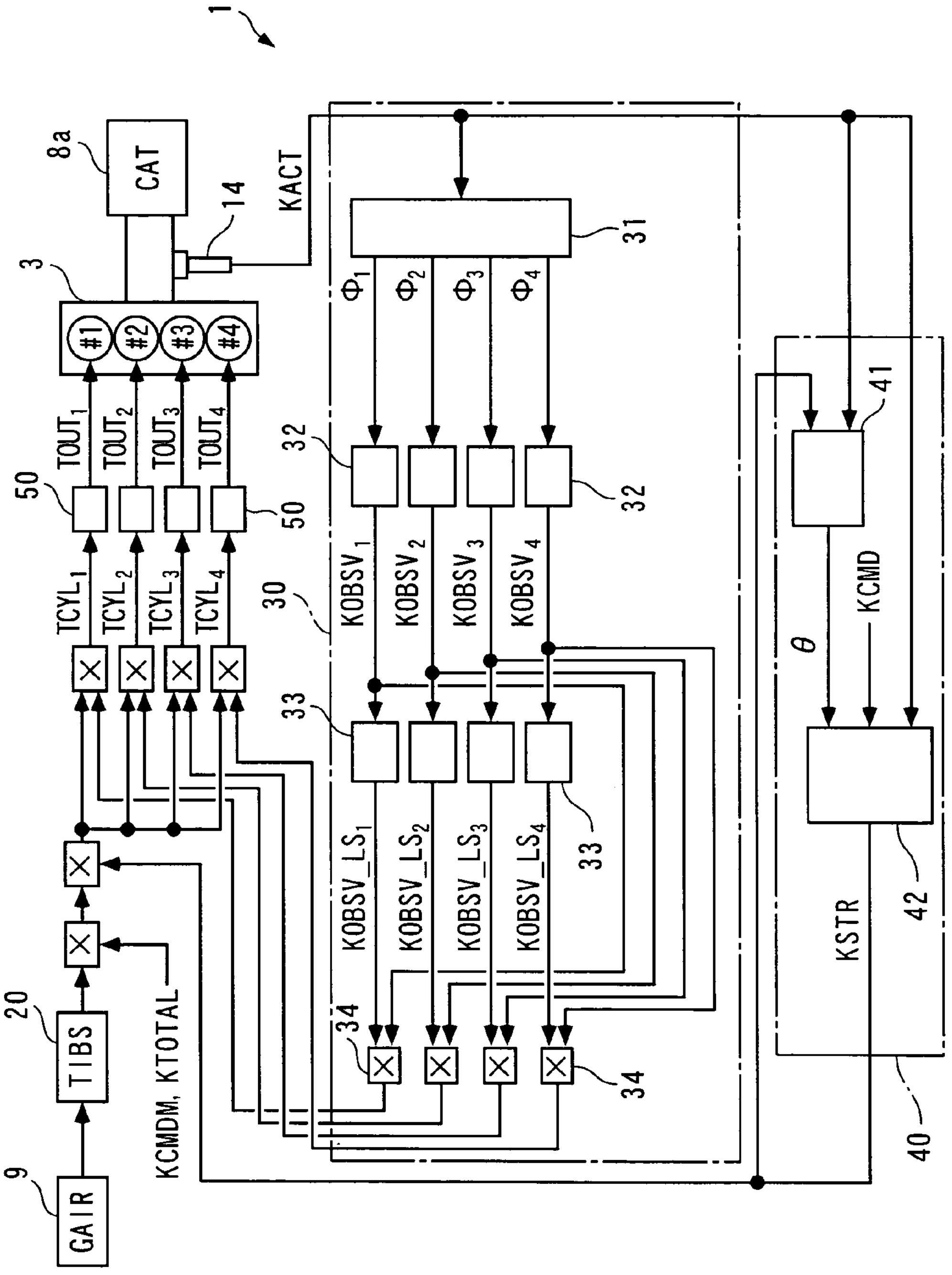
FIG. 2 is a block diagram showing the arrangement of the control system according to the first embodiment.

As shown in FIG. 2, the control system 1 is comprised of a basic fuel injection amount-calculating section 20, a first air-fuel ratio controller 30, a second air-fuel ratio controller 40, and a fuel attachment-dependent correcting section 50, which are all implemented by the ECU 2. In the control system 1, the basic fuel injection amount-calculating section 20, as the fuel amount-determining means, calculates a basic fuel injection amount TIBS according to the intake air amount GAIR by searching a table, not shown.

Further, as described in detail hereinafter, to correct variation in air-fuel ratio between the cylinders, the first air-fuel ratio controller 30 calculates the air-fuel ratio variation correction coefficient $KOBSV_i$ and the learned correction value $KOBSV\_LS_i$ thereof, and the second air-fuel ratio controller 40 calculates the feedback correction coefficient KSTR so as to cause the detected air-fuel ratio KACT to converge to the target air-fuel ratio KCMD. Then, a demanded fuel injection amount $TCYL_i$ is calculated on a cylinder-by-cylinder basis by multiplying the basic fuel injection amount TIBS by a corrected target air-fuel ratio KCMDM, a total correction coefficient KTOTAL, the feedback correction coefficient KSTR, the air-fuel ratio variation correction coefficient $KOBSV_i$, and the learned correction value $KOBSV\_LS_i$ thereof. Then, the fuel attachment-dependent correcting section 50 calculates the final fuel injection amount $TOUT_i$ based on the demanded fuel injection amount $TCYL_i$, on a cylinder-by-cylinder basis.

Next, a description will be given of the first air-fuel ratio controller 30. The first air-fuel ratio controller 30 (first fuel amount-correcting means) is for correcting variation in air-fuel ratio between the cylinders, and is comprised of an adaptive observer 31, an air-fuel ratio variation correction coefficient-calculating section 32, a learned correction value-calculating section 33, and a multiplication section 34.

In this first air-fuel ratio controller 30, with algorithms, described hereinafter, the adaptive observer 31 (simulation value-generating means, estimation means, identification means, delay means) calculates an air-fuel ratio variation coefficient $\Phi_i$, on a cylinder-by-cylinder basis, and the air-fuel ratio variation correction coefficient-calculating section 32 (first control means, first correction value-calculating means) calculates the air-fuel ratio variation correction coefficient $KOBSV_i$, on a cylinder-by-cylinder basis. Further, the learned correction value-calculating section 33 (learned correction value-calculating means) calculates the learned correction value $KOBSV\_LS_i$ of the air-fuel ratio variation correction coefficient, on a cylinder-by-cylinder basis. Further, the multiplication section 34 (correction means) multiplies the air-fuel ratio variation correction coefficient $KOBSV_1$ to $KOBSV_4$ by the learned correction value $KOBSV\_LS_1$ to $KOBSV\_LS_4$, respectively. That is, the air-fuel ratio variation correction coefficient $KOBSV_i$ is corrected by the learned correction value $KOBSV\_LS_i$.

Figure 3:
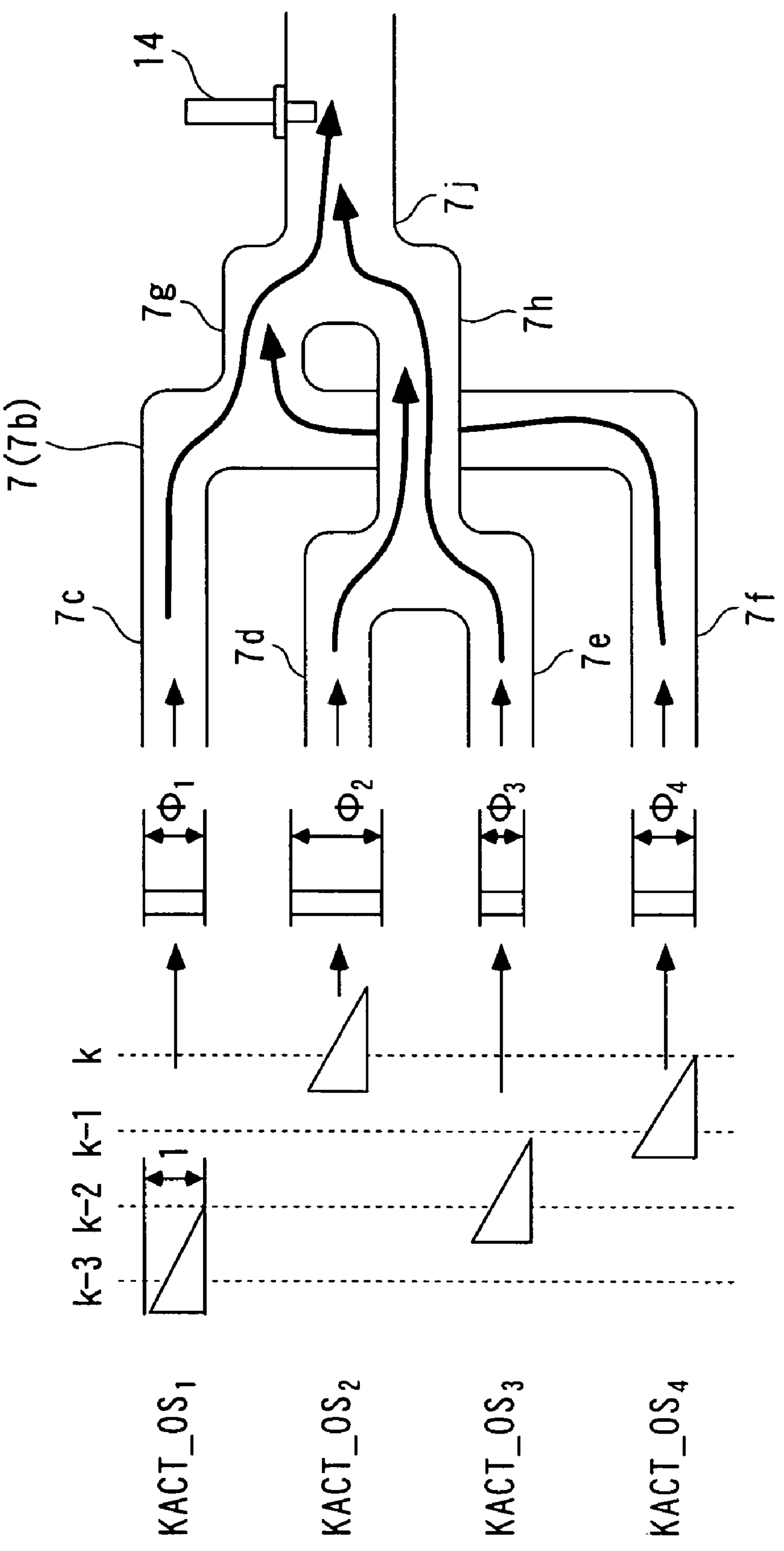
FIG. 3 is a schematic diagram useful in explaining a calculation algorithm with which an air-fuel ration variation coefficient Φ is calculated by an adaptive observer of a first air-fuel ratio controller.

Next, a description will be given of an algorithm of the adaptive observer 31. First, as shown in FIG. 3, the intake system of the engine 3 is regarded as a system which is represented by four simulation values $KACT\_OS_i$ to $KACT\_OS_4$ and four air-fuel ratio variation coefficients $\Phi_1$ to $\Phi_4$. These simulation values $KACT\_OS_i$ are values simulating the exhaust timing and exhaust behavior of exhaust gases, on a cylinder-by-cylinder basis, and the air-fuel ratio variation coefficient $\Phi_i$ represents variation in air-fuel ratio of exhaust gases between the cylinder and the amount of change in the exhaust behavior. When this system is modeled into a discrete time system model, an equation (1) shown in FIG. 4 can be obtained. In the equation (1), the symbol k represents a discretized time, and indicates that each discrete data (time-series data) with (k) is data sampled whenever a pulse of the TDC signal is generated. This also applies to discrete data referred to hereinafter. (Each discrete data may be data sampled whenever a pulse of the CRK signal is generated.) Further, the symbol d represents dead time (predetermined delay time) which the exhaust gases emitted from each cylinder take to reach the LAF sensor LAF, and is set to a predetermined fixed value in the present embodiment in advance. The dead time d may be set depending on an operating condition (engine speed NE) of the engine 3.

The adaptive observer 31 according to the present embodiment uses an equation formed by replacing the left side of the equation (1) by the estimation value KACT_EST of the air-fuel ratio, i.e. an equation (2) in FIG. 4 as a model, and a signal generator 31*a* generates the simulation value $KACT\_OS_i$. At the same time, the vector $\phi(k)$ of the air-fuel ratio variation coefficient $\Phi_i$ as a model parameter of the equation (2) is identified by a variable-gain sequential least-squares method expressed by equations (3) to (9) in FIG. 4 such that the estimation value KACT_EST(k) becomes equal to the detected air-fuel ratio KACT(k).

The symbol KP(k) in the equation (3) represents a vector of a gain coefficient, and the symbol ide(k) represents an identification error. Further, $\phi(k)^T$ in the equation (4) represents a transposed matrix of $\phi(k)$. It should be noted in the following description, the notation of "vector" is omitted unless otherwise required. The identification error ide(k) in the equation (3) is calculated using the equations (5) to (7) in FIG. 4, and the symbol $\zeta(k)$ in the equation (6) represents a vector of the simulation values defined by the equation (7). Further, the vector KP(k) of the gain coefficient is calculated by an equation (8) in FIG. 4, and the symbol P(k) in this equation (8) represents a square matrix of order 4 defined by an equation (9) in FIG. 4.

This adaptive observer 31 identifies the vector $\phi(k)$ of the air-fuel ratio variation coefficient $\Phi_i$ with the algorithm based on the sequential least-squares method shown in the equations (2) to (9). This makes it possible to remove (filter off) noise-like fluctuating components of the exhaust behavior caused by a sudden change in the operating condition of the engine 3 from the air-fuel ratio variation coefficient $\Phi_i$, and thereby calculate the air-fuel ratio variation coefficient $\Phi_i$ as a value substantially indicative of variation in air-fuel ratio between the cylinders.

Figure 5:
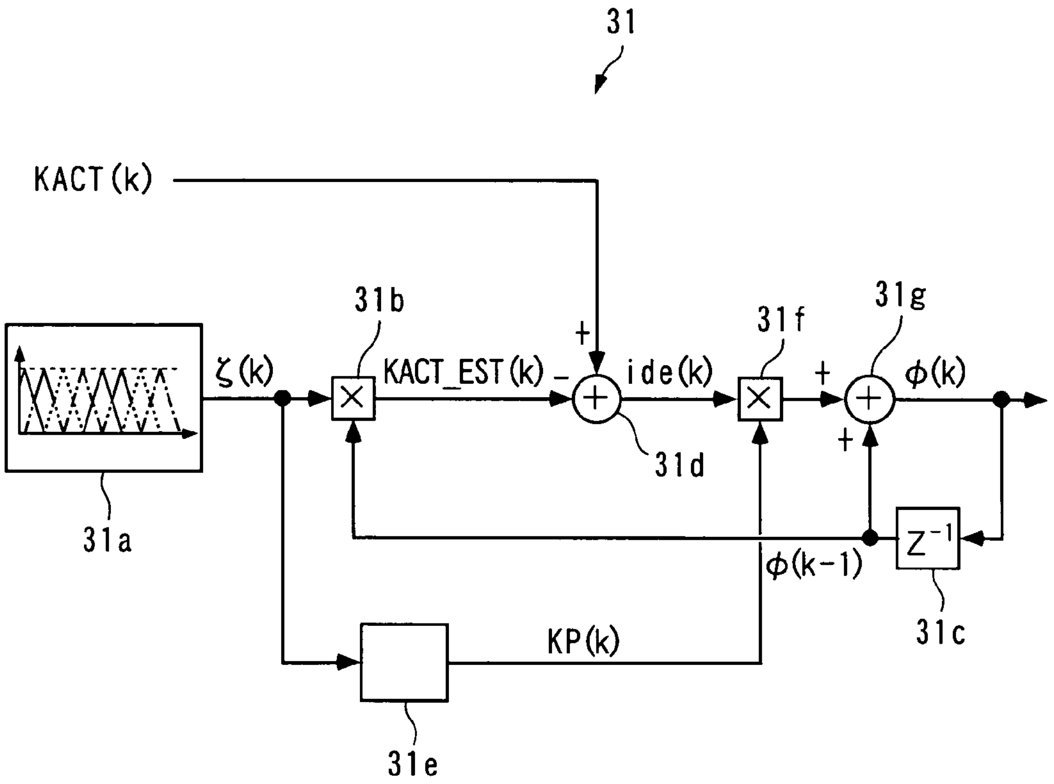
FIG. 5 is a block diagram showing the configuration of the adaptive observer.
Figure 6:
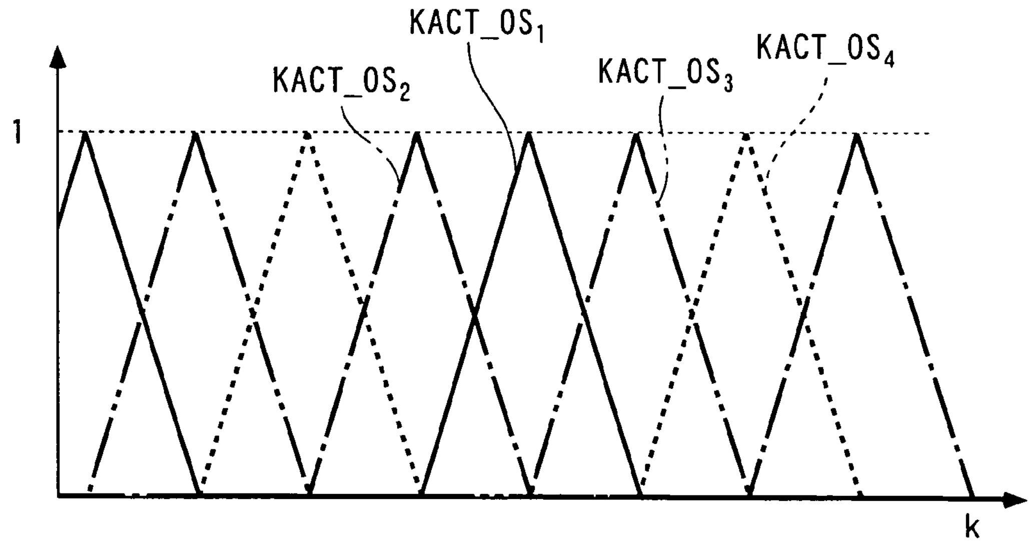
FIG. 6 is a diagram showing changes in a simulation value KACT_OS output from a signal generator of the adaptive observer.

The configuration of the adaptive observer 31 can be represented by a block diagram shown in FIG. 5. That is, as shown in FIG. 5, in the adaptive observer 31, the signal generator 31*a* generates the vector $\zeta(k)$ of the simulation values $KACT\_OS_i$. More specifically, as shown in FIG. 6, the signal generator 31*a* generates the simulation values $KACT\_OS_i$ as signal values each having a waveform of a combination of triangular waves and trapezoidal waves formed such that the total sum of the simulation values constantly becomes equal to a value of 1. Further, the multiplier 31*b* generates the estimation value KACT_EST (k) of the air-fuel ratio as a value obtained by multiplying the vector $\zeta(k)$ of the simulation values by the vector $\phi(k-1)$ of the air-fuel ratio variation coefficient. Then, the differentiator 31*d* generate the identification error ide(k) as the difference between the detected air-fuel ratio KACT(k) and the estimation value KACT_EST(k).

Further, a logic unit 31*e* generates the vector KP(k) of the gain coefficient based on the vector $\zeta(k)$ of the simulation values, and a multiplier 31*f* generates the product [ide(k)·KP(k)] of the identification error ide(k) and the vector KP(k) of the gain coefficient. Next, an adder 31*g* generates the vector $\phi(k)$ of the air-fuel ratio variation coefficient as the sum of the product [ide(k)·KP(k)] and the delayed vector $\phi(k-1)$ of the air-fuel ratio variation coefficient.

Next, a description will be given of an algorithm with which the air-fuel ratio variation correction coefficient-calculating section 32 calculates the air-fuel ratio variation correction coefficient $KOBSV_i$ (first input, first correction value). In the air-fuel ratio variation correction coefficient-calculating section 32, first, the moving average value $\Phi ave(k)$ of the air-fuel ratio coefficient is calculated based on the air-fuel ratio variation coefficient $\Phi_i(k)$ calculated by the adaptive observer 31, on a cylinder-by-cylinder basis, by an equation (10) in FIG. 7. Next, the air-fuel ratio variation correction coefficient $KOBSV_i$ is calculated with I-PD control (proportional/differential-preceding PID control) algorithm, on a cylinder-by-cylinder basis, such that the air-fuel ratio variation coefficients $\Phi_i(k)$ converges to the moving average value $\Phi ave(k)$ thereof. This I-PD control algorithm is expressed by equations (11) and (12) in FIG. 7. The symbol e(k) in the equation (12) represents a following error.

As described above, the air-fuel ratio variation correction coefficient-calculating section 32 calculates the air-fuel ratio variation correction coefficient $KOBSV_i$, with the I-PD control algorithm, such that the air-fuel ratio variation coefficient $\Phi_i(k)$ converges to the moving average value $\Phi ave(k)$ thereof. This is for providing control such that the converging behavior of the air-fuel ratio variation coefficient $\Phi_i(k)$ to the moving average value $\Phi ave(k)$ thereof does not suffer from overshooting, thereby preventing the air-fuel ratio control by the first air-fuel ratio controller 30 for correcting variation in air-fuel ratio between the cylinders and the air-fuel ratio control by the second air-fuel ratio controller 40, described hereinafter, from interfering with each other.

Figure 8A:
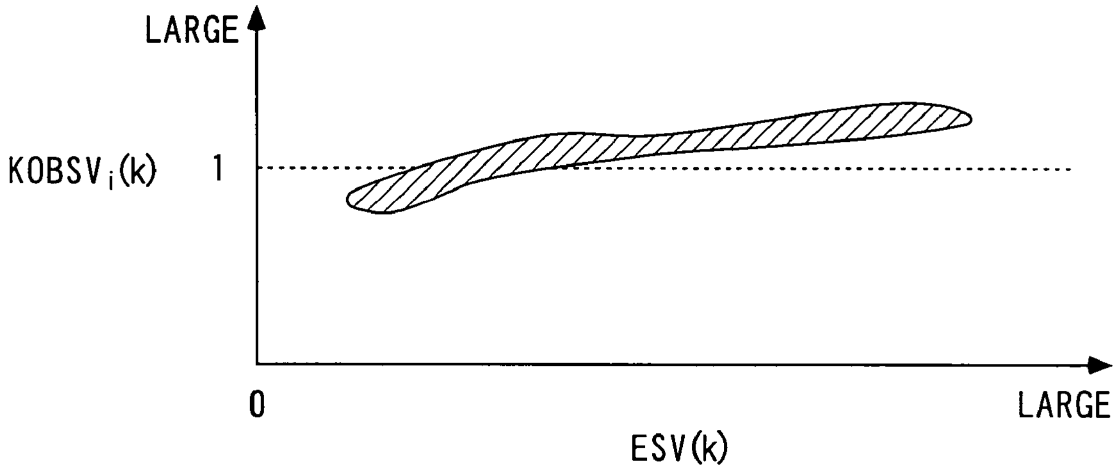
FIG. 8A is a diagram showing the relationship between an exhaust gas volume ESV and the air-fuel ratio variation correction coefficient KOBSV.

Next, a description will be given of an algorithm with which the learned correction value-calculating section 33 calculates the learned correction value $KOBSV\_LS_i$ of the air-fuel ratio variation correction coefficient $KOBSV_i$. The air-fuel ratio variation correction coefficient $KOBSV_i$ is susceptible to operating conditions of the engine 3, and when the operating conditions of the engine 3 are changed, the coefficient $KOBSV_i$ is changed accordingly. FIG. 8A shows the relationship between an exhaust gas volume ESV(k) as an operating condition parameter indicative of an operating condition of the engine and the air-fuel ratio variation correction coefficient $KOBSV_i(k)$. This exhaust gas volume ESV(k) (second internal variable, operating condition parameter) is an estimation value of the space velocity, and calculated using an equation (13) in FIG. 9. It should be noted that in the equation (13), the symbol SVPRA represents a predetermined coefficient determined in advance by the displacement of the engine 3.

Figure 8B:
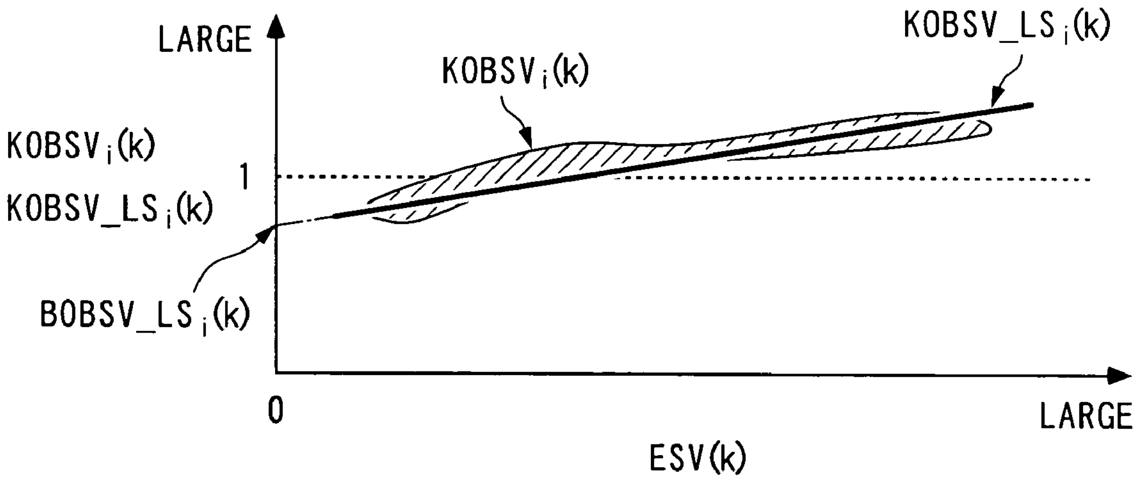
FIG. 8B is a diagram showing the relationship between the exhaust gas volume ESV, the air-fuel ratio variation correction coefficient KOBSV, and a learned correction value KOBSV_LS thereof.

Referring to FIG. 8A, it can be seen that an approximate value i.e. estimation value of the air-fuel ratio variation correction coefficient $KOBSV_i(k)$ can be calculated by a first-degree equation using the air-fuel ratio variation correction coefficient $KOBSV_i(k)$ as a dependent variable and the exhaust gas volume ESV(k) as an independent variable (see FIG. 8B). Therefore, in the learned correction value-calculating section 33, the learned correction value $KOBSV\_LS_i(k)$ of the air-fuel ratio variation correction coefficient is defined as an estimation value calculated by a regression equation, i.e. an equation (14) in FIG. 9, and a vector $\theta OBSV\_LS_i(k)$ of a regression coefficient $AOBSV\_LS_i$ and a constant term $BOBSV\_LS_i$ (hereinafter referred to as "the regression coefficient vector") is calculated by a sequential least-squares method expressed by equations (15) to (21) in FIG. 9.

In this equation (15), the symbol $KQ_i(k)$ represents a vector of a gain coefficient, and the symbol $Eov_i(k)$ represents an error. Further, the error $Eov_i(k)$ is calculated using equations (17) to (19) in FIG. 9. Further, the vector $KQ_i(k)$ of the gain coefficient is calculated using an equation (20) in FIG. 9, and the symbol $Q_i(k)$ in this equation (20) represents a square matrix of order 2 defined by an equation (21) in FIG. 9.

Further, the learned correction value $KOBSV\_LS_i(k)$ is more specifically calculated using an equation (22) in FIG. 9. It should be noted that when the engine 3 is in an extreme operating condition or operating environment, the calculation of the regression coefficient $AOBSV\_LS_i$ and the constant term $BOBSV\_LS_i$ by the sequential least-squares method is avoided, and the immediately preceding value $\theta OBSV\_LS_i(k-1)$ of the regression coefficient vector is used as the current value $\theta OBSV\_LS_i(k)$ in calculation of the learned correction value $KOBSV\_LS_i(k)$.

With the algorithm expressed by the equations (13) and (15) to (22), the learned correction value-calculating section 33 calculates the learned correction value $KOBSV\_LS_i(k)$ such that the learned correction value $KOBSV\_LS_i(k)$ converges to the product of the learned correction value $KOBSV\_LS_i(k)$ and the air-fuel ratio variation correction coefficient $KOBSV_i(k)$.

Next, a description will be given of the second air-fuel ratio controller 40. The second air-fuel ratio controller 40 is formed as an STR (Self Tuning Regulator) comprised of an onboard identifier 41 and an STR controller 42. The second air-fuel ratio controller 40 calculates the feedback correction coefficient KSTR such that the detected air-fuel ratio KACT converges to the target air-fuel ratio KCMD (predetermined target value). More specifically, with an algorithm described hereinbelow, the onboard identifier 41 identifies a model parameter vector θ of the first cylinder #1, and the STR controller 42 calculates the feedback correction coefficient KSTR (second input, second and fourth correction values). In the present embodiment, this second air-fuel ratio controller 40 forms the second control means, the second correction value-calculating means, the second fuel amount-correcting means, the fourth correction value-calculating means, and the fourth fuel amount-correcting means.

First, the first cylinder #1 is regarded as a controlled object to which is inputted the feedback correction coefficient KSTR and from which is outputted the detected air-fuel ratio KACT, and this controlled object is modeled into a discrete-time system model, which is expressed by an equation (23) in FIG. 10. In the equation (23), the symbol n represents a discretized time, and indicates that each discrete data with (n) is sampled every combustion cycle, i.e. whenever a total of four successive pulses of the TDC signal are generated. This also applies to discrete data referred to hereinafter.

The dead time of the detected air-fuel ratio KACT with respect to the target air-fuel ratio KCMD is estimated to correspond to about three combustion cycles, and therefore, there is a relationship of KCMD(n)=KACT (n+3). When this relationship is applied to the equation (23), there is derived an equation (24) in FIG. 10.

Further, the vector θ(n) of model parameters b0(n), r1(n), r2(n), r3(n), and sO(n) in the equation (23) is identified with an identification algorithm expressed by equations (25) to (31) in FIG. 10. The symbol KΓ(n) in the equation (25) represents a vector of a gain coefficient, and the symbol ide_st(n) represents an identification error. Further, the symbol $\theta(n)^T$ in the equation (26) represents a transposed matrix of θ(n).

The identification error ide_st(n) in the equation (25) is calculated using the equations (27) to (29) in FIG. 10, and the symbol KACT_HAT(n) in the equation (28) represents an identified value of the detected air-fuel ratio KACT. Further, the vector KΓ(n) of the gain coefficient is calculated using the equation (30) in FIG. 10, and the symbol Γ(n) in the equation (30) is a square matrix of order 5 defined by the equation (31) in FIG. 10.

In the control system of the present embodiment, when the air-fuel ratio control is executed with the algorithm expressed by the equations (24) to (31) described above, if the LAF sensor 14 has a strong low-pass characteristic, the control system can suffer from resonance at a repetition period of an integral multiple of a period of updating the model parameter vector θ. To overcome the problem, in the present embodiment, the second air-fuel ratio controller 40 calculates the feedback correction coefficient KSTR in the following manner:

In the second air-fuel ratio controller 40 of the control system according to the present embodiment, the model parameter vector θ of the first cylinder #1 identified by the onboard identifier 41 is oversampled in timing synchronous with generation of the TDC signal, and at the same time, a moving average value θ_ave of the model parameter vector θ is calculated. More specifically, the moving average value θ_ave(k) of the model parameter vector θ is calculated using an equation (32) in FIG. 11, and the feedback correction coefficient KSTR(k) is calculated using the moving average value θ_ave(k) by an equation (34) in FIG. 11. It should be noted that the symbol θbuf in the equation (32) indicates an oversampling value of the model parameter vector θ for the first cylinder #1, and the moving average value θ_ave(k) is defined by an equation (33) in FIG. 11. Further, the symbol m in the equation (32) represents a predetermined integer, and in the present embodiment, m is set to 11.

As described hereinbefore, the discrete data with the symbol (k) in these equations (32) to (34) are data sampled in synchronism with the generation of each pulse of the TDC signal, and therefore, the relationship of n−f=K−4·f (f: integer) holds. When this relationship is applied to the equation (24) in FIG. 10, the above equation (34) is derived. Further, the identification algorithm with which the model parameter vector θ(k) is identified is expressed by equations (35) to (41) shown in FIG. 11.

As described above, in second air-fuel ratio controller 40 of the control system according to the present embodiment, the onboard identifier 40 identifies the model parameter vector θ with the identification algorithm expressed by the equations (35) to (41) in FIG. 11, and the STR controller 42 calculates the feedback correction coefficient KSTR(k) using the equations (32) to (34) in FIG. 11.

Figure 12:
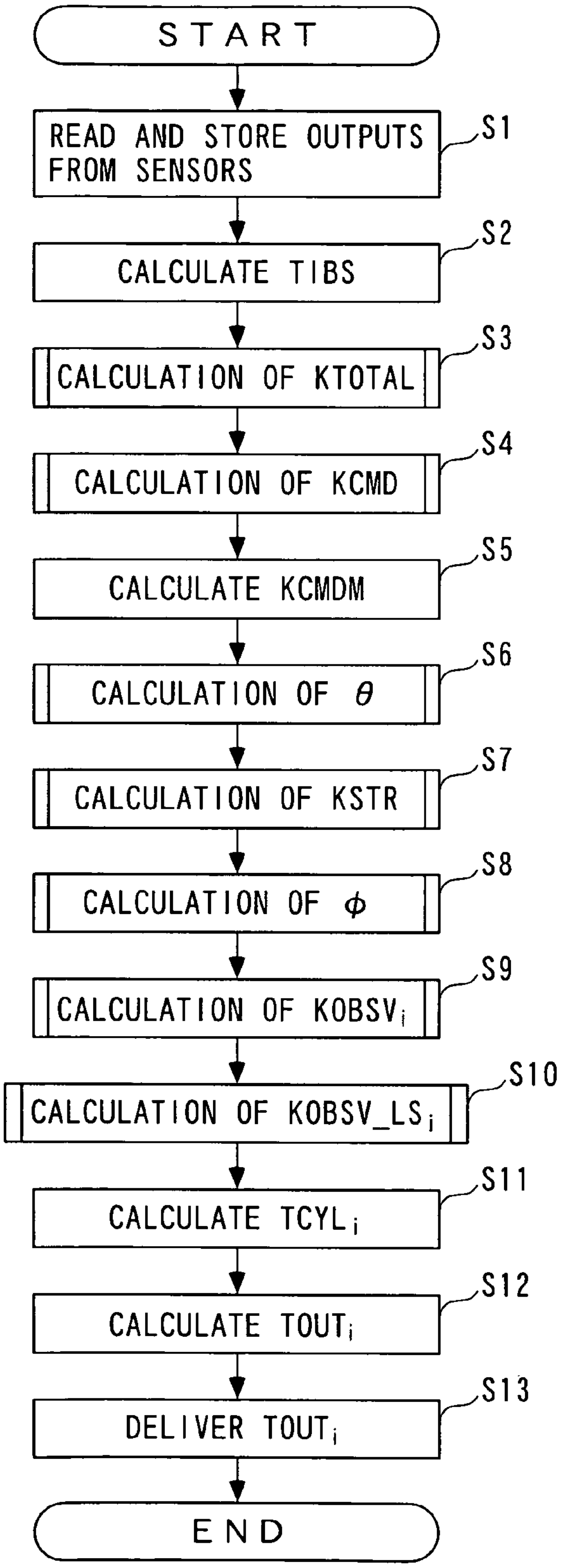
FIG. 12 is a flowchart showing an air-fuel ratio control process.
Figure 13:
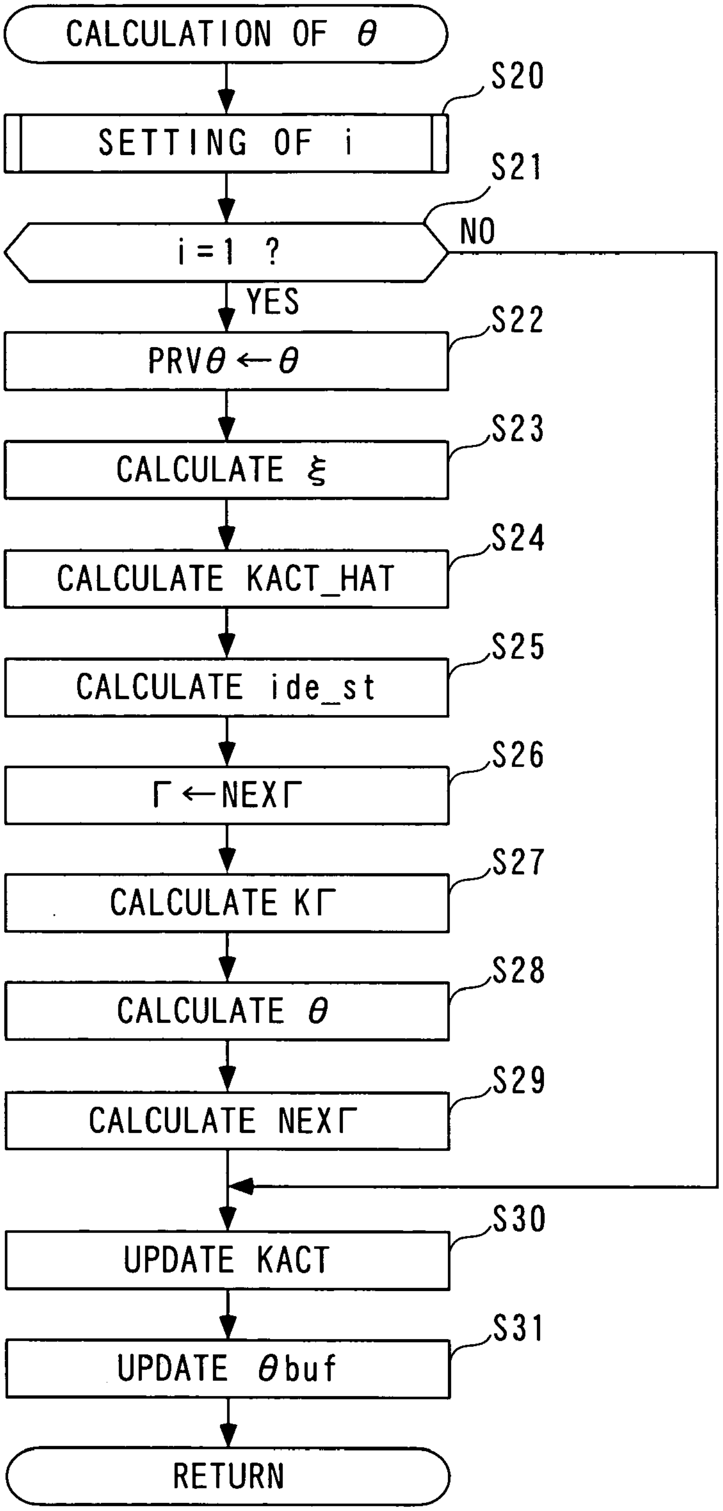
FIG. 13 is a flowchart showing a process for calculating a model parameter vector θ, executed in a step 6 in FIG. 12.

In the following, an air-fuel ratio control process, which is executed by the ECU 2, will be described with reference to FIGS. 12 to 17. In the following description, the symbols (k) and (n) indicating that associated values are the current values are omitted when deemed appropriate. FIG. 12 shows a main routine for carrying out the control process, which is executed by an interrupt handling routine in synchronism with inputting of each pulse of the TDC signal. In this process, the final fuel injection amount $TOUT_i$ is calculated, on a cylinder-by-cylinder basis, as will be described hereinafter.

First, in a step 1 (in FIG. 12, abbreviated to S1; this rule also applies to the other steps referred to hereinafter), outputs from the sensors 9 to 19 described hereinbefore are read in and stored in the RAM.

Then, the process proceeds to a step 2, wherein the basic fuel injection amount TIBS is calculated. In this process, the basic fuel injection amount TIBS is calculated by searching a table, not shown, according to the amount of intake air (hereinafter also referred to as "the intake air amount") GAIR.

Then, the process proceeds to a step 3, wherein a total correction coefficient KTOTAL is calculated. The total correction coefficient KTOTAL is obtained by calculating various correction coefficients by searching tables and maps according to various operating parameters (e.g. the intake air temperature TA, the atmospheric pressure PA, the engine coolant temperature TW, the accelerator pedal opening AP, throttle valve opening TH, and so forth) and then multiplying the thus calculated correction coefficients by each other.

Next, the process proceeds to a step 4, wherein the target air-fuel ratio KCMD is calculated. The process for calculation of the target air-fuel ratio KCMD is not shown here, but is executed by the same control method as described in Japanese Laid-Open Patent Publication (Kokai) No. 2000-179385. That is, the target air-fuel ratio KCMD is calculated depending on the operating conditions of the engine 3, by a sliding mode control process or a map retrieval process such that the output Vout from the O2 sensor 15 converges to a predetermined target value Vop.

Then, the process proceeds to a step 5, wherein the corrected target air-fuel ratio KCMDM is calculated. The corrected target air-fuel ratio KCMDM is calculated for compensating for a change in charging efficiency due to a change in the air-fuel ratio A/F. The corrected target air-fuel ratio KCMDM is calculated by searching a table, not shown, according to the target air-fuel ratio KCMD calculated in the step 4.

Next, in steps 6 and 7, the model parameter vector θ of the first cylinder #1 and the feedback correction coefficient KSTR are calculated, respectively. Processes for calculating these parameters will be described in detail hereinafter.

In the following steps 8 and 10, the vector φ of the air-fuel ratio variation coefficient, the air-fuel ratio variation correction coefficient $KOBSV_i$ and learned correction value $KOBSV\_LS_i$ thereof are calculated, respectively. Processes for calculating these parameters will be described in detail hereinafter.

Then, the process proceeds to a step 11, wherein the demanded fuel injection amount $TCYL_i$ is calculated using the basic fuel injection amount TIBS, the total correction coefficient KTOTAL, the corrected target air-fuel ratio KCMDM, the feedback correction coefficient KSTR, the air-fuel ratio variation correction coefficient $KOBSV_i$, and the learned correction value $KOBSV\_LS_i$ thereof, by the following equation (42):

$$TCYL_i = TIBS \cdot KTOTAL \cdot KCMDM \cdot KSTR \cdot KOBSV_i \cdot KOBSV\_LS_i \quad (42)$$

Then, the process proceeds to a step 12, wherein the final fuel injection amount $TOUT_i$ is calculated by subjecting the demanded fuel injection amount $TCYL_i$ to the fuel attachment-dependent correction. More specifically, the final fuel injection amount $TOUT_i$ is calculated by calculating a ratio of an amount of fuel attached to the inner walls of the combustion chambers to the whole amount of fuel injected from the injectors 6 during the current combustion cycle, etc. and correcting the demanded fuel injection amount $TCYL_i$ based on the ratio thus calculated.

Then, the process proceeds to a step 13, wherein the drive signal based on the final fuel injection amount $TOUT_i$ calculated as described above is delivered to the injector 6 for the associated cylinder for which the calculation has been performed, followed by terminating the present process.

Next, the process for calculating the model parameter vector θ executed in the step 6 will be described. In this process, first, in a step 20, there is carried out a process for setting the cylinder number value i which corresponds to the subscript "$_i$" in each parameter.

In this process, the cylinder number value i is set based on the immediately preceding value PRVi thereof set in the immediately preceding loop as follows: When PRVi=1 holds, the cylinder number value i set to 3, when PRVi=2 holds, the same is set to 1, when PRVi=3 holds, the same is set to 4, and when PRVi=4 holds, the same is set to 2. As described above, the cylinder number value i is cyclically set, e.g. in the order of 1→3→4→2→1→3→4→2→1 . . .

Next, the process proceeds to a step 21, wherein it is determined whether or not the cylinder number value i set in the step 20 is equal to a value of 1. If the answer to this determination is affirmative (YES), which means that the model parameter vector θ of the first cylinder #1 is to be calculated, the process proceeds to a step 22, wherein the value of the model parameter vector θ calculated and stored in the RAM in the immediately preceding loop is set to the immediately preceding value PRV θ[θ(n−1)].

Then, the process proceeds to a step 23, wherein the vector ζ is calculated using the equation (39) in FIG. 11, referred to hereinbefore, and then in a step 24, the identified value KACT_HAT of the detected air-fuel ratio KACT is calculated using the equation (38) in FIG. 11, referred to hereinbefore.

Then, the process proceeds to a step 25, wherein the identification error ide_st is calculated using the equation (37) in FIG. 11, referred to hereinbefore, and then in a step 26, the value of the next value NEXTΓ[=Γ(n+1)] of the square matrix calculated and stored in the RAM in the immediately preceding loop is set to the present value Γ.

Then, the process proceeds to a step 27, wherein the vector KΓ of the gain coefficient is calculated using the equation (40) in FIG. 11, referred to hereinbefore. Then, the process proceeds to a step 28, wherein the model parameter vector θ is calculated using the equation (35) in FIG. 11.

Then, the process proceeds to a step 29, wherein the next value NEXTΓ of the square matrix is calculated by the equation (41) in FIG. 11, and then the process proceeds to a step 30, wherein a predetermined number (twelve, in the present embodiment) of values of the detected air-fuel ratio KACT calculated on and before the immediately preceding occasion, stored in the RAM, are updated. More specifically, each value of the detected air-fuel ratio KACT stored in the RAM is set to an older value by one control cycle. For example, the current value KACT(k) is set to the immediately preceding value KACT(k−1), and the immediately preceding value KACT(k−1) is set to the second preceding value KACT(k−2), and so forth.

Then, the process proceeds to a step 31, wherein a predetermined number (twelve, in the present embodiment) of oversampling values θbuf of the model parameter vector θ of the first cylinder #1, stored in the RAM, are updated. More specifically, similarly to the step 30, each of the oversampling values θbuf stored in the RAM is set to an older value by one control cycle. For example, the current oversampling value θbuf(k) is set to the immediately preceding oversampling value θbuf(k−1), and the immediately preceding oversampling value θbuf(k−1) is set to the second preceding oversampling value θbuf(k−2), and so forth, followed by terminating the present process.

On the other hand, if the answer to the question of the step 21 is negative (NO), which means that it is not necessary to calculate the model parameter vector θ, the steps 22 to 29 are skipped over, and the steps 30 and 31 are executed, followed by terminating the present process.

Figure 14:
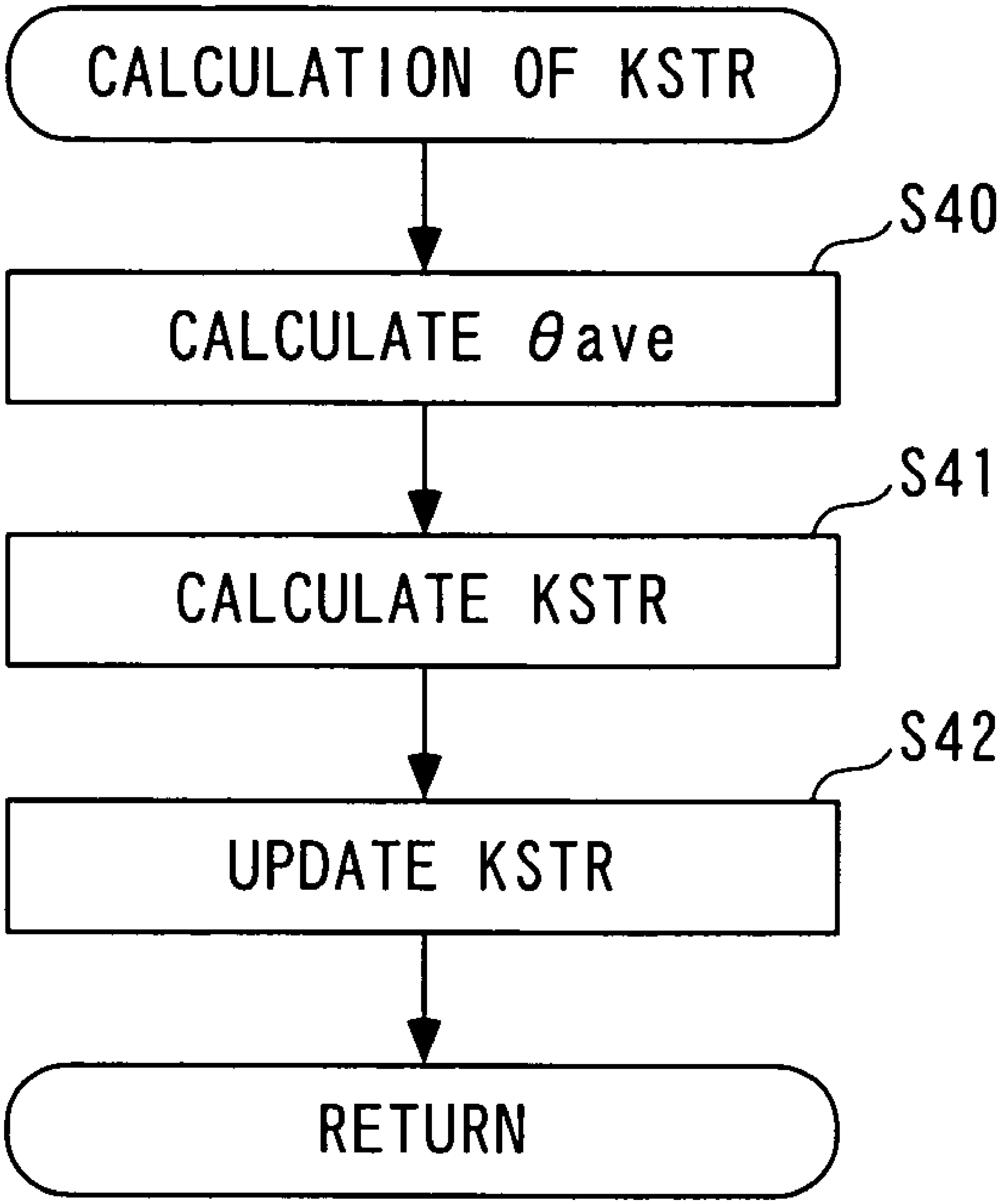
FIG. 14 is a flowchart showing a KSTR-calculating process executed in a step 7 in FIG. 12.

Next, the process for calculating the feedback correction coefficient KSTR in the step 7 will be described with reference to FIG. 14. In this process, first, in a step 40, the moving average value θ_ave of the model parameter vector is calculated based on the oversampling values θbuf updated in the step 31, using the equation (32) in FIG. 11.

Then, in a step 41, the feedback correction coefficient KSTR is calculated based on the moving average value θ_ave calculated in the step 41, by the equation (34) in FIG. 11, referred to hereinbefore.

Then, the process proceeds to a step 42, wherein a predetermined number (twelve in the present embodiment) of values of the feedback correction coefficient KSTR calculated in the preceding loops, which are stored in the RAM, are updated. More specifically, each of the KSTR values stored in the RAM is set to an older value by one control cycle. For example, the current value KSTR(k) is set to the immediately preceding value KSTR(k−1), the immediately preceding value KSTR(k−1) is set to the second preceding value KSTR(k−2), and so forth. Then, the present process is terminated.

Figure 15:
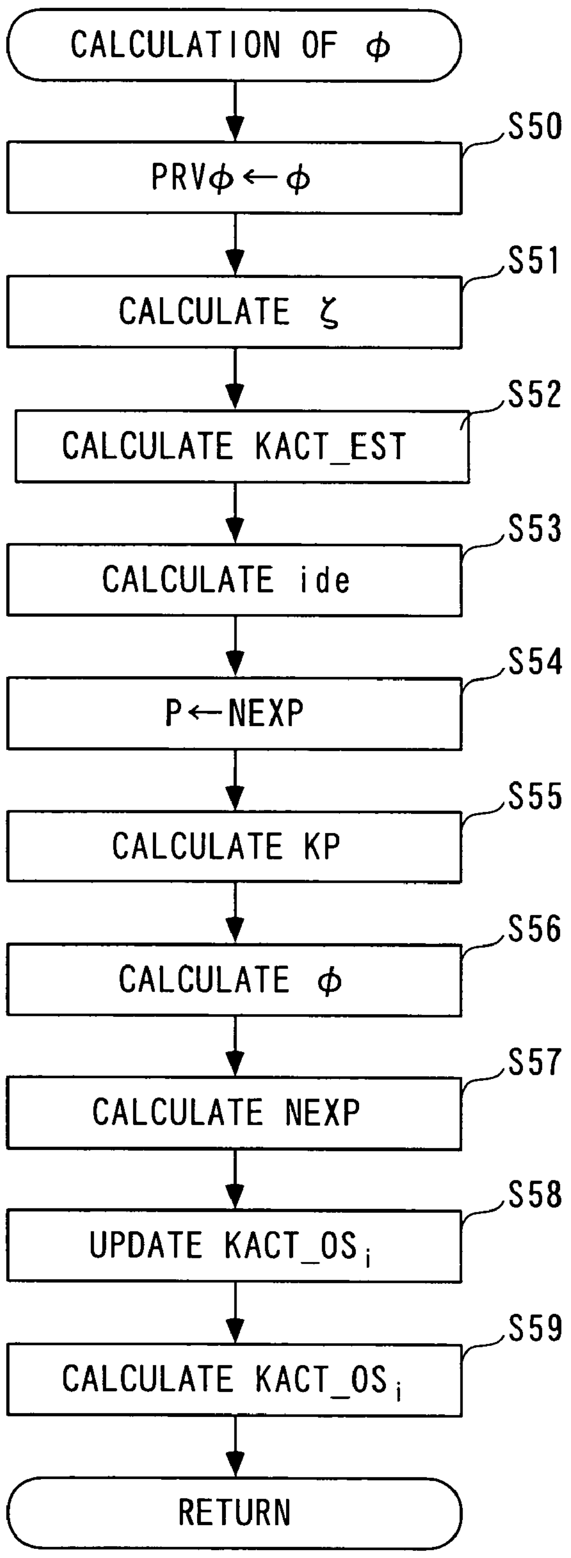
FIG. 15 is a flowchart showing a process executed in a step 8 in FIG. 12, for calculating a vector ϕ of the air-fuel ratio variation coefficient.

Next, the process for calculating the vector $\phi$ of the air-fuel ratio variation coefficient in the step 8 will be described with reference to FIG. 15. In this process, first, in a step 50, the vector $\phi$ of the air-fuel ratio variation coefficient calculated in the immediately preceding loop, which is stored in the RAM, is set to the immediately preceding value PRV$\phi$ [=$\phi$(k−1)] thereof.

Then the process proceeds to a step 51, wherein the vector $\zeta$ of the simulation values is calculated by the equation (7) in FIG. 4, and then to a step 52, wherein the estimation value KACT_EST of the detected air-fuel ratio is calculated by the equation (6) in FIG. 4.

Then, the process proceeds to a step 53, wherein the identification error ide is calculated by the equation (5) in FIG. 4, and then to a step 54, wherein the value of the next value NEXP[=P(k+1)] of the square matrix calculated in the immediately preceding loop is set to the current value P thereof.

Then, the process proceeds to a step 55, wherein the vector KP of the gain coefficient is calculated by the equation (8) in FIG. 4, and then to a step 56, wherein the vector $\phi$ of the air-fuel ratio variation coefficient is calculated by the equation (3) in FIG. 4.

Next, the process proceeds to a step 57, wherein the next value NEXP[=P(k+1)] of the square matrix is calculated by the equation (9) in FIG. 4, and then to a step 58, wherein a predetermined number of (12×4 in the present embodiment) pieces of time-series data of the simulation values KACT_OS$_i$ stored in the RAM are updated. More specifically, each value of the simulation values KACT_OS$_i$ stored in the RAM is set to an older value by one control cycle (e.g. the current value KACT_OS$_i$(k) to the immediately preceding value KACT_OS$_i$(k−1), and the immediately preceding value KACT_OS$_i$(k−1) to the second preceding value KACT_OS$_i$(k−2), and so forth.)

Then, the process proceeds to a step 59, wherein the current value KACT_OS$_i$ of the simulation value is calculated, followed by terminating the present process.

Figure 16:
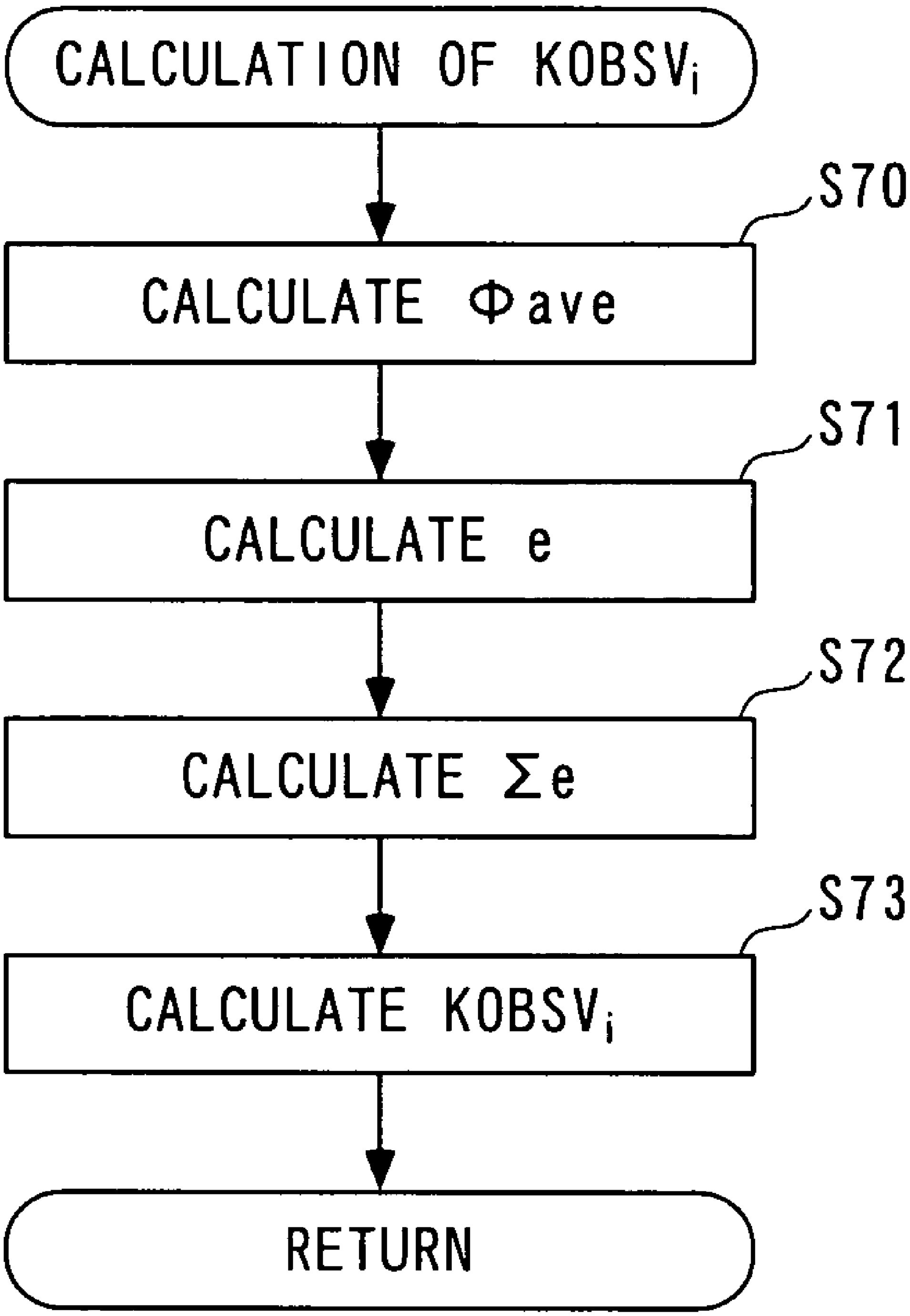
FIG. 16 is a flowchart showing a process for calculating the air-fuel ratio variation correction coefficient $KOBSV_i$, executed in a step 9 in FIG. 12.

Next, a process for calculating air-fuel ratio variation correction coefficient KOBSV$_i$ executed in the step 9 will be described with reference to FIG. 16. In this process, first, in the step 70, the moving average value $\Phi$ave of the air-fuel ratio variation coefficient is calculated by the equation (10) in FIG. 7.

Then, the process proceeds to a step 71, wherein the following error e is calculated using the equation (12) in FIG. 7, referred to hereinbefore, and then in a step 72, the integral value $\Sigma$e of the following error e is calculated. Then, the process proceeds to a step 73, wherein the air-fuel ratio variation correction coefficient KOBSV$_i$ is calculated by the equation (11) in FIG. 7, referred to hereinbefore, using the moving average value $\Phi$ave of the air-fuel ratio variation coefficient and the integral value $\Sigma$e of the following error e, calculated in the steps 70 and 72, respectively, followed by terminating the present process.

Figure 17:
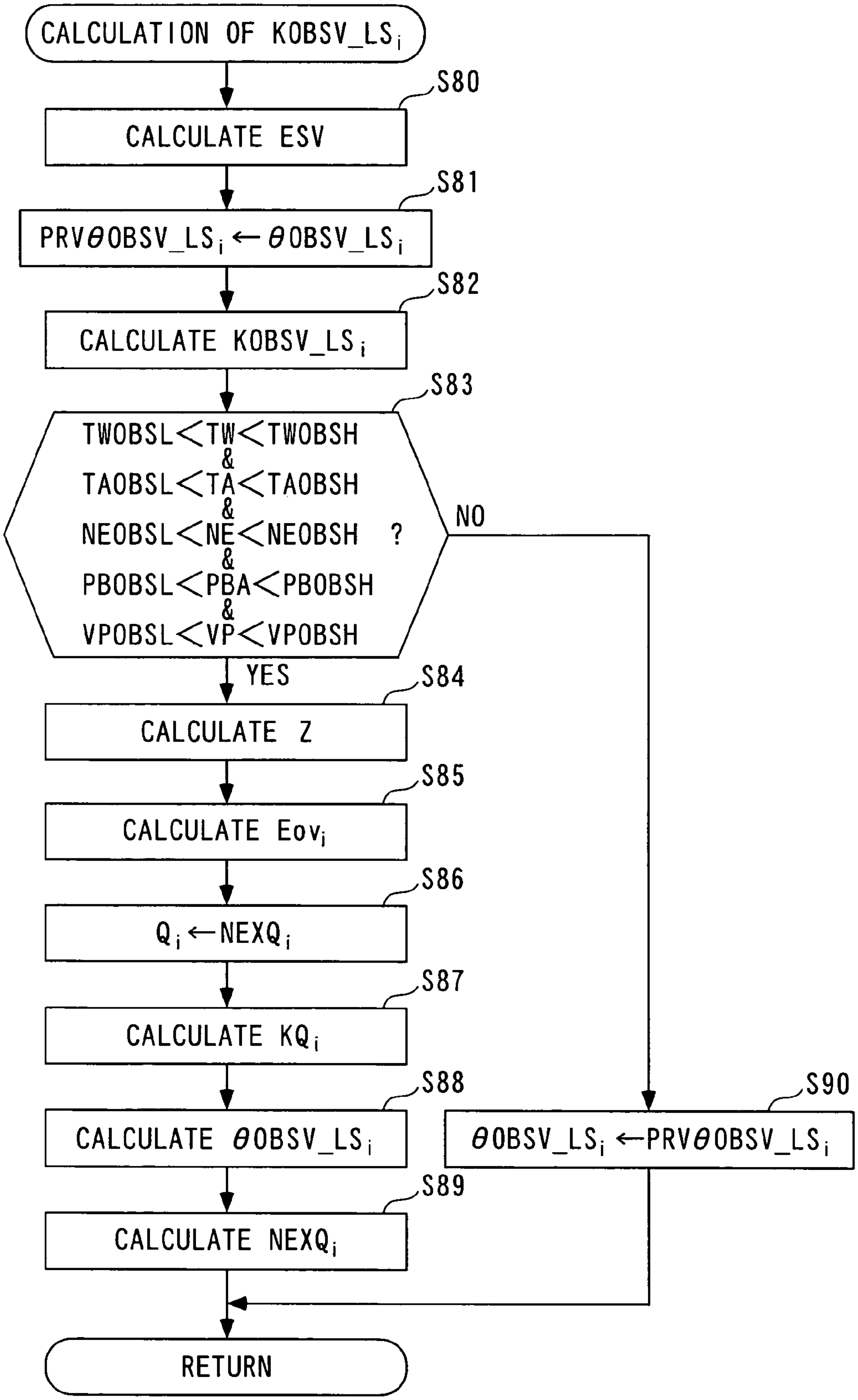
FIG. 17 is a flowchart showing a process for calculating the learned correction value $KOBSV\_LS_i$ of the air-fuel ratio variation correction coefficient, executed in a step 10 in FIG. 12.

Next, the process for calculating the learned correction value KOBSV_LS$_i$ of the air-fuel ratio variation correction coefficient in the step 10 will be described with reference to FIG. 17. In this process, first, in a step 80, the exhaust gas volume ESV is calculated using the equation (13) in FIG. 9, referred to hereinbefore.

Then, the process proceeds to a step 81, wherein the value of the regression coefficient $\theta$OBSV_LS$_i$ calculated in the preceding loop is set to the immediately preceding value PRV$\theta$OBSV_LS$_i$ [=$\theta$OBSV_LS$_i$(k−1)] thereof.

Then, the process proceeds to a step 82, wherein the learned correction value KOBSV_LS$_i$ is calculated using the equation (22) in FIG. 9, referred to hereinbefore. Thereafter, the process proceeds to a step 83, wherein it is determined whether or not the following five conditions (a1) to (a5) are satisfied:

(a1) The engine coolant temperature TW is higher than a predetermined lower limit value TWOBSL and at the same time lower than a predetermined higher limit value TWOBSH.

(a2) The intake air temperature TA is higher than a predetermined lower limit value TAOBSL and at the same time lower than a predetermined higher limit value TWOBSH.

(a3) The engine speed NE is higher than a predetermined lower limit value NEOBSL and at the same time lower than a predetermined higher limit value NEOBSH.

(a4) The intake pipe absolute pressure PBA is higher than a predetermined lower limit value PBOBSL and at the same time lower than a predetermined higher limit value PBOBSH.

(a5) The vehicle speed VP is higher than a predetermined lower limit value VPOBSL and at the same time lower than a predetermined higher limit value VPOBSH.

When all of the five conditions (a1) to (a5) are satisfied, it is judged that the engine is in an operating condition in which the regression coefficient vector $\theta$OBSV_LS$_i$ should be calculated by the sequential least-squares method, so that the process proceeds to a step 84, wherein a vector Z of the exhaust gas volume is calculated using the equation (19) in FIG. 9, referred to hereinbefore.

Then, the process proceeds to a step 85, wherein the error Eov$_i$ is calculated using the equation (17) in FIG. 9, referred to hereinbefore, and then to a step 86, wherein a next value NEXTQ$_i$ [=Q$_i$(k+1)] of the square matrix calculated in the immediately preceding loop, stored in the RAM, is set to the current value Q$_i$ thereof.

Then, the process proceeds to a step 87, wherein the vector KQ$_i$ of the gain coefficient is calculated using the equation (20) in FIG. 9, referred to hereinbefore, and then to a step 88, wherein the regression coefficient vector $\theta$OBSV_LS$_i$ is calculated using the equation (15) in FIG. 9, referred to hereinbefore. Then, the process proceeds to a step 89, wherein the next value NEXTQ$_i$ [=Q$_i$(k+1)] of the square matrix is calculated using the equation (21) in FIG. 9, referred to hereinbefore.

On the other hand, when the answer to the question of the step 83 is negative (NO), i.e. at least one of the above five conditions (a1) to (a5) is not satisfied, the process proceeds to a step 90, wherein the immediately preceding value PRV$\theta$OBSV_LS$_i$ of the regression coefficient vector set in the step 81 is set to the current value $\theta$OBSV_LS$_i$, followed by terminating the present process. This causes the value calculated by the sequential least-squares method in the steps 84 to 89 e.g. in the immediately proceeding loop to be used as the immediately preceding value PRV θOBSV_LS$_i$ of the regression coefficient vector in the step 81 in the next loop.

Figure 18:
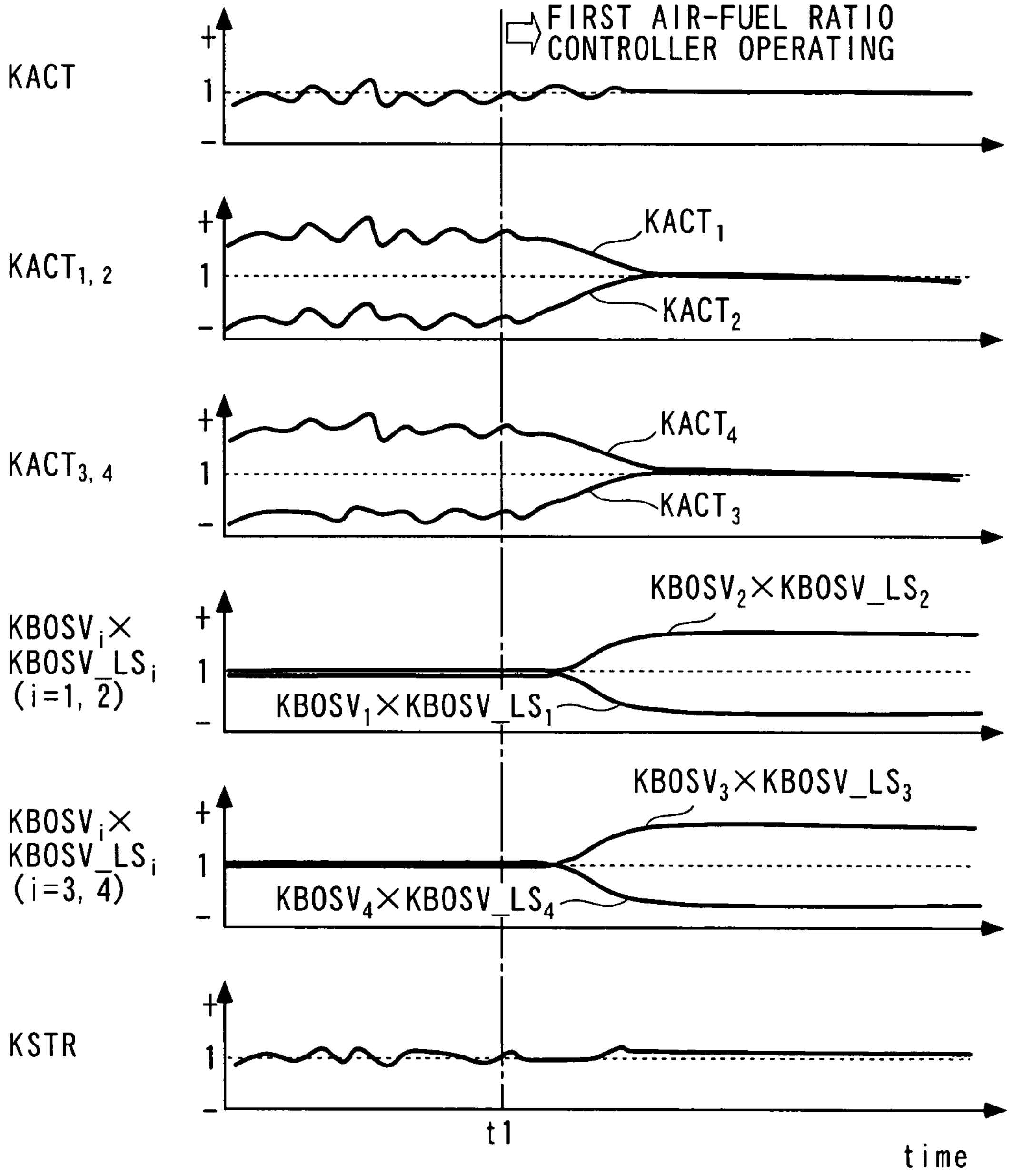
FIG. 18 is a timing chart showing an example of operations of the air-fuel ratio control executed by the control system according to the first embodiment.

Next, the operation of the air-fuel ratio control executed by the control system 1 will be described with reference to FIGS. 18 and 19. FIG. 18 shows an example of operation in the case where the air-fuel ratio control is carried out by the control system 1 according to the present embodiment, more specifically, the case where during the control provided by the second air-fuel ratio controller 40 such that the detected air-fuel ratio KACT becomes equal to a value of 1 (equivalent ratio corresponding to the stoichiometric air-fuel ratio), the first air-fuel ratio controller 30 is started from the stopped state, in other words, the first air-fuel ratio controller 30 starts to calculate the air-fuel ratio variation coefficient $\Phi_i$, the air-fuel ratio variation correction coefficient KOBSV$_i$ and the learned correction value KOBSV_LS$_i$ thereof.

Figure 19:
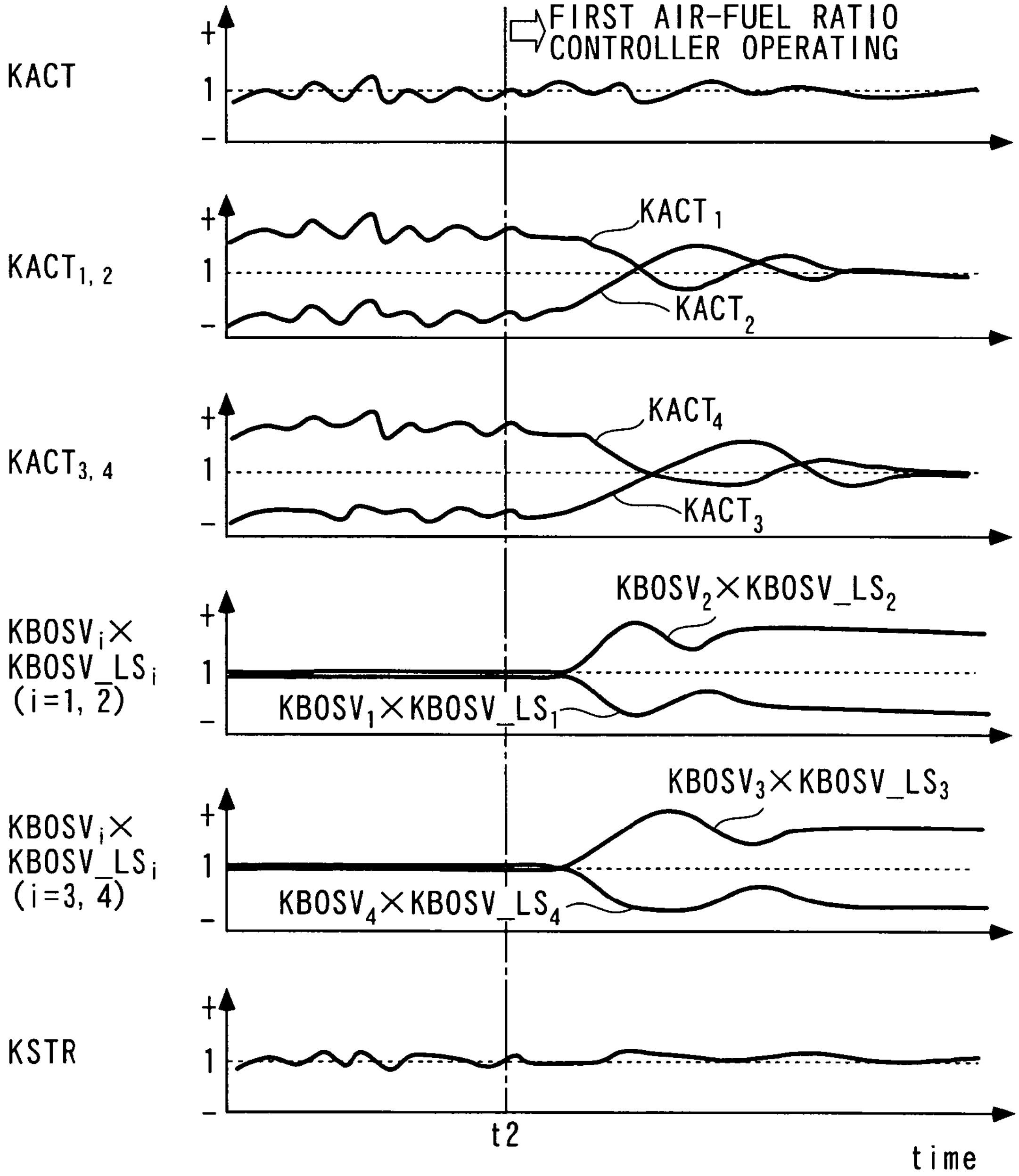
FIG. 19 is a timing chart showing a comparative example of operations of the air-fuel ratio control.

FIG. 19 shows, for comparison, a comparative example of operation of the air-fuel ratio control in the case where the learned correction value KOBSV_LS$_i$ is calculated with conventional PID control algorithm (algorithm expressed by equations (43) and (44) in FIG. 20) instead of the I-PD control algorithm expressed by the equations (11) and (12). In these two figures, the values KACT$_1$ to KACT$_4$ represent respective values of the air-fuel ratio (values in terms of the equivalent ratio) of exhaust gases which are emitted from the first to fourth cylinders #1 to #4 and not mixed yet. More specifically, the values of KACT$_{1-4}$ are calculated based on respective outputs from four LAF sensors (not shown) for experiment which are additionally disposed in the exhaust manifold 7*a* at respective locations immediately downstream of the exhaust ports of the cylinders #1 to #4.

As shown in FIG. 18, in the example of operation of the air-fuel ratio control system according to the present embodiment, when the first air-fuel ratio controller 30 is in stoppage, the values KACT$_1$ to KACT$_4$ indicative of the respective air-fuel ratio values of exhaust gases emitted from the cylinders are made unstable, and the detected air-fuel ratio KACT is affected thereby and also made somewhat unstable. However, when the first air-fuel ratio controller 30 starts operation (time t1), with the lapse of some time, the values KACT$_1$ to KACT$_4$ all converge to a value of 1 (equivalent ratio corresponding to the stoichiometric air-fuel ratio) and accordingly, the detected air-fuel ratio KACT also converges to a value of 1. That is, it is understood that variation in air-fuel ratio between the cylinders is properly corrected. Further, it is understood that the product KOBSV$_i$·KOBSV_LS$_i$ (i=1 to 4) of the air-fuel ratio variation correction coefficient and the learned correction value thereof is also stable.

In contrast, in the comparative example shown in FIG. 19, the setting time from a time point the first air-fuel ratio controller 30 starts operation (time t2) to a time point all the values of the KACT$_{1-4}$ converge to a value of 1 is longer than the example of operation of the control system according to the present embodiment, and accordingly, the detected air-fuel ratio KACT does not smoothly converge to a value of 1, either. In addition, it is understood that the product KOBSV$_i$·KOBSV_LS$_i$ (i=1 to 4) of the air-fuel ratio variation correction coefficient and the learned correction value thereof is not smoothly made stable, either. That is, it is understood that compared with the case of using the conventional PID control algorithm, the use of the I-PD control algorithm as in the present embodiment makes it possible to correct variation in air-fuel ratio between the cylinders more promptly and more appropriately. The reason for this is that the learned correction value KOBSV_LS$_i$ can be more properly calculated with the I-PD control algorithm than with the PID control algorithm, without causing overshooting in the behavior of the air-fuel ratio variation coefficient $\Phi_i$ being caused to converge to the moving average value Φave thereof.

As described above, according to the control system of the present embodiment, the first air-fuel ratio controller 30 calculates the air-fuel ratio variation coefficient $\Phi_i$, and calculates the air-fuel ratio variation correction coefficient KOBSV$_i$ and the learned correction value KOBSV_LS$_i$ thereof such that the air-fuel ratio variation coefficient Φi converges to the moving average value Φave. Further, the second air-fuel ratio controller 40 calculates the feedback correction coefficient KSTR such that the detected air-fuel ratio KACT converges to the target air-fuel ratio KCMD. Then, the basic fuel injection amount TIBS is corrected based on the calculated feedback correction coefficient KSTR, air-fuel ratio variation correction coefficient KOBSV$_i$, and learned correction value KOBSV_LS$_i$ thereof, whereby the final fuel injection amount TOUT$_i$ is calculated on a cylinder-by-cylinder basis.

The adaptive observer 31 of the first air-fuel ratio controller 30 estimates the estimation value KACT_EST of the detected air-fuel ratio KACT using the model [equation (2)] defined by the estimation value KACT_EST, the simulation values KACT_OS$_i$, and the air-fuel ratio variation coefficients $\Phi_i$, and further identifies the air-fuel ratio variation coefficient $\Phi_i$ as the model parameter by the sequential least-squares method such that the estimation value KACT_EST becomes equal to the detected air-fuel ratio KACT. This makes it possible to remove (filter off) noise-like fluctuating components of the exhaust behavior caused by a sudden change in the operating condition of the engine 3 from the air-fuel ratio variation coefficient $\Phi_i$, and thereby calculate the air-fuel ratio variation coefficient $\Phi_i$ as a value substantially indicative of variation in air-fuel ratio between the cylinders. Therefore, the basic fuel injection amount TIBS is corrected by the variation correction coefficient KOBSV$_i$ calculated based on the air-fuel ratio variation coefficient $\Phi_i$, on a cylinder-by-cylinder basis, which makes it possible, differently from the conventional control system, even when the dynamic characteristics of the controlled object are changed due to changes in respective contributions of the cylinders to the detected air-fuel ratio KACT, which are caused by attachment of fuel in the cylinders, variation in the response of the LAF sensor 14, and aging of the LAF sensor 14, to calculate the final fuel injection amount TOUT$_i$ on a cylinder-by-cylinder basis, such that variation in air-fuel ratio between the cylinders is corrected while causing changes in the dynamic characteristics of the controlled object to be reflected in the model. As a result, according to the first embodiment, even in controlling the air-fuel ratio of the mixture supplied to the engine 3 having a complicated exhaust system layout, it is possible to realize a highly robust air-fuel ratio control having a large margin of stability, and thereby maintain an excellent emission reduction rate of the catalyst.

Further, the first air-fuel ratio controller 30 calculates the air-fuel ratio variation correction coefficient KOBSV$_i$ with the I-PD control algorithm, which makes it possible to calculate the air-fuel ratio variation correction coefficient KOBSV$_i$ such that overshooting is not caused in the behavior of the air-fuel ratio variation coefficient $\Phi_i$ being caused to converge to the moving average value Φave thereof. This makes it possible to correct variation in air-fuel ratio between the cylinders, while preventing the air-fuel ratio of exhaust gases from each cylinder from exhibiting an oscillatory behavior. Further, since the air-fuel ratio variation correction coefficient $KOBSV_i$ is calculated such that the air-fuel ratio variation coefficient $\Phi_i$ is caused to converge to the moving average value Φave thereof, it is possible to correct variation in air-fuel ratio between the cylinders while preventing the air-fuel ratio by the first air-fuel ratio controller 30 and the air-fuel ratio control by the second air-fuel ratio controller 40 from interfering with each other.

Furthermore, the first air-fuel ratio controller 30 calculates the learned correction value $KOBSV\_LS_i$ of the air-fuel ratio variation correction coefficient $KOBSV_i$ by the regression equation [equation (22)] using the exhaust gas volume ESV as an independent variable, and at the same time, the regression coefficient vector $\theta OBSV\_LS_i$ as a vector of the regression coefficient $AOBSV\_LS_i$ and the constant term $BOBSV\_LS_i$ is calculated by the sequential least-squares method. This makes it possible to calculate the learned correction value $KOBSV\_LS_i$ as a value in which the variation in air-fuel ratio between the cylinders is properly reflected therein, even when the engine 3 is in an operating condition which can change drastically, such as a transient operating condition, causing a sudden change in the state of variation in air-fuel ratio between the cylinders. Therefore, even when the engine 3 is in a transient operating condition, it is possible to control the air-fuel ratio while compensating for the variation in air-fuel ratio between the cylinders.

Further, the air-fuel ratio variation coefficient $\Phi_i$ and the regression coefficient vector $\theta OBSV\_LS_i$ are calculated by the sequential least-squares method, and therefore, compared with the case of using the general least-squares method as the statistical algorithm, it is possible to calculate the air-fuel ratio variation correction coefficient $KOBSV_i$ and the learned correction value $KOBSV\_LS_i$ every control cycle, even at the start of the air-fuel ratio control. Therefore, by setting the initial values of the air-fuel ratio variation correction coefficient $KOBSV_i$ and the learned correction value $KOBSV\_LS_i$ in advance, it is possible to calculate the final fuel injection amount $TOUT_i$ as a value always corrected by the product of the learned correction value $KOBSV\_LS_i$ calculated every control cycle and the air-fuel ratio variation correction coefficient $KOBSV_i$ at the start of the air-fuel ratio control, whereby the controllability at the start of the air-fuel ratio control can be enhanced. This makes it possible to enhance the emission reduction rate of the catalyst at the start of the air-fuel ratio control.

Although in the first embodiment, the first-degree equation is employed as the regression equation used in the calculation of the learned correction value $KOBSV\_LS_i$, this is not limitative, but an n-th-degree equation (n is an integer equal to or larger than 2) may be used. In such a case as well, by calculating the regression coefficients and the constant terms of the n-th-degree equation by the sequential least-squares method, it is possible to obtain the same advantageous effects as provided by the first embodiment. Further, the learned correction value $KOBSV\_LS_i$ may be calculated by using predetermined values set for each of a plurality of operating regions in advance, as the regression coefficient and the constant term of the regression equation. This can reduce the time for computing the learned correction value $KOBSV\_LS_i$, thereby reducing the computational load on the ECU 2.

Further, although in the first embodiment, the I-PD control algorithm is employed as the control algorithm for causing the air-fuel ratio variation coefficient $\Phi_i$ to converge to the moving average value Φave thereof, this is not limitative, but it goes without saying that another suitable algorithm may be employed. For example, instead of the I-PD control algorithm, an IP-D control algorithm (differential-preceding PID control algorithm) expressed by equations (45) and (46) in FIG. 20 may be employed to calculate the air-fuel ratio variation correction coefficient $KOBSV_i$ or a response-specified control algorithm (sliding mode control algorithm or back-stepping control algorithm) expressed by equations (47) to (49) in FIG. 20 may be employed to calculate the air-fuel ratio variation correction coefficient $KOBSV_i$. Even when one of these control algorithms is employed, similarly to the case of the present embodiment using the I-PD control algorithm, it is possible to calculate the air-fuel ratio variation correction coefficient $KOBSV_i$ such that overshooting is not caused in the behavior of the air-fuel ratio variation coefficient $\Phi_i$ being caused to converge to the moving average value Φave thereof. As a result, it is possible to promptly and appropriately correct the variation in air-fuel ratio between the cylinders.

Further, as described above, when the I-PD control algorithm, IP-D control algorithm, and the response-specified control algorithm are employed in the calculation of the air-fuel ratio variation correction coefficient $KOBSV_i$, the feedback gain thereof may be determined based on the optimal regulator theory or the $H_\infty$ control theory. This makes it possible to more effectively suppress overshooting in the behavior of the air-fuel ratio variation coefficient $\Phi_i$ being caused to converge to the moving average value Φave thereof, with the result that the accuracy of correction of variation in air-fuel ratio between the cylinders can be further enhanced.

Further, it goes without saying that when the setting time over which the air-fuel ratio variation coefficient $\Phi_i$ converges to the moving average value Φave thereof may be long, the air-fuel ratio variation correction coefficient $KOBSV_i$ may be calculated with the PID control algorithm expressed by the equations (43) and (44) in FIG. 20. Further, the average value of the variation coefficient as a target value to which the air-fuel ratio variation coefficient $\Phi_i$ is caused to converge is not limited to the moving average value Φave in the present embodiment, but it may be a weighted average value.

Further, in the illustrated example of the first embodiment, the adaptive observer 31 of the first air-fuel ratio controller 30 identifies the vector θ(k) of the air-fuel ratio variation coefficient, by the variable-gain sequential least-squares method expressed by the equations (3) to (9) in FIG. 4 shown in FIG. 4, it goes without saying that the identification algorithm with which the adaptive observer 31 identifies the vector φ(k) of the air-fuel ratio variation coefficient is not limited to this. For example, the air-fuel ratio variation coefficient may be identified by the fixed gain method to which is applied the δ correction method expressed by equations (50) to (57) in FIG. 21.

Figure 22:
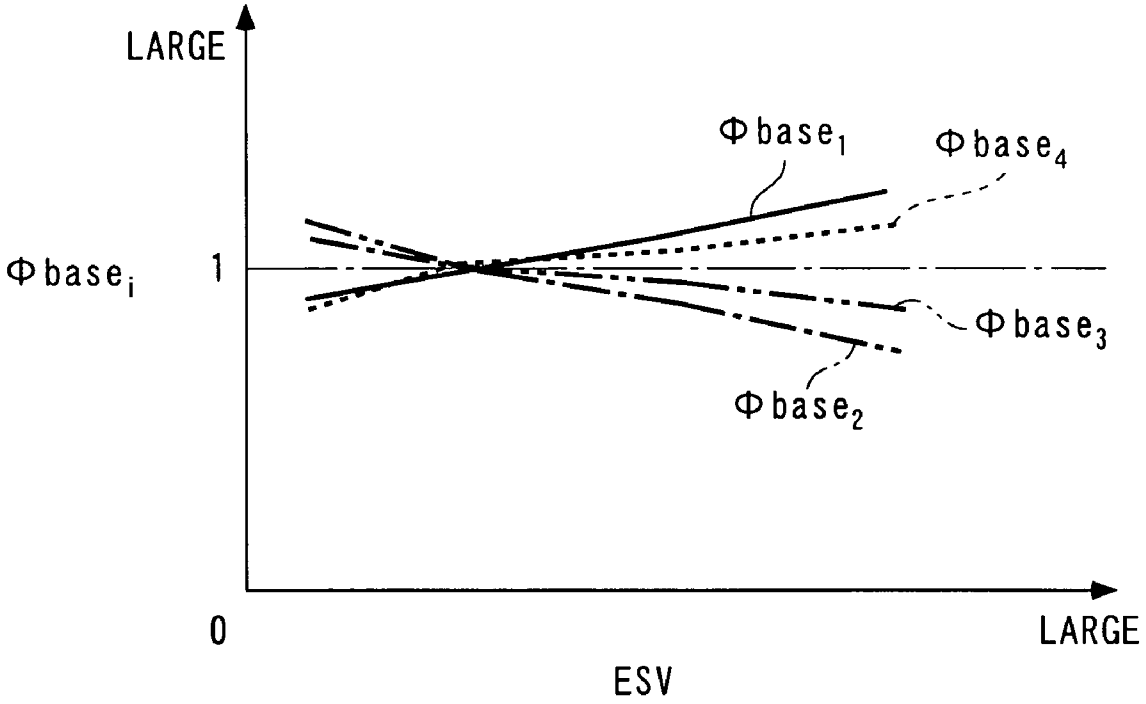
FIG. 22 is a diagram showing an example of a table used in calculating reference values $\Phi base_i$

The symbol φbase in the equation (50) in FIG. 21 represents a reference value vector (model parameter reference value) defined by the equation (51), and four elements of this vector, i.e. reference values Φbase1 to Φbase4 are calculated by searching a table shown in FIG. 22 according to the exhaust gas volume ESV. As shown in FIG. 22, the four reference values Φbase1 to Φbase4 are all set to a value close to a value of 1. Further, the symbol dφ(k) in the equation (50) represents a correction term (correction component) defined by the equation (52), and calculated by the equations (53) to (57).

When the vector φ(k) of the air-fuel ratio variation coefficient is identified by the fixed gain method to which the δ correction method is applied, the computing time can be reduced compared with the case of using the sequential least-squares method, and the computational load on the ECU 2 can be reduced. As a result, it is possible to reduce the size and cost of the ECU 2. Moreover, even when the engine 3 is in an operating condition in which the air-fuel ratio changes violently, such as a transient operating condition, the identified value of the vector $\phi(k)$ can be constrained to values close to a value of 1, which makes it possible to promptly and properly calculate the vector $\phi(k)$ of the air-fuel ratio variation coefficient representative of the variation in air-fuel ratio between the cylinders as a value in which the behavior of the air-fuel ratio is properly reflected, whereby the stability of the air-fuel ratio control can be enhanced.

When the tables shown in FIG. 22 cannot be provided in advance, all the four elements Φbase1 to Φbase4 may be set to a value of 1.

Further, although in the present embodiment, the basic fuel injection amount TIBS is calculated by searching the table according to the intake air amount GAIR, in the step 2 in FIG. 12, this is not limitative, but the basic fuel injection amount TIBS may be calculated by searching a map according to the intake pipe absolute pressure PBS and the engine speed NE.

Figure 23:
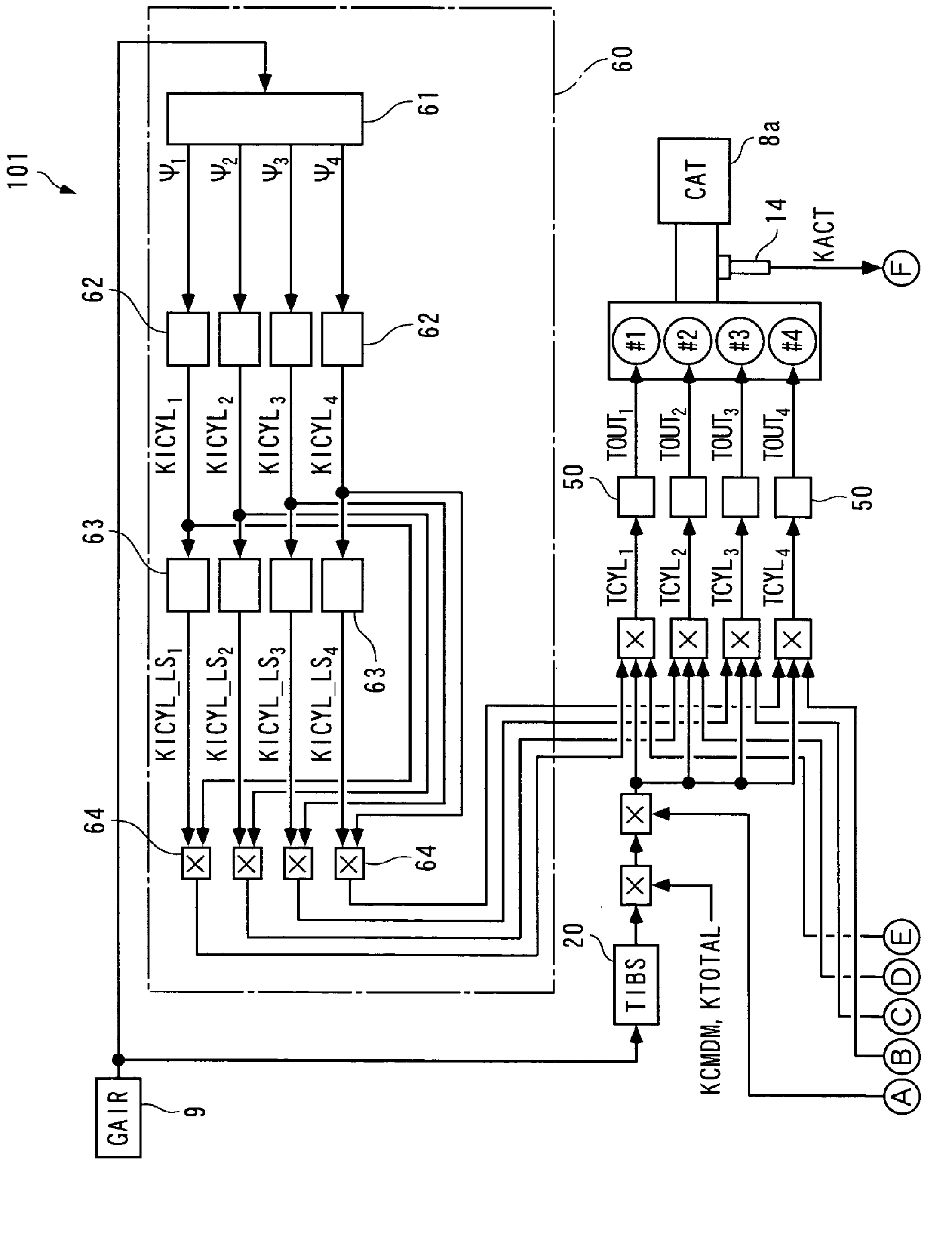
FIG. 23 is a block diagram showing the arrangement of components of a control system according to a second embodiment of the present invention, with a third air-fuel ratio controller as the center thereof.
Figure 24:
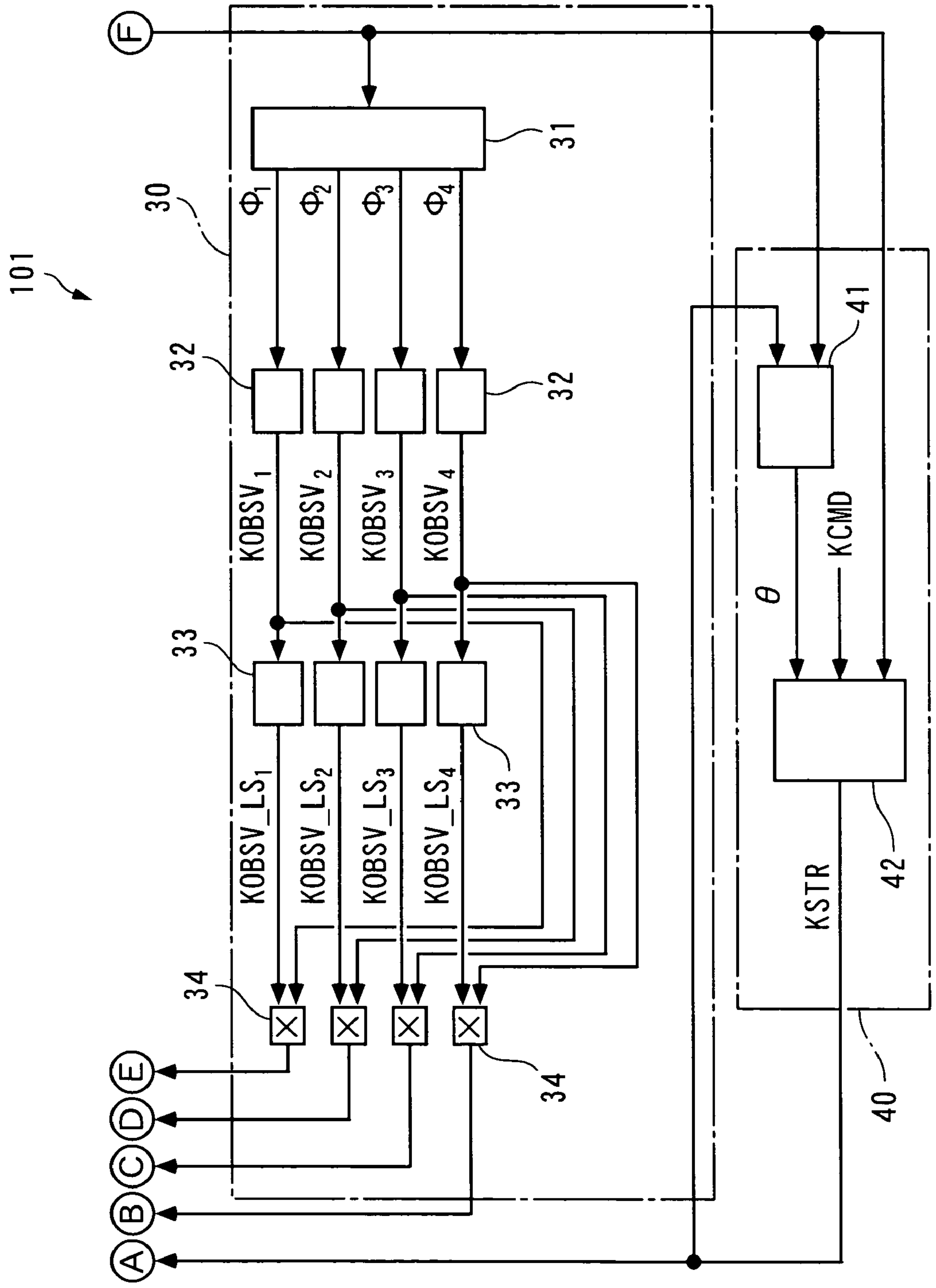
FIG. 24 is a block diagram showing the arrangement of components of the control system according to the second embodiment, with first and second air-fuel ratio controllers as the center thereof.

Next, a description will be given of the control system 101 according to a second embodiment of the present invention. The control system 101 is distinguished from the control system 101 according to the first embodiment in that as shown in FIGS. 23 and 24 by a third air-fuel ratio controller 60 which is additionally provided, and the remainder is identical in construction. Therefore, the following description will be mainly given of the third air-fuel ratio controller 60 (third fuel amount-correcting means), with the component parts identical to those of the first embodiment being designated by the same reference numerals, and description thereof being omitted unless otherwise required.

In the control system 101, as described hereinafter, the third air-fuel ratio controller 60 calculates an intake air amount variation correction coefficient $KICYL_i$ and a learned correction value $KICYL\_LS_i$ thereof so as to correct variation in intake air amount between the cylinders. Then, the basic fuel injection amount TIBS is multiplied by the corrected target air-fuel ratio KCMDM, the total correction coefficient KTOTAL, the feedback correction coefficient KSTR, the air-fuel ratio variation correction coefficient $KOBSV_i$, the learned correction value $KOBSV\_LS_i$ of the air-fuel ratio variation correction coefficient, the intake air amount variation correction coefficient $KICYL_i$, and a learned correction value $KICYL\_LS_i$ of the intake air amount variation correction coefficient, whereby the demanded fuel injection amount $TCYL_i$ is calculated, on a cylinder-by-cylinder basis. Then, the fuel attachment-dependent correction section 50 calculates the final fuel injection amount $TOUT_i$ based on the demanded fuel injection amount $TCYL_i$, on a cylinder-by-cylinder basis.

Figure 25:
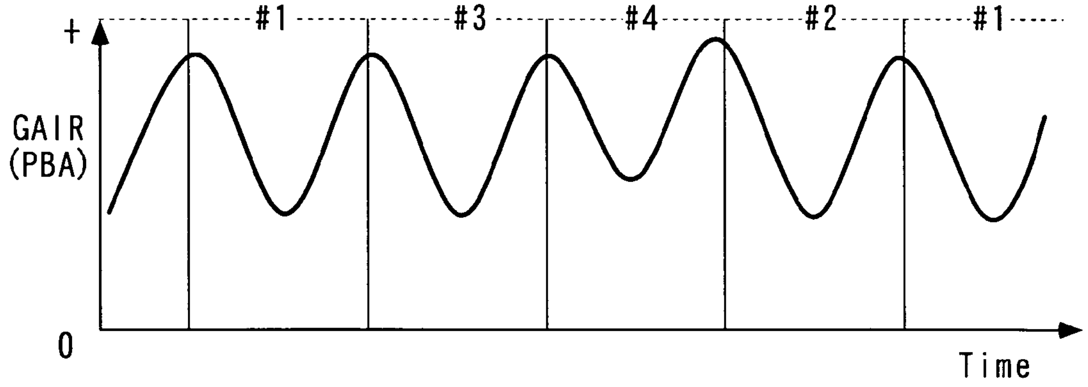
FIG. 25 is a diagram showing a waveform of pulsation of intake air detected by an air flow sensor.

Next, a description will be given of the third air-fuel ratio controller 60. As shown in FIG. 25, when the intake air amount GAIR to be supplied to the engine 3 is detected by the air flow sensor 9, pulsation of the intake air caused by the suction behavior of each cylinder is also detected. When there occurs variation in intake air amount between the cylinders, the pulsation of intake air becomes irregular as shown in FIG. 25. That is, FIG. 25 shows a case in which the intake air amount in the fourth cylinder #4 is smaller than those of the other cylinders.

This air-fuel ratio controller 60 estimates the variation in intake air between the cylinders, for correction of the fuel injection amount based on the estimated variation, and is comprised of an adaptive observer 61, an intake air amount variation correction coefficient-calculating section 62, a learned correction value-calculating section 63, and a multiplication section 64. In this third air-fuel ratio controller 60, with algorithms described hereinbelow, the adaptive observer 61 (simulation value-generating means, estimation means, identification means, delay means) calculates an intake air amount variation coefficient $\Psi_i$, on a cylinder-by-cylinder basis, and the intake air amount variation correction coefficient-calculating section 62 (first control means, third correction value-calculating means) calculates the intake air amount variation correction coefficient $KICYL_i$, on a cylinder-by-cylinder basis. Further, the learned correction value-calculating section 63 (learned correction value-calculating means) calculates the learned correction value $KICYL\_LS_i$ of the intake air amount variation correction coefficient, on a cylinder-by-cylinder basis. Further, the multiplication section 64 (correction means) multiplies the intake air amount variation correction coefficients $KICYL_1$ to $KICYL_4$ by the learned correction values $KICYL\_LS_1$ to $KICYL\_LS_4$, respectively, that is, the intake air amount variation correction coefficient $KICYL_i$ is corrected by the learned correction value $KICYL\_LS_i$.

Figure 26:
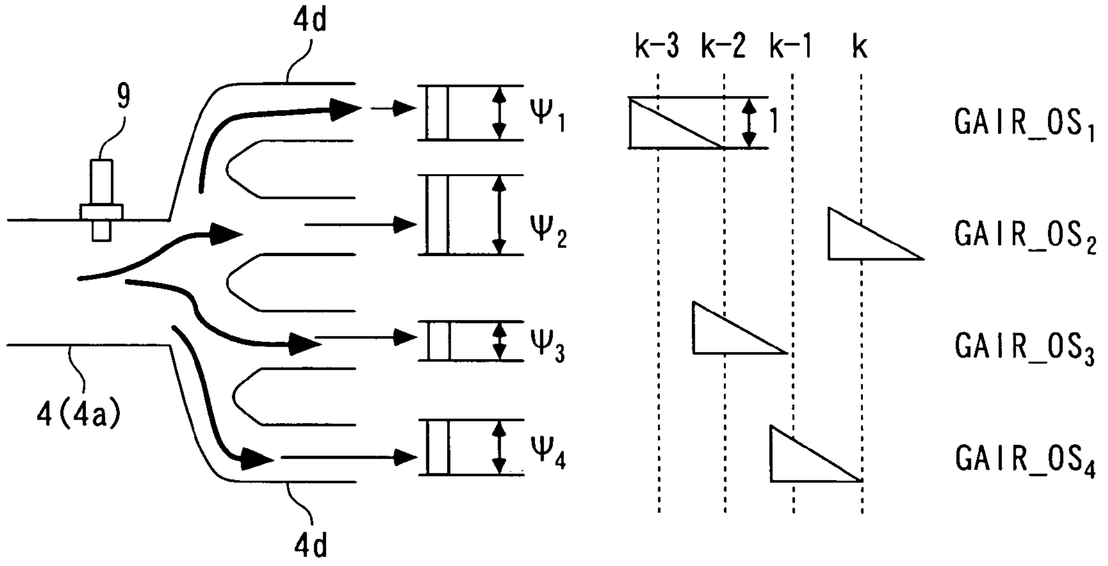
FIG. 26 is a schematic diagram useful for explaining a calculation algorithm with which an intake air amount variation coefficient Ψ is calculated by an adaptive observer of the third air-fuel ratio controller.

Next, a description will be given of the algorithm of the adaptive observer 61. First, as shown in FIG. 26, the intake system of the engine 3 is regarded as a system which is represented by four simulation values $GAIR\_OS_1$ to $GAIR\_OS_4$ and four intake amount variation coefficients $\Psi_1$ to $\Psi_4$. These simulation values $GAIR\_OS_1$ to $GAIR\_OS_4$ are values simulating the intake start timing of intake air and the intake air behavior, on a cylinder-by-cylinder basis, and the intake air amount variation coefficient $\Psi_i$ represents variation in intake air amount between the cylinders and the amount of change in the intake air behavior. When this system is modeled into a discrete-time system model, there is obtained an equation (58) in FIG. 27. In the equation (58), the symbol d' represents dead time (predetermined delay time) which the air takes to flow in the intake pipe 4 from the air flow sensor 9 to each cylinder, and is set to a predetermined fixed value in the present embodiment. The dead time d' may be set depending on an operating condition (e.g. the engine speed NE) of the engine 3.

The adaptive observer 61 according to the present embodiment uses an equation formed by replacing the left side of the equation (58) by the estimation value GAIR_EST(k) of the intake air amount, i.e. a model represented by an equation (59) in FIG. 27, and a signal generator 61*a* generates the simulation value $GAIR\_OS_i$, as described hereinafter. At the same time, a vector $\psi(k)$ of the intake air amount variation coefficient $\Psi_i$ as a model parameter of the equation (59) is identified by the variable-gain sequential least-squares method expressed by equations (60) to (66) in FIG. 27 such that the estimation value GAIR_EST (k) becomes equal to the intake air amount GAIR(k−d').

The symbol KP(k) in the equation (60) represents a vector of a gain coefficient, and the symbol ide'(k) represents an identification error. Further, the symbol $\psi(k)^T$ in the equation (61) represents a transposed matrix of $\psi(k)$. The identification error ide'(k) in the equation (60) is calculated by equations (62) to (64) in FIG. 27, and the symbol $\zeta'(k)$ in the equation (63) represents a vector of the simulation value defined by an equation (64). Further, the vector KP(k) of the gain coefficient is calculated by an equation (65) in FIG. 27, and the symbol R(k) in the same equation is a square matrix of order 4 defined by an equation (66) in FIG. 27.

As described above, this adaptive observer 61 identifies the vector $\psi(k)$ of the intake air amount variation coefficient $\Psi_i$ with the algorithm based on the sequential least-squares method shown in the expressions (60) to (66). This makes it possible to remove (filter off) noise-like fluctuating components of the intake air behavior caused by a sudden change in the operating condition of the engine 3 from the intake air amount variation coefficient $\Psi_i$, and thereby calculate the intake air amount variation coefficient $\Psi_i$ as a value substantially indicative of variation in intake air amount between the cylinders.

Figure 28:
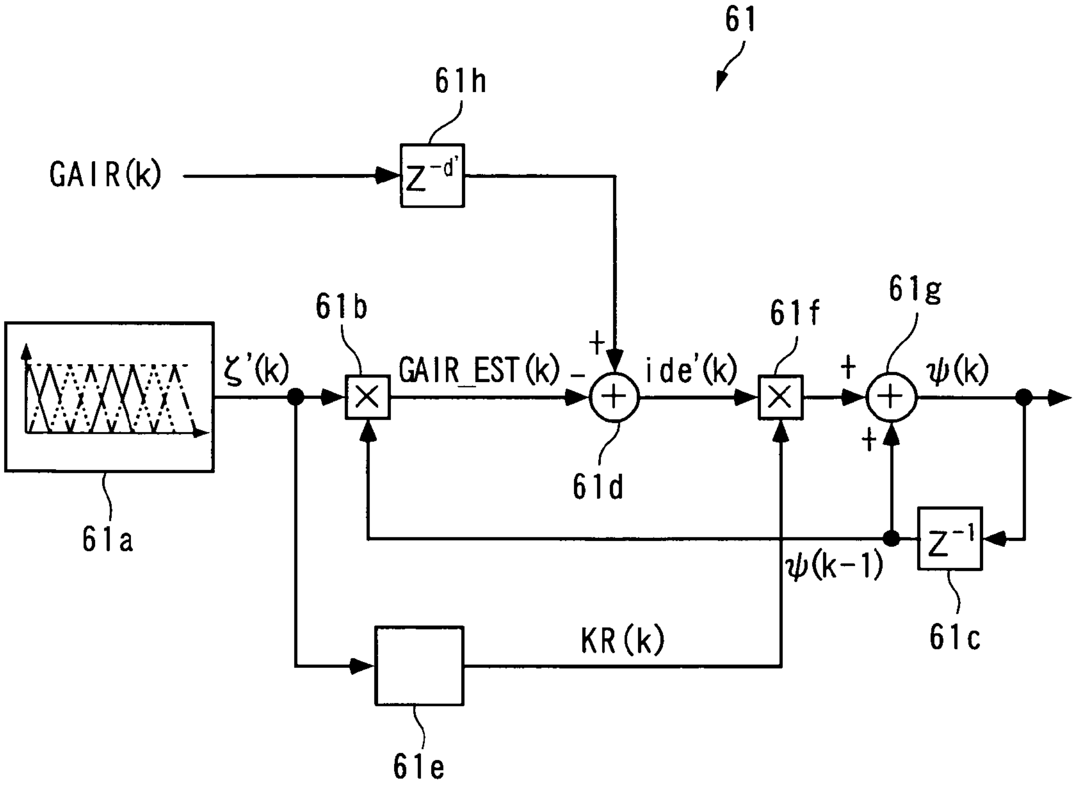
FIG. 28 is a block diagram showing the configuration of the adaptive observer.
Figure 29:
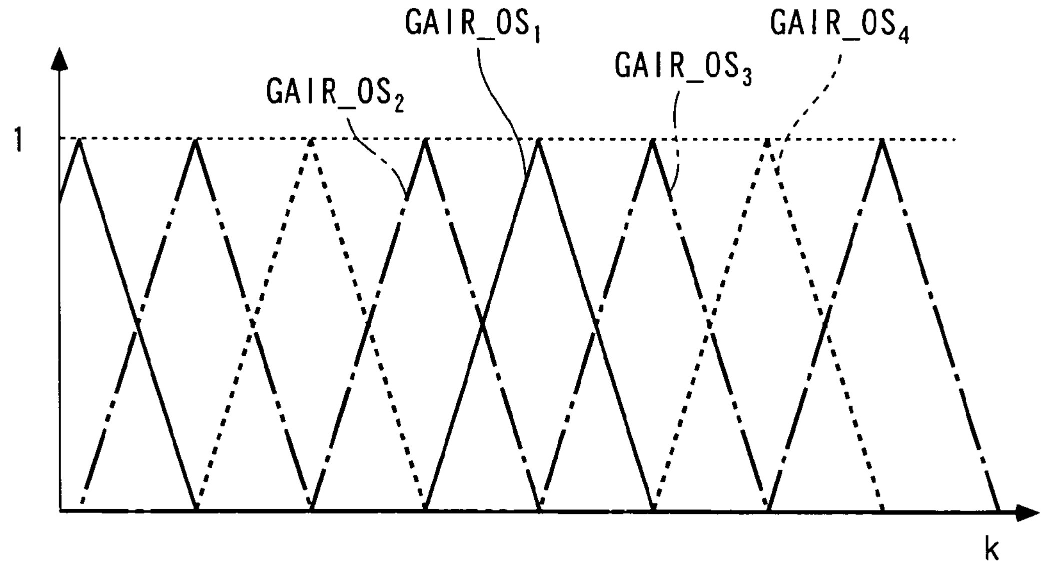
FIG. 29 is a diagram showing changes in a simulation value GAIR_OS output from a signal generator of the adaptive observer.

The configuration of the adaptive observer 61 can be represented by a block diagram shown in FIG. 28, similarly to the adaptive observer 31 of the first air-fuel ratio controller 30. That is, as shown in FIG. 28, in the adaptive observer 61, the signal generator 61*a* generates the vector $\zeta'(k)$ of the simulation values $GAIR\_OS_i$. More specifically, as shown in FIG. 29, the signal generator 61*a* generates the simulation value $GAIR\_OS_i$ as a signal values such having a waveform of a combination of triangular waves and trapezoidal waves formed such that the total sum of the simulation values constantly becomes equal to a value of 1. Further, the multiplier 61*b* generates the estimation value GAIR_EST (k) of the intake air amount as a value obtained by multiplying the vector $\zeta'(k)$ of the simulation values by the vector $\psi(k-1)$ of the intake air amount variation coefficient. Then, the differentiator 61*d* generate the identification error ide'(k) as the difference between the intake air amount GAIR(k−d') and the estimation value GAIR_EST(k).

Further, a logic unit 61*e* generates the vector KP(k) of the gain coefficient based on the vector $\zeta'(k)$ of the simulation values, and a multiplier 61*f* generates the product [ide'(k)·KP(k)] of the identification error ide'(k) and the vector KP(k) of the gain coefficient. Next, an adder 61*g* generates the vector $\psi(k)$ of the intake air amount variation coefficient as the sum of the product [ide'(k)·KP(k)] and the delayed vector $\psi(k-1)$ of the intake air amount variation coefficient.

Next, an algorithm with which the intake air amount variation correction coefficient-calculating section 62 calculates the intake air amount variation correction coefficient $KICYL_i$ (first input, third correction value). In the intake air amount variation correction coefficient-calculating section 62, first, by an equation (67) in FIG. 30, the moving average value $\Psi ave(k)$ of the intake air amount variation coefficient is calculated based on the vector $\psi(k)$ of the intake air amount variation coefficient calculated by adaptive observer 61, i.e. the four intake air amount variation coefficients $\Psi_1(k)$ to $\Psi_4(k)$. Next, the intake air amount variation correction coefficient $KICYL_i$ is calculated by the I-PD control (proportional/differential-preceding PID control) algorithm, on a cylinder-by-cylinder basis, such that the intake air amount variation coefficient $\Psi_i(k)$ is caused to converge to the moving average value $\Psi ave(k)$. This I-PD control algorithm is expressed by equations (68) and (69) in FIG. 30.

Here, the air-fuel ratio control for correcting variation in intake air amount between the cylinders by the third air-fuel ratio controller 60 has a possibility of interfering with the air-fuel ratio control for correcting the variation in air-fuel ratio between the cylinders by the first air-fuel ratio controller 30. To avoid this inconvenience, it is necessary to make the speed at which the controller 30 causes the intake air amount variation coefficient $\Psi_i(k)$ to converge to the moving average value $\Phi ave$ and the speed at which the controller 60 causes the intake air amount variation coefficient $\Psi_i(k)$ to converge to the moving average value $\Psi ave(k)$, different from each other.

In the present embodiment, the feedback gains FI', GI', and HI' in the above equation (68) are set such that the absolute values thereof are larger than the corresponding absolute values of the feedback gains FI, GI, HI in the equation (11) referred to hereinabove. In other words, the feedback gains FI', GI', and HI' are set such that there is satisfied the relationship of $0<|FI|<|FI'|$, $0<|GI|<|GI'|$, and $0<|HI|<|HI'|$. This makes it possible to control the air-fuel ratio such that the converging speed at which the intake air amount variation coefficient $\Psi_i(k)$ is caused to converge to the moving average value $\Psi ave(k)$ is faster than the converging speed at which the air fuel ratio variation coefficient $\Phi_i(k)$ is caused to converge to the moving average value $\Phi ave$. This is because due to a higher S/N ratio of the air flow sensor 9 than that of the LAF sensor 14, by setting the feedback gains to satisfy the above-mentioned relationship, the stability of the air-fuel ratio control can be ensured as a whole while preventing the two types of the air-fuel ratio control from interfering with each other.

Moreover, the intake air amount variation correction coefficient $KICYL_i$ is calculated with the I-PD control algorithm such that the intake air amount variation coefficient $\Psi_i(k)$ is caused to converge to the moving average value $\Psi ave(k)$ thereof. This makes it possible to provide control such that overshooting is not caused in the behavior of the intake air amount variation coefficient $\Psi_i(k)$ being caused to converge to the moving average value $\Psi ave(k)$. This makes it possible to prevent the controllability of the second air-fuel ratio controller 40 for the air-fuel ratio control from being lowered, when the third air-fuel ratio controller 60 carries out the air-fuel ratio control for correcting variation in intake air amount between the cylinders.

Figures 30, 31:
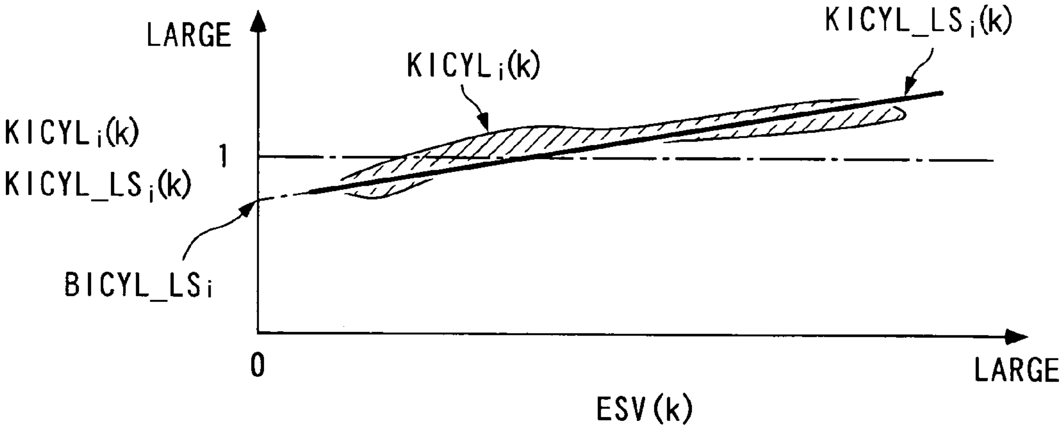
FIG. 30 is a diagram showing mathematical expressions of an I-PD control algorithm with which an intake air amount variation correction coefficient KICYL is calculated.
FIG. 31 is a diagram showing the relationship between the exhaust gas volume ESV, the intake air amount variation correction coefficient KICYL, and a learned correction value KICYL_LS thereof.

Next, a description will be given of an algorithm with which the learned correction value-calculating section 63 calculates the learned correction value $KOBSV\_LS_i$ of the intake air amount variation correction coefficient $KICYL_i$. The intake air amount variation correction coefficient $KICYL_i$ is susceptible to operating conditions of the engine 3, and when the operating conditions of the engine 3 are changed, the coefficient $KICYL_i$ is changed accordingly. FIG. 31 shows the relationship between the exhaust gas volume ESV(k) as an operating condition parameter indicative of an operating condition of the engine and the intake air amount variation correction coefficient $KICYL_i(k)$.

Referring to FIG. 31, it can be seen, similarly to the air-fuel ratio variation correction coefficient $KOBSV_i(k)$, that an approximate value i.e. estimation value of the intake air amount variation correction coefficient $KICYL_i(k)$ can be calculated by a first-degree equation using the intake air amount variation correction coefficient $KICYL_i(k)$ as a dependent variable and the exhaust gas volume ESV(k) as an independent variable. Therefore, in the learned correction value-calculating section 63, the learned correction value $KICYL\_LS_i(k)$ of the intake air amount variation correction coefficient is defined as an estimation value calculated by a regression equation expressed by an equation (70) in FIG. 32, and a vector $\theta ICYL\_LS_i(k)$ of a regression coefficient $AICYL\_LS_i$ and a constant term $BICYL\_LS_i$ (hereinafter referred to as "the regression coefficient vector") is calculated by a sequential least-squares method expressed by equations (71) to (77) shown in FIG. 32.

In this equation (71), the symbol $KU_i(k)$ represents a vector of a gain coefficient, and the symbol $Eic_i(k)$ represents an error. Further, the error $Eic_i(k)$ is calculated using an equation (73) in FIG. 32. Further, the vector KUi(k) of the gain coefficient is calculated using an equation (76) in FIG.

32, and the symbol $U_i(k)$ in this equation (76) represents a square matrix of order 2 defined by an equation (77) in FIG. 32.

Further, the learned correction value KICYL_$LS_i(k)$ is more specifically calculated using an equation (78) in FIG. 32. It should be noted that when the engine 3 is in an extreme operating condition or operating environment, the calculation of the regression coefficient AICYL_$LS_i$ and the constant term BICYL_$LS_i$ by the sequential least-squares method is avoided, and the immediately preceding value θICYL_$LS_i(k-1)$ of the regression coefficient vector is used as the current value θICYL_$LS_i(k)$ in calculation of the learned correction value KICYL_$LS_i(k)$.

With the algorithm expressed by the equations (71) to (78), the learned correction value-calculating section 63 calculates the learned correction value KICYL_$LS_i(k)$ such that the learned correction value KICYL_$LS_i(k)$ converges to the product of the learned correction value KICYL_$LS_i$ (k) and the intake air amount variation correction coefficient $KICYL_i(k)$.

It should be noted that as shown in FIG. 25, even when the intake air absolute pressure PBA is detected by the intake pipe absolute pressure sensor 11, it is possible to detect pulsation of intake air, so that with an algorithm in which the parameter represented by the intake air amount GAIR in the above equations (58) to (78) is replaced by a parameter represented by the intake pipe absolute pressure PBA, and using the intake pipe absolute pressure PBA detected by the intake pipe absolute pressure sensor 11, it is possible to form an air-fuel ratio controller for correcting variation in the intake air amount between the cylinders.

Figure 33:
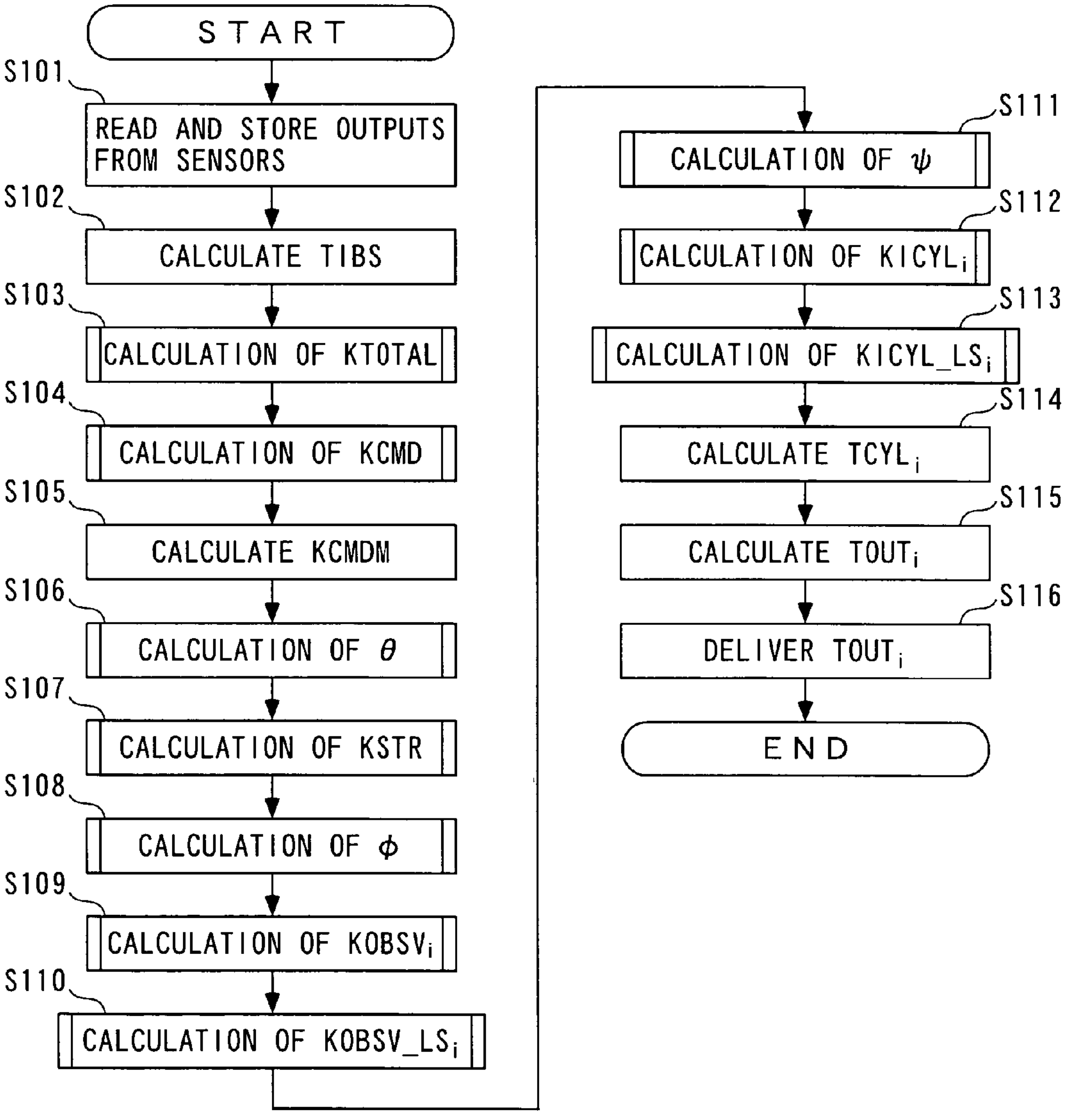
FIG. 33 is a flowchart showing an air-fuel ratio control process executed by the control system according to the second embodiment.

In the following, an air-fuel ratio control process according to the second embodiment will be described with reference to FIGS. 33 to 36. FIG. 33 shows a main routine for carrying out the control process, which is executed by an interrupt handling routine in synchronism with inputting of each pulse of the TDC signal. As shown in FIG. 33, the steps other than steps 111 to 113 are identical to the steps 1 to 13 in FIG. 12, and therefore, a description will be given mainly of the steps 111 to 113.

More specifically, in a step 110, the learned correction value KOBSV_$LS_i$ of the air-fuel ratio variation correction coefficient is calculated, and then, the vector ψ of the intake air amount variation coefficient is calculated as described in detail hereinafter.

Then, the process proceeds to a step 112, wherein the intake air amount variation correction coefficient $KICYL_i$ is calculated, and to a step 113, wherein the learned correction value KICYL_$LS_i$ of the intake air amount variation correction coefficient is calculated. Next, similarly to the steps 11 to 13, the steps 114 to 116 are executed, followed by terminating the present process.

Figure 34:
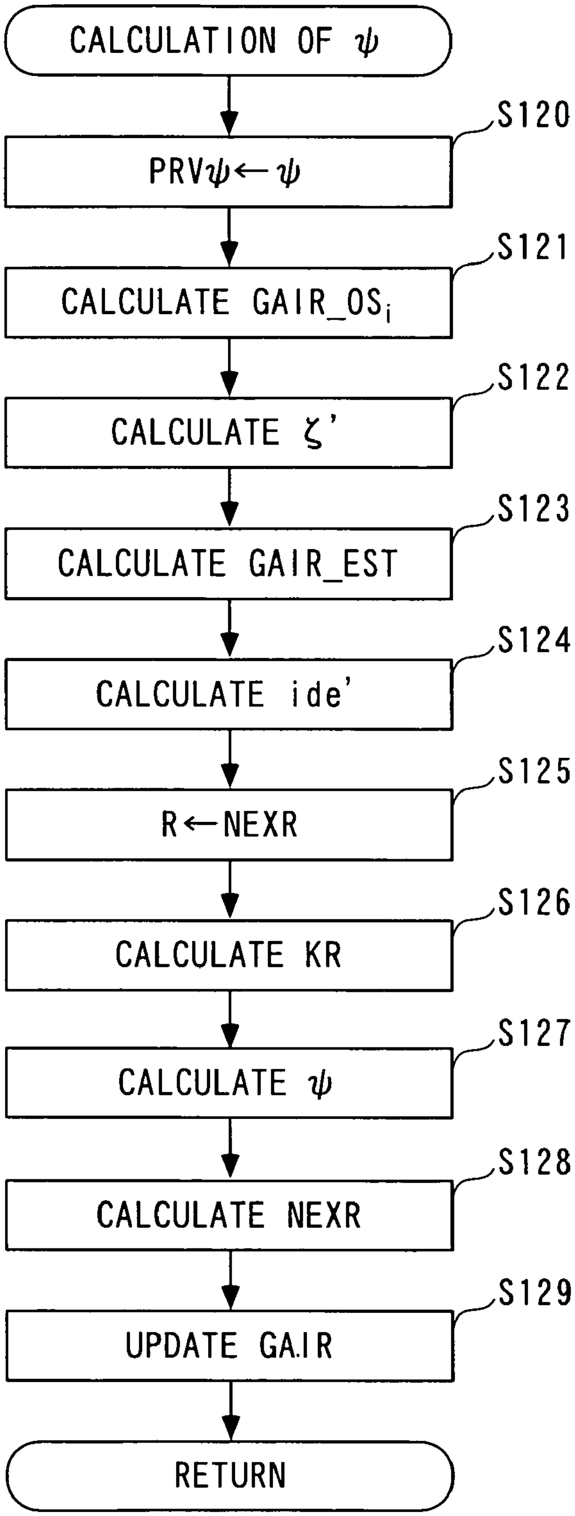
FIG. 34 is a flowchart showing a process for calculating a vector ψ of the intake air amount variation coefficient, executed in a step 111 in FIG. 34.

Next, the process for calculating the vector ψ of the intake air amount variation coefficient executed in the step 111 will be described in detail with reference to FIG. 34. In this process, by the same method of calculation of the vector ϕ of the air-fuel ratio variation coefficient described hereinabove with reference to FIG. 15, the vector ψ of the intake air amount variation coefficient is calculated. More specifically, in a step 120, the vector ψ of the intake air amount variation coefficient calculated in the immediately preceding loop and stored in the RAM is set to the immediately preceding value PRVψ[=ψ(k−1)].

Then, the process proceeds to a step 121, wherein the current value GAIR_$OS_i$ of the simulation value is calculated, and then to a step 122, wherein the vector ζ' of the simulation value is calculated by the equation (64) in FIG. 27.

Then, the process proceeds to a step 123, wherein the estimation value GAIR_EST of the intake air amount is calculated by the equation (63) in FIG. 27, and then to a step 124, wherein the identification error ide' is calculated by the equation (62) in FIG. 27.

Then, the process proceeds to a step 125, wherein the next value NEXR [=R(k+1)] of the square matrix calculated in the immediately preceding loop is set to the current value R thereof, and then to a step 126, wherein the vector KR of the gain coefficient is calculated by the equation (65) in FIG. 27.

Then, the process proceed to a step 127, wherein the vector ψof the intake air amount variation coefficient is calculated by the equation (60) in FIG. 27, and then to a step 128, wherein the next value NEXR [=R(k+1)] of the square matrix is calculated by the equation (66) in FIG. 27.

Then, the process proceeds to a step 129, wherein a predetermined number (twelve, in the present embodiment) of values of the intake air amount GAIR stored in the RAM, are updated. More specifically, each value of the intake air amount GAIR stored in the RAM is set to an older value by one control cycle. For example, the current value GAIR(k) is set to the immediately preceding value GAIR(k−1), the immediately preceding value GAIR(k−1) is set to the second preceding value GAIR(k−2), and so forth, followed by terminating the present process.

Figure 35:
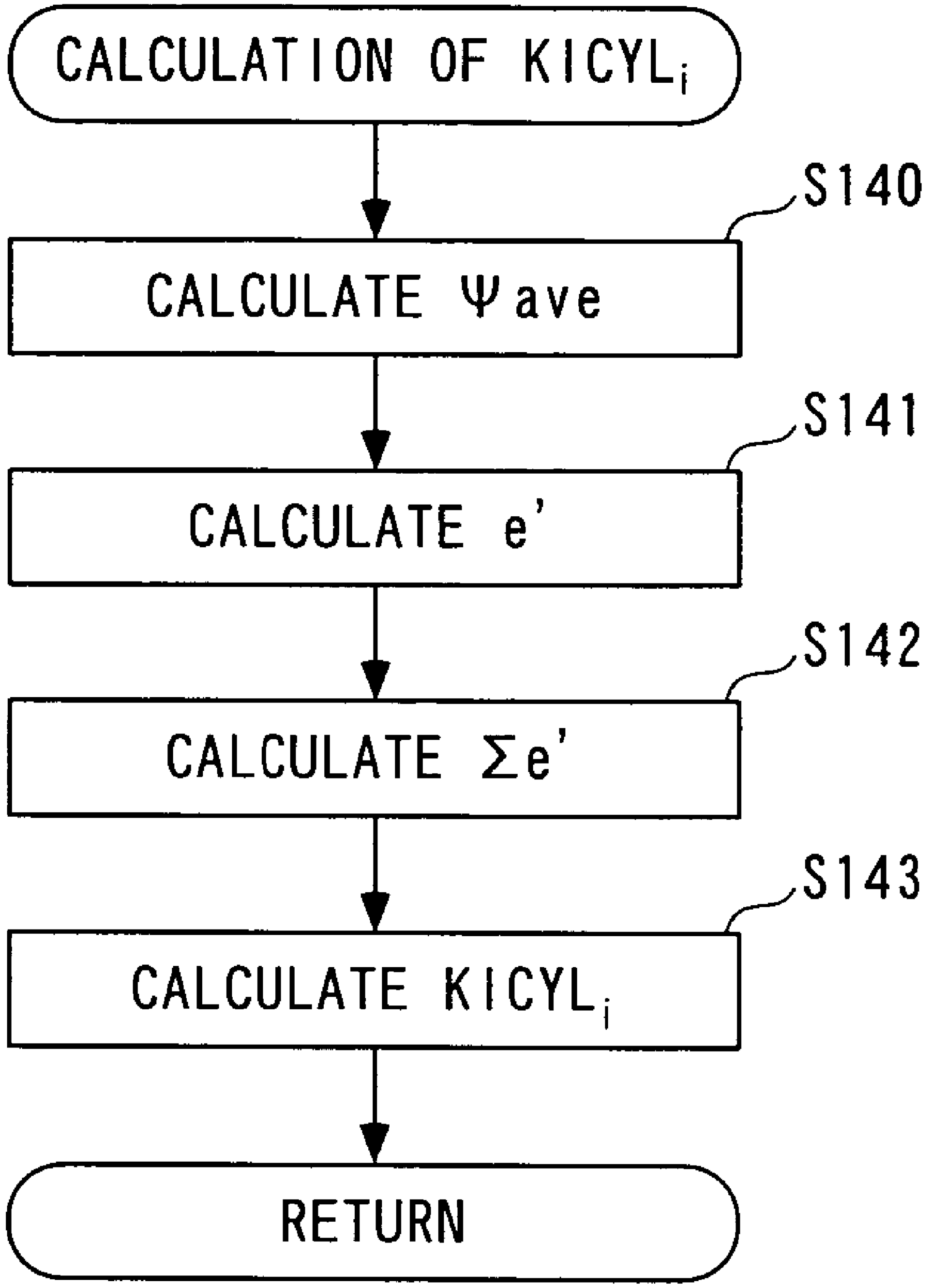
FIG. 35 is a flowchart showing a process for calculating an intake air amount variation correction coefficient $KICYL_i$, executed in a step 112 in FIG. 34.

Next, the process for calculating the intake air amount variation correction coefficient $KICYL_i$ in the step 112 will be described with reference to FIG. 35. In this process, the intake air amount variation correction coefficient $KICYL_i$ is calculated in a manner similar to the calculation of the air-fuel ratio variation correction coefficient $KOBSV_i$, described hereinbefore with reference to FIG. 16. More specifically, first, in a step 140, the moving average value Ψave of the intake air amount variation coefficient is calculated by the equation (67) in FIG. 30.

Then, the process proceeds to a step 141, wherein the following error e' is calculated by the equation (69) in FIG. 30, and then to a step 142, wherein the integral value Σe' of the following error is calculated. Then, the process proceeds to a step 143, wherein the air-fuel ratio variation correction coefficient $KICYL_i$ is calculated using the moving average value Ψave of the intake air amount variation coefficient and the integral value Σe' of the following error calculated in the steps 140 and 142, respectively, by the equation (68) in FIG. 30, followed by terminating the present process.

Figure 36:
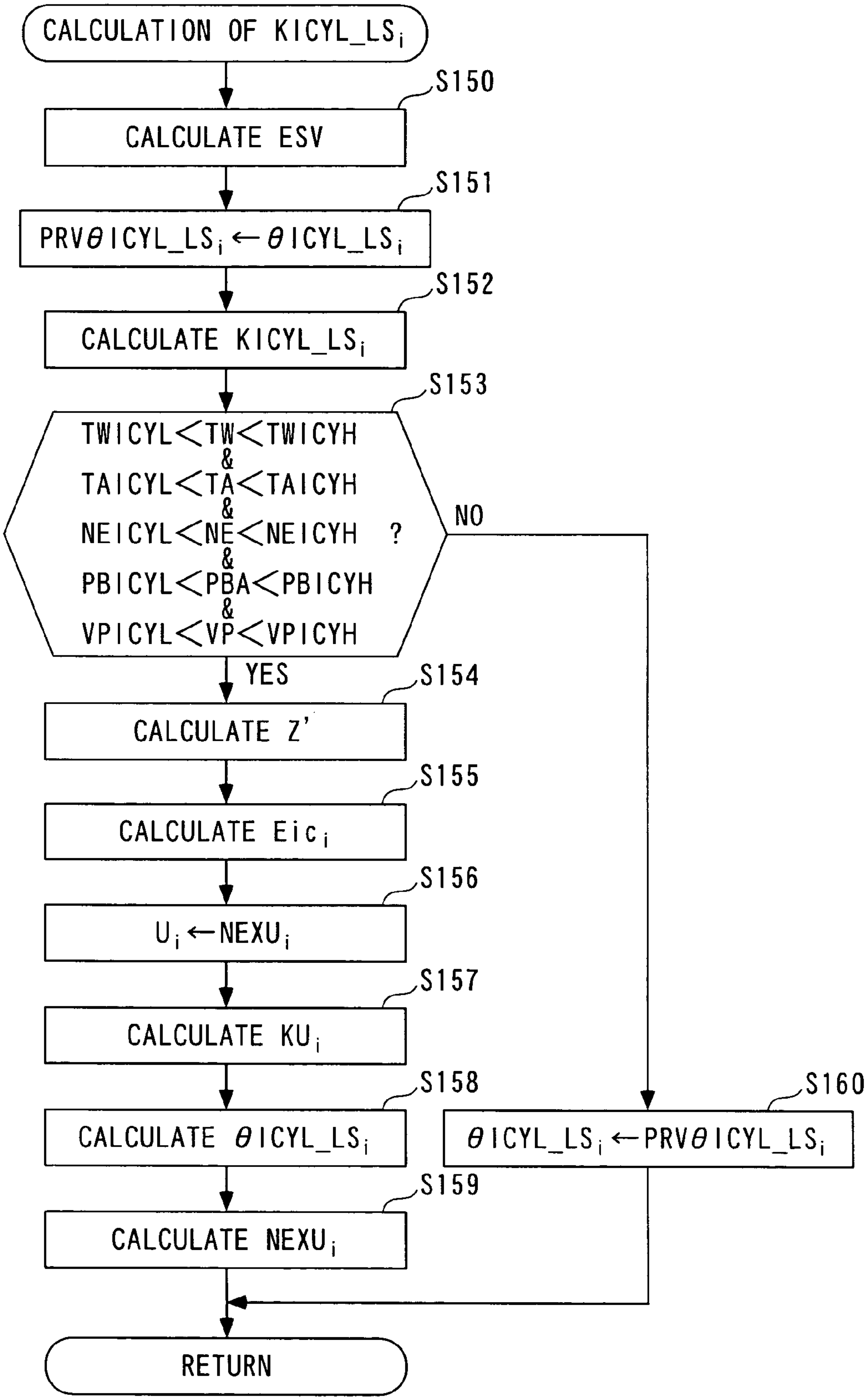
FIG. 36 is a flowchart showing a process for calculating the learned correction value $KICYL\_LS_i$ of the intake air amount variation correction coefficient, executed in a step 113 in FIG. 34.

Next, the process for calculating the learned correction value KICYL_$LS_i$ of the intake air amount variation correction coefficient in the step 113 will be described with reference to FIG. 36. In this process, the learned correction value KICYL_$LS_i$ of the intake air amount variation correction coefficient is calculated in a manner similar to the calculation of the learned correction value KOBSV_$LS_i$ of the air-fuel ratio variation correction coefficient described hereinbefore with reference to FIG. 17. More specifically, first, in a step 150, the exhaust gas volume ESV is calculated using the equation (13) in FIG. 9, referred to hereinbefore.

Then, the process proceeds to a step 151, wherein the value of the regression coefficient vector θICYL_$LS_i$ calculated in the immediately preceding loop is set to the immediately preceding value PRVθICYL_$LS_i$ [=θICYL_$LS_i(k-1)$] thereof.

Then, the process proceeds to a step 152, wherein the learned correction value KICYL_$LS_i$ is calculated using the equation (78) in FIG. 32, referred to hereinbefore. Thereafter, the process proceeds to a step 153, wherein it is determined whether or not all the following five conditions (a6) to (a10) are satisfied:

(a6) The engine coolant temperature TW is higher than a predetermined lower limit value TWICYL and at the same time lower than a predetermined higher limit value TWICYH.

(a7) The intake air temperature TA is higher than a predetermined lower limit value TAICYL and at the same time lower than a predetermined higher limit value TWICYH.

(a8) The engine speed NE is higher than a predetermined lower limit value NEICYL and at the same time lower than a predetermined higher limit value NEICYH.

(a9) The intake pipe absolute pressure PBA is higher than a predetermined lower limit value PBICYL and at the same time lower than a predetermined higher limit value PBICYH.

(a10) The vehicle speed VP is higher than a predetermined lower limit value VPICYL and at the same time lower than a predetermined higher limit value VPICYH.

When all of the five conditions (a6) to (a10) are satisfied, it is judged that the engine is in an operating condition in which the regression coefficient vector $\theta ICYL\_LS_i$ should be calculated by the sequential least-squares method, so that the process proceeds to a step 154, wherein a vector Z' of the exhaust gas volume is calculated using the equation (75) in FIG. 32, referred to hereinbefore.

Then, the process proceeds to a step 155, wherein the error $Eic_i$ is calculated using the equation (73) in FIG. 32, referred to hereinbefore, and then to a step 156, wherein a next value $NEXU_i$ [$=U_1(k+1)$] of the square matrix calculated in the immediately preceding loop, stored in the RAM, is set to the current value $U_i$ thereof.

Then, the process proceeds to a step 157, wherein the vector $KU_i$ of the gain coefficient is calculated using the equation (76) in FIG. 32, referred to hereinbefore, and then to a step 158, wherein the regression coefficient vector $\theta ICYL\_LS_i$ is calculated using the equation (71) in FIG. 32, referred to hereinbefore. Then, the process proceeds to a step 159, wherein the next value $NEXU_i$ [$=U_i(k+1)$] of the square matrix is calculated using the equation (77) in FIG. 32, referred to hereinbefore, followed by terminating the present process.

On the other hand, when the answer to the question of the step 153 is negative (NO), i.e. at least one of the above five conditions (a6) to (a10) is not satisfied, the process proceeds to a step 160, wherein the immediately preceding value $PRV\theta ICYL\_LS_i$ of the regression coefficient vector set in the step 151 is set to the current value $\theta ICYL\_LS_i$, followed by terminating the present process. This causes the value calculated by the sequential least-squares method in the steps 154 to 159 e.g. in the immediately preceding loop to be used as the immediately preceding value PRV $\theta ICYL\_LS_i$ of the regression coefficient vector in the step 151 in the next loop.

As described above, according to the control system 101 of the second embodiment, the first air-fuel ratio controller 30 calculates the air-fuel ratio correction coefficient $KOBSV_i$ and the learned correction value $KOBSV\_LS_i$ thereof, and the second air-fuel ratio controller 40 calculates the feedback correction coefficient KSTR. Further, the third air-fuel ratio controller 60 calculates the intake air amount variation coefficient $\Psi_i$ and calculates the intake air amount variation correction coefficient $KICYL_i$ and the learned correction value $KICYL\_LS_i$ thereof such that the intake air amount variation coefficient $\Psi_i$ converges to the moving average value Ψave thereof. Then, the basic fuel injection amount TIBS is corrected by the calculated feedback correction coefficient KSTR, the air-fuel ratio variation correction coefficient $KOBSV_i$, the learned correction value $KOBSV\_LS_i$, the intake air amount variation correction coefficient $KICYL_i$, and the learned correction value $KICYL\_LS_i$, whereby the final fuel injection amount $TOUT_i$ is calculated, on a cylinder-by-cylinder basis.

The adaptive observer 61 of the third air-fuel ratio controller 60 estimates the estimation value GAIR_EST of the intake air amount GAIR using a model [equation (59)] defined by the estimation value GAIR_EST, the simulation values $GAIR\_OS_i$, and the intake air amount variation coefficients $\Psi_i$, and further the intake air amount variation coefficient $\Psi_i$ as the model parameter by the sequential least-squares method such that the estimation value GAIR_EST becomes equal to the intake air amount GAIR. This makes it possible to remove (filter off) noise-like fluctuating components of the exhaust behavior caused by a sudden change in the operating condition of the engine 3 from the intake air amount variation coefficient $\Psi_i$, and thereby calculate the intake air amount variation coefficient $\Psi_i$ as a value substantially indicative of variation in intake air amount between the cylinders. Therefore, since the basic fuel injection amount TIBS is corrected by the intake air amount variation correction coefficient $KICYV_i$ calculated based on the intake air amount variation coefficient $\Psi_i$, on a cylinder-by-cylinder basis, it is possible, even when the dynamic characteristics of the controlled object are changed due to variation in the response of the air flow sensor 9 and the aging of the same, to calculate the final fuel injection amount $TOUT_i$, on a cylinder-by-cylinder basis, such that variation in intake air amount between the cylinders is corrected while causing changes in the dynamic characteristics of the controlled object to be reflected in the model. As a result, according to the present embodiment, even in controlling the air-fuel ratio of the mixture supplied to the engine 3 having a complicated exhaust system layout, it is possible to realize a highly robust air-fuel ratio control having a large margin of stability, and thereby maintain an excellent emission reduction rate of the catalyst.

Further, the third air-fuel ratio controller 60 calculates the intake air amount variation correction coefficient $KICYL_i$ with the I-PD control algorithm, which makes it possible to calculate the intake air amount variation correction coefficient $KICYL_i$ such that overshooting is not caused in the behavior of the intake air amount variation coefficient $\Psi_i$ being caused to converge to the moving average value Ψave thereof. This makes it possible to correct variation in intake air amount between the cylinders, while preventing the amount of intake air supplied to each cylinder from exhibiting an oscillatory behavior. Moreover, in the I-PD control algorithm, the feedback gains FI', GI', and HI' are set to respective values such that the speed at which the intake air amount variation coefficient $\Psi_i$ converges to the moving average value Ψave becomes higher than the speed at which the air-fuel ratio variation coefficient $\Phi_i$ converges to the moving average value Φave, so that it is possible to prevent the air-fuel ratio control by the third air-fuel ratio controller 60 and the air-fuel ratio control by the first air-fuel ratio controller 30 from interfering with each other. Further, since the intake air amount variation correction coefficient $KICYL_i$ is calculated such that the intake air amount variation coefficient $\Psi_i$ is caused to converge to the moving average value Ψave thereof, it is possible to prevent the air-fuel ratio control by the third air-fuel ratio controller 60 and the air-fuel ratio control by the second air-fuel ratio controller 40 from interfering with each other. Thus, the variation in intake air amount between the cylinders can be corrected while preventing the air-fuel ratio control by the third air-fuel ratio controller 60, the air-fuel ratio control by the first air-fuel ratio controller 30, and the air-fuel ratio control by the second air-fuel ratio controller 40 from interfering with each other.

Furthermore, the third air-fuel ratio controller 60 calculates the learned correction value $KICYL\_LS_i$ of the intake air amount variation correction coefficient $KICYL_i$ by the regression equation [equation (78)] using the exhaust gas volume ESV as an independent variable, and at the same time, the regression coefficient vector $\theta ICYL\_LS_i$ as a vector of the regression coefficient $AICYL\_LS_i$ and the constant term $BICYL\_LS_i$ is calculated by the sequential least-squares method. This makes it possible to calculate the learned correction value $KICYL\_LS_i$ as a value in which the variation in intake air amount between the cylinders is properly reflected therein, even when the engine 3 is in an operating condition which can change drastically, such as a transient operating condition, causing a sudden change in the state of variation in air-fuel ratio between the cylinders. Therefore, even when the engine 3 is in a transient operating condition, it is possible to properly control the air-fuel ratio while compensating for the variation in intake air amount between the cylinders.

Further, the intake air amount variation coefficient $\Psi_i$ and regression coefficient vector $\theta$ $ICYL\_LS_i$ are calculated by the sequential least-squares method, and therefore, differently from the case of using the general least-squares method as the statistical algorithm, it is possible to calculate the intake air amount variation correction coefficient $KICYL_i$ and the learned correction value $KICYL\_LS_i$ every control cycle, even at the start of the air-fuel ratio control. Therefore, by setting the initial values of the $KICYV_i$, and $KICYV\_LS_i$ in advance, it is possible to calculate the final fuel injection amount $TOUT_i$ as a value always corrected by the product of the intake air amount variation correction coefficient $KICYL_i$ and the learned correction value $KICYL\_LS_i$ calculated every control cycle, at the start of the air-fuel ratio control, whereby the controllability at the start of the air-fuel ratio control can be enhanced. This makes it possible to enhance the emission reduction rate of the catalyst at the start of the air-fuel ratio control.

Figure 37:
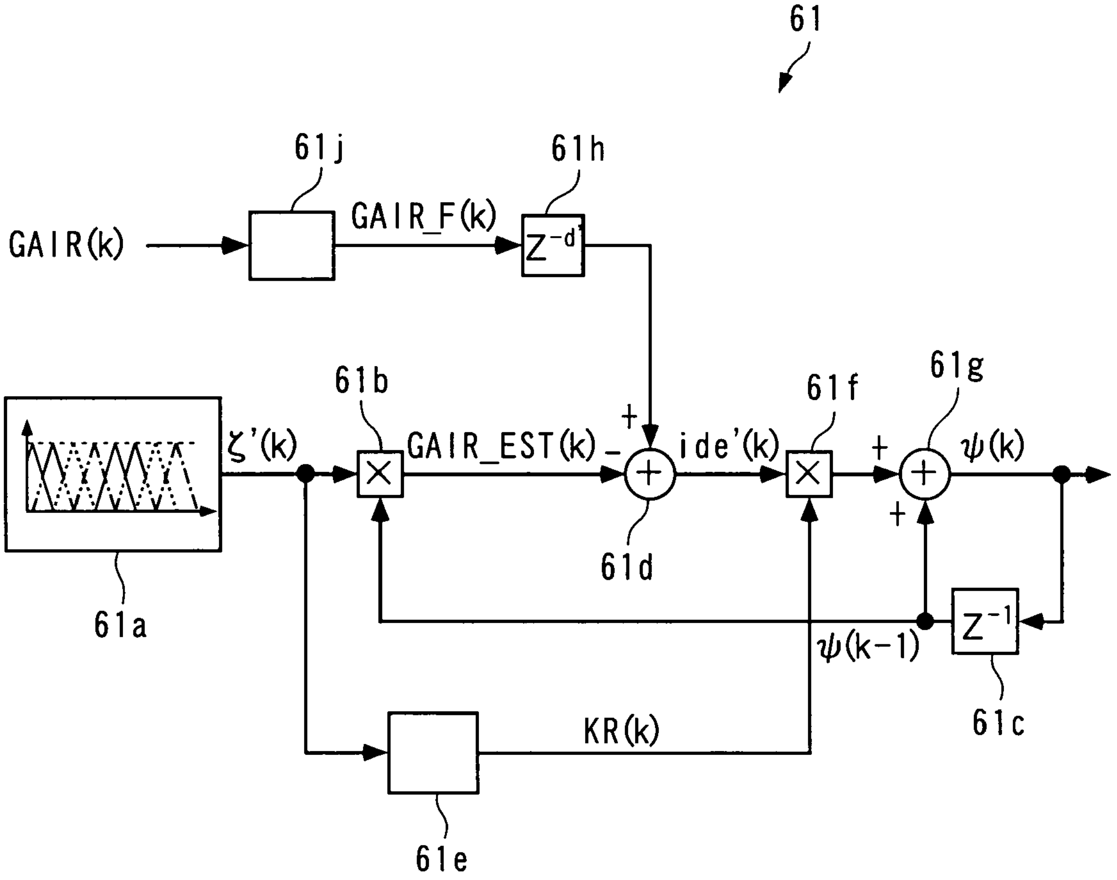
FIG. 37 is a block diagram showing the configuration of a variation of the adaptive observer of the third air-fuel ratio controller.
Figure 38:
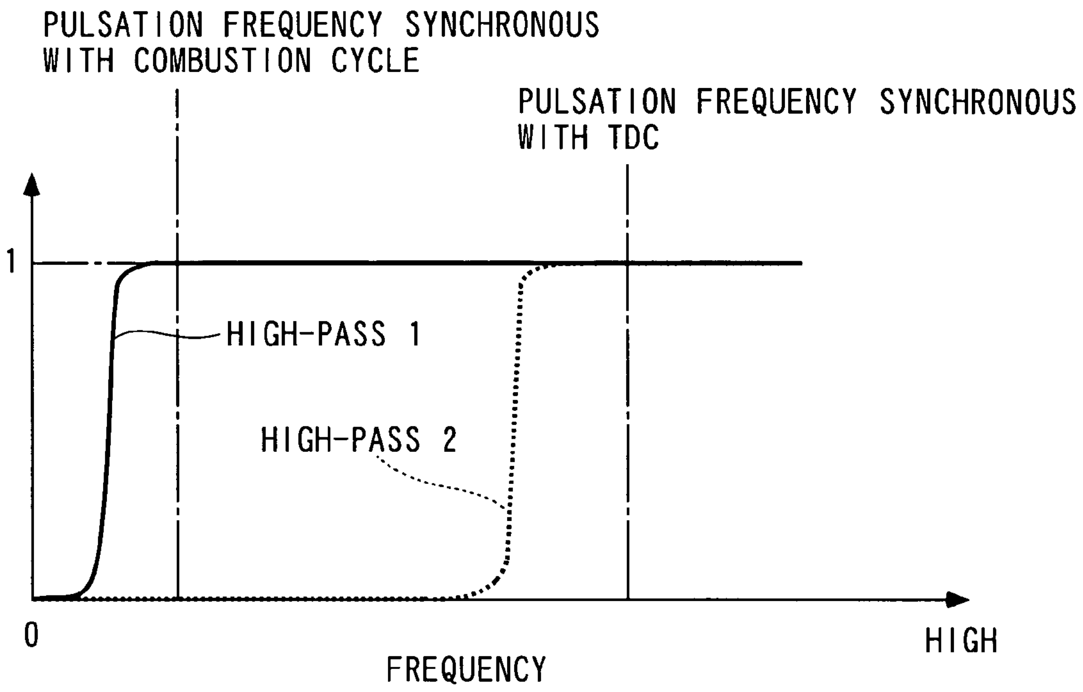
FIG. 38 is a diagram useful in explaining an example of a filter of the variation of the adaptive observer.
Figure 39:
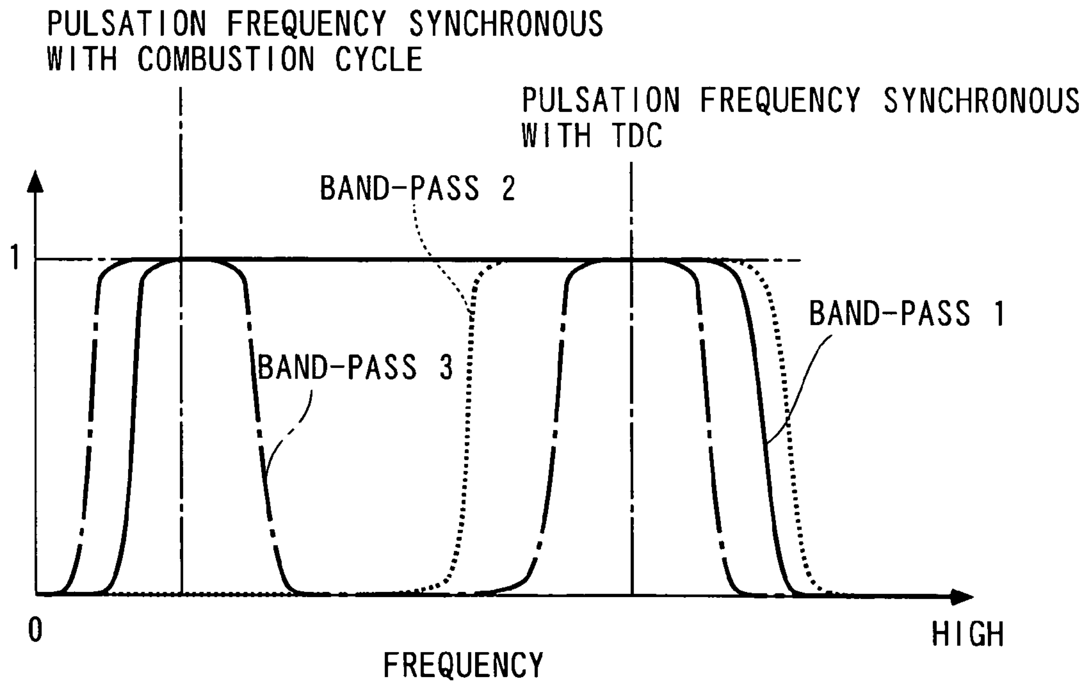
FIG. 39 is a diagram useful in explaining another example of the filter of the variation of the adaptive observer.

It should be noted that in the air-fuel ratio control by the air-fuel ratio controller, the intake air amount GAIR has characteristics that the amount of change in the absolute value thereof can be much larger than that of change in the detected air-fuel ratio KACT, and in such a case, the amount of change in the identified value of the vector $\psi(k)$ of the intake air amount variation coefficient identified with the identification algorithm by the equations (60) to (66) becomes so large that the control system can be unstable. To avoid this, it is only required to configure the adaptive observer 61 as shown in FIG. 37. That is, it is only required that a filter 61*j* (filter means) comprised of at least one band-pass filters 1 to 3 shown in FIG. 39 is provided in the adaptive observer 61, and the air-fuel ratio control is carried out using the filtered value GAIR_F(k) obtained by filtering the intake air amount GAIR(k) by the filter 61*j*.

This filter 61*j* is represented by an equation (79) in FIG. 40. In the equation (79), the symbols m* and n* represent respective predetermined integers. Further, the identification algorithm with which the adaptive observer 61 identifies the vector $\psi(k)$ of the intake air amount variation coefficient is expressed by equations (80) to (86) in FIG. 40. Due to this configuration, even when the engine is in an operating condition in which the intake air amount GAIR(k) changes largely, it is possible to generate the filtered value GAIR_F (k) as a value with reduced range of variation in the intake air amount GAIR(k) while preserving the necessary information for the identification of the vector $\psi(k)$ of the intake air amount variation coefficient. Therefore, by identifying the vector $\psi(k)$ of the intake air amount variation coefficient according to the filtered value GAIR_F(k), it is possible to suppress delay in the identification and enhance the accuracy of the same, thereby further enhance the stability and response of the air-fuel ratio control.

Although in the second embodiment, the first-degree equation is used as the regression equation used in the calculation of the learned correction value $KICYL\_LS_i$, this is not limitative, but an n-th-degree equation (n is an integer equal to or larger than 2) may be used. In such a case as well, by calculating the regression coefficients and the constant terms of the n-th-degree equation by the sequential least-squares method, it is possible to obtain the same advantageous effects as provided by the second embodiment. Further, the learned correction value $KICYL\_LS_i$ may be calculated by using predetermined values set for each of a plurality of operating regions in advance, as the regression coefficient and the constant term of the regression equation. This can reduce the time for computing the learned correction value $KICYL\_LS_i$, thereby reducing the computational load on the ECU 2.

Further, although in the second embodiment, the I-PD control algorithm is employed as the control algorithm for causing the intake air amount variation coefficient $\Psi_i$ to converge to the moving average value $\Psi$ave thereof, this is not limitative, but it goes without saying that other suitable algorithm may be employed. For example, instead of the I-PD control algorithm, an IP-D control algorithm (differential-preceding PID control algorithm) expressed by equations (87) and (88) in FIG. 41 may be employed to calculate the intake air amount variation correction coefficient $KICYL_i$ or a response-specified control algorithm (sliding mode control algorithm or back-stepping control algorithm) expressed by equations (89) to (91) in FIG. 41 may be employed to calculate the intake air amount variation correction coefficient $KICYL_i$. Even when one of these control algorithms is employed, similarly to the case of using the I-PD control algorithm according to the present embodiment, it is possible to calculate the intake air amount variation correction coefficient $KICYL_i$ such that overshooting is not caused in the behavior of the intake air amount variation coefficient $\Psi_i$ being caused to converge to the moving average value $\Psi$ave. As a result, it is possible to promptly and appropriately correct the variation in intake air amount between the cylinders.

Further, even when the I-PD control algorithm or the response-specified control algorithm is employed in the calculation of the intake air amount variation correction coefficient $KICYL_i$, as described above, by properly setting the feedback gains and the switching function-setting parameter to respective values such that the speed at which the intake air amount variation coefficient $\Psi_i(k)$ converges to the moving average value $\Psi$ave is higher than the speed at which the air-fuel ratio variation coefficient $\Phi_i(k)$ converges to the moving average value $\Phi$ave, it is possible to prevent the air-fuel ratio control by the third air-fuel ratio controller 60 and that by the first air-fuel ratio controller 30 from interfering with each other. Further, each feedback gain thereof may be determined based on the optimal regulator theory or the $H_\infty$ control theory. This makes it possible to more effectively suppress overshooting in the behavior of the intake air amount variation coefficient $\Psi_i$ being caused to converge to the moving average value Ψave thereof, with the result that the accuracy of correction of variation in intake air amount between the cylinders can be further enhanced.

Further, it goes without saying that when the setting time over which the intake air amount variation coefficient $\Psi_i$ converges to the moving average value Ψave may be long, the intake air amount variation correction coefficient $KICYL_i$ may be calculated with the PID control algorithm described above. Further, the average value of the intake air amount variation coefficient as a target value to which the intake air amount variation coefficient $\Psi_i$ is caused to converge is not limited to the moving average value Ψave in the present embodiment, but it may be a weighted average value.

Further, in the illustrated example of the second embodiment, the adaptive observer 61 of the third air-fuel ratio controller 60 identifies the vector ψ(k) of the intake air amount variation coefficient, by the variable-gain sequential least-squares method expressed by the equations (60) to (65) in FIG. 27, it goes without saying that the identification algorithm with which the adaptive observer 61 identifies the vector ψ(k) of the intake air amount variation coefficient is not limited to this. For example, the vector ψ(k) of the intake air amount variation coefficient may be identified by the fixed gain method to which is applied the δ correction method expressed by equations (92) to (99) in FIG. 42.

Figure 43:
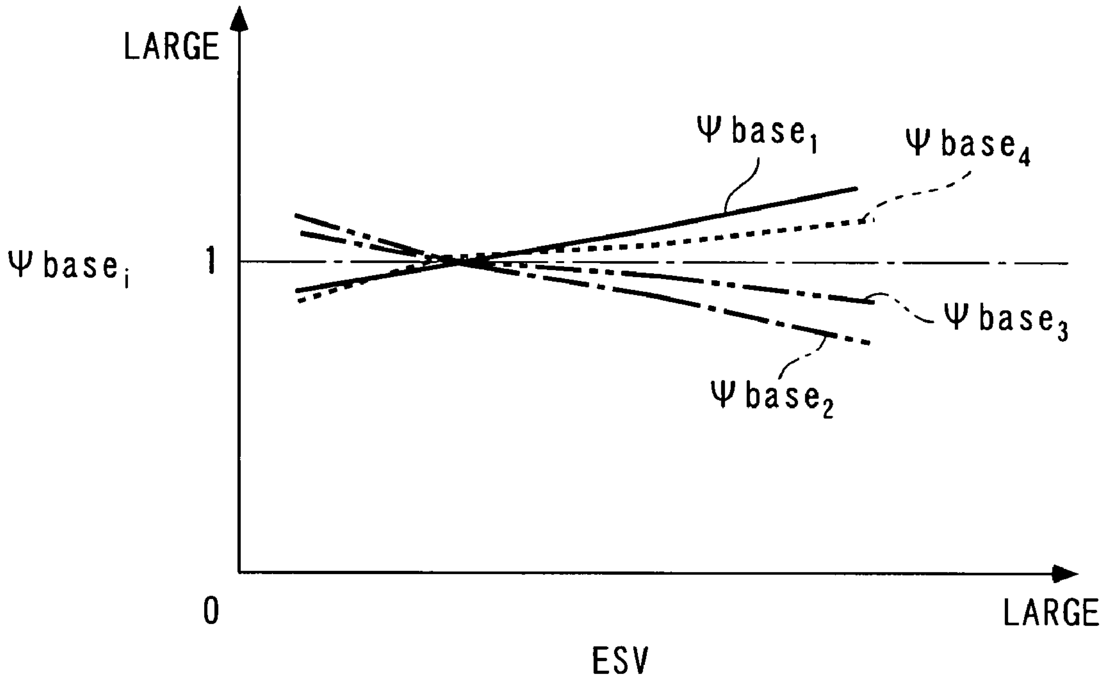
FIG. 43 is a diagram showing a table used in the calculation of reference values $\Psi base_i$.

The symbol ψbase in the equation (92) in FIG. 42 represents a reference value vector (reference value) defined by the equation (93), and four elements of this vector, i.e. reference values Ψbase1 to Ψbase4 are calculated by searching a table shown in FIG. 43 according to the exhaust gas volume ESV. Further, the symbol dψ(k) in the equation (92) represents a correction term (correction component) defined by the equation (94), and calculated by equations (95) to (99).

When the vector ψ(k) of the air-fuel ratio variation coefficient is identified by the fixed gain method to which the δ correction method is applied, the computing time can be reduced compared with the case of using the sequential least-squares method, and the computational load on the ECU 2 can be reduced. As a result, it is possible to reduce the size and cost of the ECU 2. Moreover, even when the engine 3 is in an operating condition in which the air-fuel ratio changes violently, such as a transient operating condition, the identified value of the vector ψ(k) can be constrained to values close to a value of 1, which makes it possible to promptly and properly calculate the vector ψ(k) of the air-fuel ratio variation coefficient representative of the variation in intake air amount between the cylinders as a value in which the behavior of the air-fuel ratio is properly reflected, whereby the stability of the air-fuel ratio control can be enhanced.

Although in the preferred embodiments described above, the present invention is applied to the control system of the engine 3 for automotive vehicles, this is not limitative, but it goes without saying that the control system according to the present invention can be applied to shipborne internal combustion engines and other industrial machines.

It is further understood by those skilled in the art that the foregoing is a preferred embodiment of the present invention, and that various changes and modifications may be made without departing from the spirit and scope thereof.

What is claimed is:

1. A control system for controlling a plant, comprising:

detection means for detecting a detection value reflecting a behavior of a first internal variable of the plant;

simulation value-generating means for generating a simulation value simulating the behavior of the first internal variable;

estimation means for estimating an estimation value of the detection value based on a model defining a relationship between the estimation value and the simulation value;

identification means for identifying a model parameter of the model according to the detected detection value and the generated simulation value, such that the estimated estimation value becomes equal to the detected detection value; and first control means for determining a first input to be inputted to the plant, according to the identified model parameter.

2. A control system as claimed in claim 1, further comprising second control means for determining a second input to be inputted to the plant such that the detection value is caused to converge to a predetermined target value, and wherein the first internal variable comprises a plurality of first internal variables, and wherein the simulation value comprises a plurality of simulation values simulating respective behaviors of the plurality of first internal variables, wherein the model parameter comprises a plurality of model parameters, and wherein said identification means identifies the plurality of model parameters according to the detection value and the plurality of simulation values such that the estimated estimation value becomes equal to the detected detection value, and wherein said first control means determines the first input such that the identified model parameters converge to an average value thereof.

3. A control system as claimed in claim 1, wherein said first control means comprises:

learned correction value-calculating means for calculating a learned correction value of the first input, using a sequential statistical algorithm, correction means for correcting the first input using the calculated learned correction value, and input means for inputting the corrected first input to the plant.

4. A control system as claimed in claim 3, wherein said learned correction value-calculating means calculates the learned correction value of the first input using a regression equation in which the learned correction value is used as a dependent variable and a second internal variable having influence on the first internal variable is used as an independent variable, and calculates a regression coefficient and a constant term of the regression equation with the sequential statistical algorithm.

5. A control system as claimed in claim 1, wherein said first control means determines an input component contained in the first input based on a difference between the model parameter and a predetermined target value.

6. A control system as claimed in claim 5, wherein said first control means determines other input components than the input component contained in the first input, based on the model parameter.

7. A control system as claimed in claim 1, wherein said first control means determines the first input according to the model parameter with a response-specified control algorithm.

8. A control system as claimed in claim 1, wherein said identification means identifies the model parameter by a fixed gain method.

9. A control system as claimed in claim 4, wherein said identification means identifies the model parameter by calculating a model parameter reference value according to the second internal variable, and adding a predetermined correction component to the calculated model parameter reference value.

10. A control system as claimed in claim 1, further comprising delay means for delaying one of the detection value and the simulation value by a predetermined delay time period, and wherein said identification means identifies the model parameter according to the delayed one of the detection value and the simulation value, and the other of the detection value and the simulation value.

11. A control system as claimed in claim 1, further comprising filter means for generating a filtered value of the detection value by subjecting the detection value to predetermined filtering processing, and wherein said identification means identifies the model parameter according to the filtered value of the detection value and the simulation value.

12. A control method for controlling a plant, comprising:

a detection step of detecting a detection value reflecting a behavior of a first internal variable of the plant;

a simulation value-generating step of generating a simulation value simulating the behavior of the first internal variable;

an estimation step of estimating an estimation value of the detection value based on a model defining a relationship between the estimation value and the simulation value;

an identification step of identifying a model parameter of the model according to the detected detection value and the generated simulation value, such that the estimated estimation value becomes equal to the detected detection value; and a first control step of determining a first input to be inputted to the plant, according to the identified model parameter.

13. A control method as claimed in claim 12, further comprising a second control step of determining a second input to be inputted to the plant such that the detection value is caused to converge to a predetermined target value, and wherein the first internal variable comprises a plurality of first internal variables, and wherein the simulation value comprises a plurality of simulation values simulating respective behaviors of the plurality of first internal variables, wherein the model parameter comprises a plurality of model parameters, and wherein said identification step includes identifying the plurality of model parameters according to the detection value and the plurality of simulation values such that the estimated estimation value becomes equal to the detected detection value, and wherein said first control step includes determining the first input such that the identified model parameters converge to an average value thereof.

14. A control method as claimed in claim 12, wherein said first control step comprises:

a learned correction value-calculating step of calculating a learned correction value of the first input, using a sequential statistical algorithm, a correction step of correcting the first input using the calculated learned correction value, and an input step of inputting the corrected first input to the plant.

15. A control method as claimed in claim 14, wherein said learned correction value-calculating step includes calculating the learned correction value of the first input using a regression equation in which the learned correction value is used as a dependent variable and a second internal variable having influence on the first internal variable is used as an independent variable, and calculating a regression coefficient and a constant term of the regression equation with the sequential statistical algorithm.

16. A control method as claimed in claim 12, wherein said first control step includes determining an input component contained in the first input based on a difference between the model parameter and a predetermined target value.

17. A control method as claimed in claim 16, wherein said first control step includes determining other input components than the input component contained in the first input, based on the model parameter.

18. A control method as claimed in claim 12, wherein said first control step includes determining the first input according to the model parameter with a response-specified control algorithm.

19. A control method as claimed in claim 12, wherein said identification step includes identifying the model parameter by a fixed gain method.

20. A control method as claimed in claim 15, wherein said identification step includes identifying the model parameter by calculating a model parameter reference value according to the second internal variable, and adding a predetermined correction component to the calculated model parameter reference value.

21. A control method as claimed in claim 12, further comprising a delay step of delaying one of the detection value and the simulation value by a predetermined delay time period, and wherein said identification step includes identifying the model parameter according to the delayed one of the detection value and the simulation value, and the other of the detection value and the simulation value.

22. A control method as claimed in claim 12, further comprising a filter step of generating a filtered value of the detection value by subjecting the detection value to predetermined filtering processing, and wherein said identification step includes identifying the model parameter according to the filtered value of the detection value and the simulation value.

23. A control unit including a control program for causing a computer to control a plant, wherein the control program causes the computer to detect a detection value reflecting a behavior of a first internal variable of the plant, generate a simulation value simulating the behavior of the first internal variable, estimate an estimation value of the detection value based on a model defining a relationship between the estimation value and the simulation value, identify a model parameter of the model according to the detected detection value and the generated simulation value, such that the estimated estimation value becomes equal to the detected detection value, and determine a first input to be inputted to the plant, according to the identified model parameter.

24. A control unit as claimed in claim 23, wherein the control program causes the computer to determine a second input to be inputted to the plant such that the detection value is caused to converge to a predetermined target value, and wherein the first internal variable comprises a plurality of first internal variables, and wherein the simulation value comprises a plurality of simulation values simulating respective behaviors of the plurality of first internal variables, wherein the model parameter comprises a plurality of model parameters, and wherein when the control program causes the computer to identify the model parameter, the control program causes the computer to identify the plurality of model parameters according to the detection value and the plurality of simulation values such that the estimated estimation value becomes equal to the detected detection value, and wherein when the control program causes the computer to determine the first input, the control program causes the computer to determine the first input such that the identified model parameters converge to an average value thereof.

25. A control unit as claimed in claim 23, wherein when the control program causes the computer to determine the first input, the control program causes the computer to calculate a learned correction value of the first input, using a sequential statistical algorithm, correct the first input using the calculated learned correction value, and input the corrected first input to the plant.

26. A control unit as claimed in claim 25, wherein when the control program causes the computer to calculate the learned correction value, the control program causes the computer to calculate the learned correction value of the first input using a regression equation in which the learned correction value is used as a dependent variable and a second internal variable having influence on the first internal variable is used as an independent variable, and calculate a regression coefficient and a constant term of the regression equation with the sequential statistical algorithm.

27. A control unit as claimed in claim 23, wherein when the control program causes the computer to determine the first input, the control program causes the computer to determine an input component contained in the first input based on a difference between the model parameter and a predetermined target value.

28. A control unit as claimed in claim 27, wherein when the control program causes the computer to determine the first input, the control program causes the computer to determine other input components than the input component contained in the first input, based on the model parameter.

29. A control unit as claimed in claim 23, wherein when the control program causes the computer to determine the first input, the control program causes the computer to determine the first input according to the model parameter with a response-specified control algorithm.

30. A control unit as claimed in claim 23, wherein when the control program causes the computer to identify the model parameter, the control program causes the computer to identify the model parameter by a fixed gain method.

31. A control unit as claimed in claim 26, wherein when the control program causes the computer to identify the model parameter, the control program causes the computer to identify the model parameter by calculating a model parameter reference value according to the second internal variable, and add a predetermined correction component to the calculated model parameter reference value.

32. A control unit as claimed in claim 23, wherein the control program causes the computer to delay one of the detection value and the simulation value by a predetermined delay time period, and wherein when the control program causes the computer to identify the model parameter, the control program causes the computer to identify the model parameter according to the delayed one of the detection value and the simulation value, and the other of the detection value and the simulation value.

33. A control unit as claimed in claim 23, wherein the control program causes the computer to generate a filtered value of the detection value by subjecting the detection value to predetermined filtering processing, and wherein when the control program causes the computer to identify the model parameter, the control program causes the computer to identify the model parameter according to the filtered value of the detection value and the simulation value.

* * * * *